US012099325B2

(12) United States Patent
Komatsu et al.

(10) Patent No.: US 12,099,325 B2
(45) Date of Patent: Sep. 24, 2024

(54) PROCESS CARTRIDGE AND IMAGE FORMING APPARATUS

(71) Applicant: CANON KABUSHIKI KAISHA, Tokyo (JP)

(72) Inventors: Noriyuki Komatsu, Numazu (JP); Masaki Ojima, Mishima (JP); Tomonori Mori, Numazu (JP); Daisuke Abe, Suntou-gun (JP); Tadayuki Tsuda, Susono (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/386,330

(22) Filed: Nov. 2, 2023

(65) Prior Publication Data

US 2024/0061371 A1 Feb. 22, 2024

Related U.S. Application Data

(63) Continuation of application No. 18/089,693, filed on Dec. 28, 2022, now Pat. No. 11,846,910, which is a (Continued)

(30) Foreign Application Priority Data

Apr. 25, 2019 (JP) ................................ 2019-084040

(51) Int. Cl.
*G03G 21/18* (2006.01)

(52) U.S. Cl.
CPC ..... *G03G 21/1814* (2013.01); *G03G 21/1821* (2013.01); *G03G 21/1825* (2013.01); (Continued)

(58) Field of Classification Search
CPC ........... G03G 21/1814; G03G 21/1821; G03G 21/1825; G03G 21/1842; G03G 21/1885; G03G 2221/1678; G03G 2221/1861
See application file for complete search history.

(56) References Cited

U.S. PATENT DOCUMENTS 727,126 A 5/1903 Gramelspacher
894,517 A 7/1908 Meriwether
(Continued)

FOREIGN PATENT DOCUMENTS

EP 3410227 A1 * 12/2018 ......... G03G 21/1814
JP 2007-102152 A 4/2007
(Continued)

OTHER PUBLICATIONS

Apr. 30, 2024 Office Action in Japanese Patent Application Pub. No. 2023-104026 (with English translation).

*Primary Examiner* — Sophia S Chen
(74) *Attorney, Agent, or Firm* — Venable LLP

(57) ABSTRACT

A process cartridge includes a first unit including an image bearing member configured to carry an electrostatic latent image, and a second unit including a developer bearing member configured to develop the electrostatic latent image carried on the image bearing member into a toner image, the second unit being capable of being mounted on the first unit in a mounting direction. The first unit includes a moving member that moves the second unit mounted on the first unit at a mounting position to a detachment position. The second unit includes a storage unit that stores information about the second unit. The moving member is disposed on a first side of the process cartridge in a longitudinal direction of the image bearing member. An electrode of the storage unit is disposed on a second side of the process cartridge in the longitudinal direction.

12 Claims, 58 Drawing Sheets

Related U.S. Application Data continuation of application No. 17/717,390, filed on Apr. 11, 2022, now Pat. No. 11,567,447, which is a continuation of application No. 17/216,907, filed on Mar. 30, 2021, now Pat. No. 11,327,432, which is a continuation of application No. 16/850,093, filed on Apr. 16, 2020, now Pat. No. 10,996,620.

(52) U.S. Cl.
CPC ..... *G03G 21/1842* (2013.01); *G03G 21/1885* (2013.01); *G03G 2221/1678* (2013.01); *G03G 2221/1861* (2013.01)

(56) References Cited

U.S. PATENT DOCUMENTS 952,648 A 3/1910 Stone
952,650 A 3/1910 Sundh
952,666 A 3/1910 Bancroft
952,698 A 3/1910 Boyce
952,945 A 3/1910 Reinle
952,948 A 3/1910 Ryder
5,126,800 A 6/1992 Shishido et al.
5,151,734 A 9/1992 Tsuda et al.
5,208,634 A 5/1993 Ikemoto et al.
5,223,893 A 6/1993 Ikemoto et al.
5,294,960 A 3/1994 Nomura et al.
5,331,372 A 7/1994 Tsuda et al.
5,345,294 A 9/1994 Nomura et al.
5,404,198 A 4/1995 Noda et al.
5,470,635 A 11/1995 Shirai et al.
5,475,470 A 12/1995 Sasago et al.
5,488,459 A 1/1996 Tsuda et al.
5,510,878 A 4/1996 Noda et al.
5,561,504 A 10/1996 Watanabe et al.
5,581,325 A 12/1996 Tsuda et al.
5,583,613 A 12/1996 Kobayashi et al.
5,602,623 A 2/1997 Nishibata et al.
5,608,509 A 3/1997 Shirai et al.
5,623,328 A 4/1997 Tsuda et al.
5,659,847 A 8/1997 Tsuda et al.
5,669,042 A 9/1997 Kobayashi et al.
5,682,579 A 10/1997 Nomura et al.
5,765,077 A 6/1998 Sakurai et al.
5,809,374 A 9/1998 Tsuda et al.
5,812,909 A 9/1998 Oguma et al.
5,828,928 A 10/1998 Sasago et al.
5,828,929 A 10/1998 Watanabe et al.
5,878,304 A 3/1999 Watanabe et al.
5,907,749 A 5/1999 Nomura et al.
5,923,918 A 7/1999 Nakagawa et al.
5,926,672 A 7/1999 Nishibata et al.
5,987,278 A 11/1999 Nomura et al.
6,006,058 A 12/1999 Watanabe et al.
6,011,941 A 1/2000 Takashima et al.
6,041,196 A 3/2000 Nakagawa et al.
6,058,278 A 5/2000 Tsuda et al.
6,075,956 A 6/2000 Watanabe et al.
6,097,906 A 8/2000 Matsuzaki et al.
6,097,911 A 8/2000 Watanabe et al.
6,118,961 A 9/2000 Nomura et al.
6,131,011 A 10/2000 Kojima et al.
6,154,623 A 11/2000 Suzuki et al.
6,157,792 A 12/2000 Mori et al.
6,173,145 B1 1/2001 Chadani et al.
6,178,301 B1 1/2001 Kojima et al.
6,188,852 B1 2/2001 Ojima et al.
6,266,503 B1 7/2001 Murayama et al.
6,298,217 B1 10/2001 Murayama et al.
6,314,266 B1 11/2001 Murayama et al.
6,324,363 B1 11/2001 Watanabe et al.
6,334,035 B1 12/2001 Abe et al.
6,377,759 B1 4/2002 Abe et al.
6,404,996 B1 6/2002 Mori et al.
6,415,121 B1 7/2002 Suzuki et al.
6,424,811 B1 7/2002 Tsuda et al.
6,463,225 B1 10/2002 Abe et al.
6,519,431 B1 2/2003 Toba et al.
6,535,699 B1 3/2003 Abe et al.
6,603,939 B1 8/2003 Toba et al.
8,010,071 B2 8/2011 Zhang et al.
8,060,507 B2 11/2011 Alspector et al.
8,201,518 B2 6/2012 Smith
8,282,323 B2 10/2012 Hummel
8,478,657 B2 7/2013 Lee
8,478,660 B2 7/2013 Toro Escudero et al.
8,503,033 B2 8/2013 Tanase et al.
8,673,032 B2 3/2014 French et al.
8,770,687 B2 7/2014 Ito
8,789,604 B2 7/2014 Phadke et al.
10,401,783 B2 9/2019 Chadani et al.
10,761,476 B1 9/2020 Leemhuis et al.
2001/0009624 A1 7/2001 Abe et al.
2001/0043814 A1 11/2001 Abe
2002/0037179 A1 3/2002 Suzuki et al.
2002/0051653 A1 5/2002 Toba et al.
2002/0061205 A1 5/2002 Tsuda et al.
2002/0141767 A1 10/2002 Abe
2002/0191981 A1 12/2002 Miyabe et al.
2003/0198485 A1 10/2003 Ojima et al.
2003/0215261 A1 11/2003 Karakama et al.
2004/0105698 A1 6/2004 Yamaguchi et al.
2004/0120729 A1 6/2004 Uyama et al.
2005/0019061 A1 1/2005 Karakama et al.
2005/0053393 A1 3/2005 Harada et al.
2005/0069338 A1 3/2005 Oguma et al.
2005/0069342 A1 3/2005 Kanno et al.
2005/0201773 A1 9/2005 Matsubara et al.
2005/0226648 A1 10/2005 Abe et al.
2006/0029416 A1 2/2006 Oguma et al.
2006/0177231 A1 8/2006 Mori et al.
2007/0009281 A1 1/2007 Sato et al.
2007/0092285 A1 4/2007 Oguma et al.
2008/0089722 A1 4/2008 Ojima et al.
2008/0138107 A1 6/2008 Mori et al.
2008/0138114 A1 6/2008 Chadani et al.
2008/0138115 A1 6/2008 Chadani et al.
2008/0181678 A1 7/2008 Sato et al.
2008/0226341 A1 9/2008 Mase et al.
2009/0317129 A1 12/2009 Abe et al.
2010/0028039 A1 2/2010 Abe et al.
2010/0329732 A1 12/2010 Chadani et al.
2011/0097108 A1 4/2011 Chadani et al.
2011/0123224 A1 5/2011 Chadani et al.
2011/0200340 A1 8/2011 Kojima et al.
2012/0063810 A1 3/2012 Chadani et al.
2012/0128388 A1 5/2012 Chadani et al.
2012/0189343 A1 7/2012 Chadani et al.
2012/0189344 A1 7/2012 Chadani et al.
2012/0201566 A1 8/2012 Abe et al.
2012/0213549 A1 8/2012 Mori
2012/0230726 A1 9/2012 Chadani et al.
2012/0281999 A1 11/2012 Chadani et al.
2013/0336674 A1 12/2013 Abe et al.
2014/0205321 A1 7/2014 Jang et al.
2015/0362891 A1 12/2015 Chadani et al.
2016/0349699 A1 12/2016 Miyamoto et al.
2017/0075299 A1 3/2017 Chadani et al.
2017/0269544 A1 9/2017 Itabashi
2018/0004123 A1 1/2018 Itabashi et al.
2018/0275560 A1 9/2018 Koyama et al.
2018/0299823 A1 10/2018 Uyama et al.
2018/0314202 A1 11/2018 Yoki
2019/0079425 A1 3/2019 Lin
2019/0179249 A1 6/2019 Mori et al.
2019/0187608 A1 6/2019 Uesugi et al.
2019/0227481 A1 7/2019 Chadani et al.
2019/0294102 A1 9/2019 Shimizu et al.
2019/0339643 A1 11/2019 Chadani et al.
2020/0041953 A1 2/2020 Uesugi et al.
2020/0142345 A1 5/2020 Mori et al.
2020/0174423 A1 6/2020 Ogawa et al.
2020/0209804 A1* 7/2020 Kawakami et al. ... G03G 21/12

(56) References Cited

U.S. PATENT DOCUMENTS

| | | | |
|---|---|---|---|
| 2020/0257238 | A1 | 8/2020 | Uesugi et al. |
| 2020/0301352 | A1 | 9/2020 | Matsumaru et al. |
| 2021/0080900 | A1 | 3/2021 | Miyamoto et al. |

FOREIGN PATENT DOCUMENTS

| | | | |
|---|---|---|---|
| JP | 2008-224962 | A | 9/2008 |
| JP | 2008-276138 | A | 11/2008 |
| JP | 2009-181002 | A | 8/2009 |
| JP | 2016-224221 | A | 12/2016 |
| JP | 2018-004907 | A | 1/2018 |
| JP | 2018-066973 | A | 4/2018 |
| JP | 2018-146830 | A | 9/2018 |
| JP | 2018-180380 | A | 11/2018 |
| JP | 2018-189740 | A | 11/2018 |

* cited by examiner

PROCESS CARTRIDGE AND IMAGE FORMING APPARATUS

BACKGROUND OF THE INVENTION

Field of the Invention

The present invention relates to a process cartridge including an image bearing member and a developer bearing member, and an image forming apparatus including the process cartridge.

Description of the Related Art

Hitherto, there is suggested a printer in which a process cartridge is constituted by a photosensitive member cartridge and a development cartridge that is detachably supported to the photosensitive member cartridge, and the process cartridge is detachable from an apparatus body (refer to JP-A-2016-224221). The photosensitive member cartridge includes a photosensitive member of which a surface is scanned with an exposing unit to form an electrostatic latent image, and the development cartridge includes a development roller that develops the electrostatic latent image as a toner image.

A release lever for detaching the development cartridge from the photosensitive member cartridge is provided on a left portion of the photosensitive member cartridge. A memory unit is provided on a bottom surface of the development cartridge, and an electric contact portion of the photosensitive member cartridge, which can be electrically connected to an electric contact portion of the memory unit, is provided at a position corresponding to the memory unit of the photosensitive member cartridge.

The printer disclosed in JP-A-2016-224221 has a configuration in which the development cartridge can be detached from the photosensitive member cartridge, and thus in accordance with an operation of detaching the development cartridge, the electric contact portion of the memory unit and the electric contact portion of the photosensitive member cartridge are displaced and slide on each other. A displacement amount of the two electric contact portions becomes larger as it is close to the release lever. The two electric contact portions and the release lever are disposed on a left side of the process cartridge, and thus the displacement amount of the electric contact portions is large, and there is a concern that the electric contact portions are abraded and contact failure occurs.

SUMMARY OF THE INVENTION

According to a first aspect of the present invention, a process cartridge includes a first unit including an image bearing member configured to rotate and carry an electrostatic latent image, and a second unit including a developer bearing member configured to rotate while carrying a developer and to develop the electrostatic latent image carried on the image bearing member into a toner image, the second unit being capable of being mounted on the first unit in a mounting direction. The first unit includes a moving member that moves the second unit mounted on the first unit at amounting position to a detachment position. The second unit includes a storage unit that stores information about the second unit. The moving member is disposed on a first side of the process cartridge in a longitudinal direction of the image bearing member. An electrode of the storage unit is disposed on a second side of the process cartridge in the longitudinal direction.

According to a second aspect of the present invention, an image forming apparatus includes an apparatus body, and the process cartridge according to claim 1, the process cartridge being detachably provided in the apparatus body. The apparatus body includes a body electrode that is capable of coming into contact with the electrode of the storage unit.

Further features of the present invention will become apparent from the following description of exemplary embodiments with reference to the attached drawings.

DESCRIPTION OF THE EMBODIMENTS

First Embodiment

Overall Configuration

Figure 1:
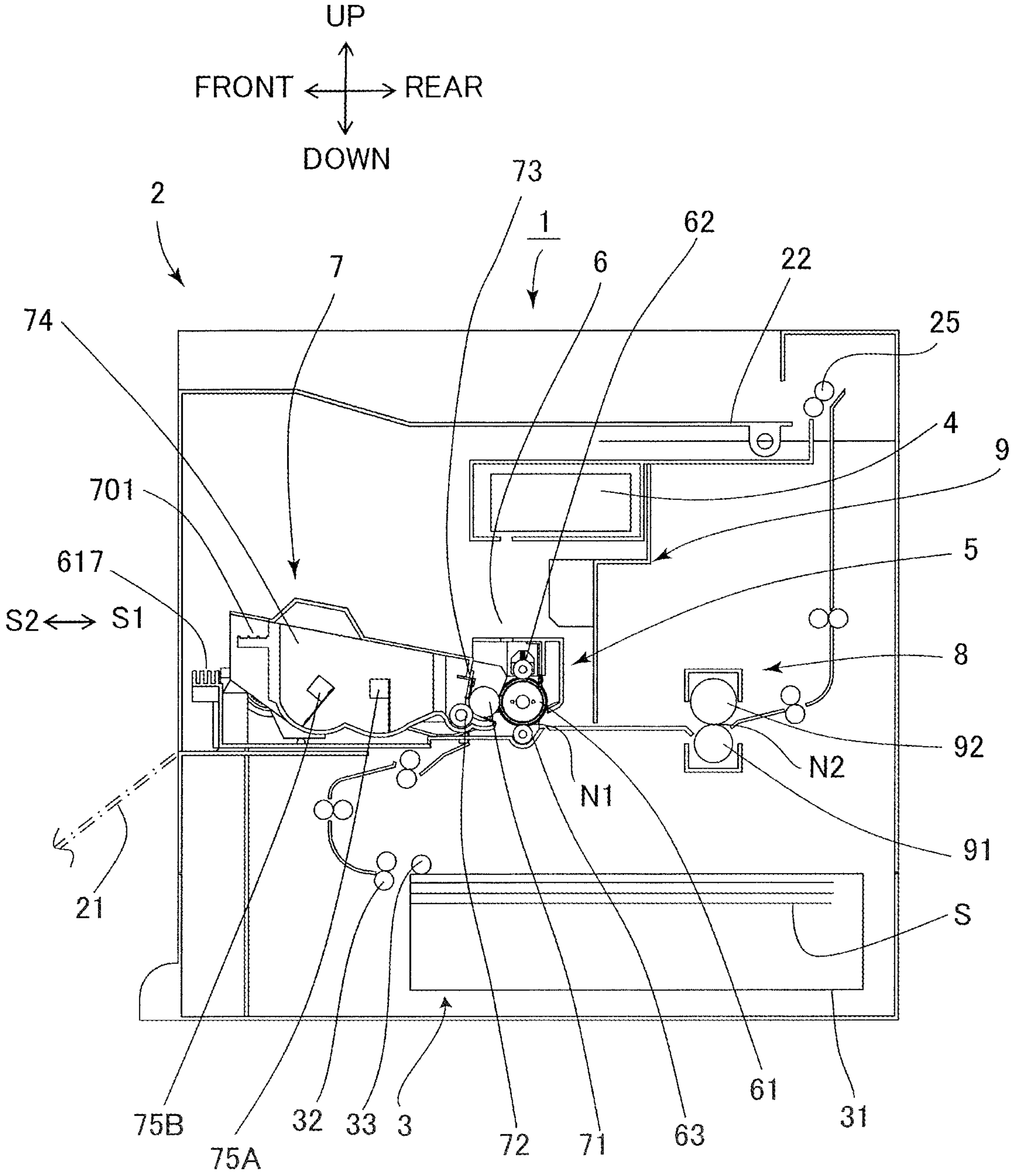
FIG. 1 is an overall schematic view illustrating a printer according to a first embodiment.

First, a first embodiment of the invention will be described. In the following description, directions are defined on the basis of a user who uses a printer 1. That is, a front surface side of the printer 1 is set as "front", a rear surface side thereof is set as "rear", an upper surface side is set as "up", and a lower surface side is set as "down". In addition, when the printer 1 is viewed from the front surface side, a left side of the printer 1 is set as "left", and a right side thereof is set as "right". With regard to a process cartridge to be described later, directions are defined in a similar manner as in the printer 1 on the assumption that the process cartridge takes the same posture as in a state of being mounted on the printer 1. Respective directions in the respective drawings are defined by arrows illustrated in the drawings. For example, in FIG. 1, a left side of a paper surface is set to a front side. In addition, an upper-lower direction is parallel to a vertical direction, and a right-left direction and a front-rear direction are parallel to a horizontal direction. The right-left direction is parallel to a rotational axis direction of a photosensitive drum 61 and a rotational axis direction of a development roller 71.

The printer 1 serving as an image forming apparatus according to the first embodiment is an electrophotographic-system laser beam printer. As illustrated in FIG. 1, the printer 1 includes a feeding unit 3 that feeds a sheet S accommodated in a cassette 31, an image forming unit 9 that forms a toner image on the sheet S, a fixing unit 8 that fixes the toner image onto the sheet S, and a sheet discharge roller pair 25.

The feeding unit 3 includes the cassette 31, a pickup roller 33 that feeds the highest sheet S accommodated in the cassette 31, and a separation roller pair 32 that separates the sheets S fed by the pickup roller 33 sheet by sheet.

The image forming unit 9 includes an exposing unit 4 that is provided in an apparatus body 2 of the printer 1, and a process cartridge 5 that is inserted into the apparatus body 2 in a direction indicated by an arrow S1 and is detached in a direction indicated by an arrow S2. The exposing unit 4 includes a laser emitting component, a polygon mirror, a lens, a reflective mirror, and the like (not illustrated). In the exposing unit 4, a surface of the photosensitive drum 61 of the process cartridge 5 is scanned at a high speed with laser light that is emitted from the laser emitting component and is based on image data, and thus the surface of the photosensitive drum 61 is exposed.

The process cartridge 5 is disposed bellow the exposing unit 4, and is inserted into or extracted from the apparatus body 2 in a state in which a door 21 of the apparatus body 2 is opened. The process cartridge 5 mainly includes a drum unit 6 and a development unit 7, and the drum unit 6 includes a rotatable photosensitive drum 61 serving as an image bearing member, a charging roller 62, a transfer roller 63, and the like. The photosensitive drum 61 and the transfer roller 63 form a transfer nip N1. The development unit 7 includes a development roller 71, a supply roller 72, a blade 73, a toner storage portion 74 that stores a developer that contains a toner, a first agitator 75A and a second agitator 75B which are provided inside the toner storage portion 74, and the like.

Note that, the developer in this embodiment is constituted by a nonmagnetic one-component developer, but a one-component developer including a magnetic component may be used. In addition, the one-component developer may contain an additive (for example, wax or silica particulate) for adjusting fluidity or a charging performance of the toner in addition to toner particles. In addition, as the developer, a two-component developer constituted by a nonmagnetic toner and a magnetic carrier may be used. In the case of using the magnetic developer, as the developer bearing member, for example, a cylindrical development sleeve in which a magnet is disposed on an inner side is used.

A developer in the toner storage portion 74 is stirred by the second agitator 75B and the first agitator 75A, and is supplied to the development roller 71 by the supply roller 72. The developer that is supplied to the development roller 71 by the supply roller 72 passes through a gap between the development roller 71 and the blade 73 and is carried on the development roller 71 in a constant layer thickness. The development roller 71 serving as the developer bearing member rotates while carrying the developer and develops an electrostatic latent image carried on the photosensitive drum 61 into a toner image. The fixing unit 8 is disposed on a backward side of the process cartridge 5, and includes a pressing roller 91 and a heating roller 92. The heating roller 92 includes a heat source such as a ceramic heater on an inner side.

When an image forming command is output to the printer 1, an image forming process is initiated by the image forming unit 9 on the basis of image information that is input from an external computer connected to the printer 1 or an image reading apparatus or the like that is connected to the printer 1 as an option. The exposing unit 4 emits laser light toward the photosensitive drum 61 on the basis of the image information that is input. At this time, the photosensitive drum 61 is charged in advance by the charging roller 62, and thus when the photosensitive drum 61 is irradiated with laser light, an electrostatic latent image is formed on the photosensitive drum 61. Then, the electrostatic latent image is developed by the development roller 71, and a toner image is formed on the photosensitive drum 61.

In combination with the image forming process, the sheet S stacked on the cassette 31 is sent out by the pickup roller 33. A plurality of the sheets S fed by the pickup roller 33 are separated sheet by sheet by the separation roller pair 32, and is conveyed to the transfer nip N1. In the transfer nip N1, when a transfer bias is applied to the transfer roller 63, the toner image formed on the photosensitive drum 61 is transferred to the sheet S. The sheet S to which the toner image is transferred at the transfer nip N1 is heated and pressed by a fixing nip N2 formed by the pressing roller 91 and the heating roller 92, and thus the toner image is fixed. In addition, the sheet S to which the toner image is fixed is discharged to a sheet discharge tray 22 by the sheet discharge roller pair 25.

Process Cartridge

Figure 2:
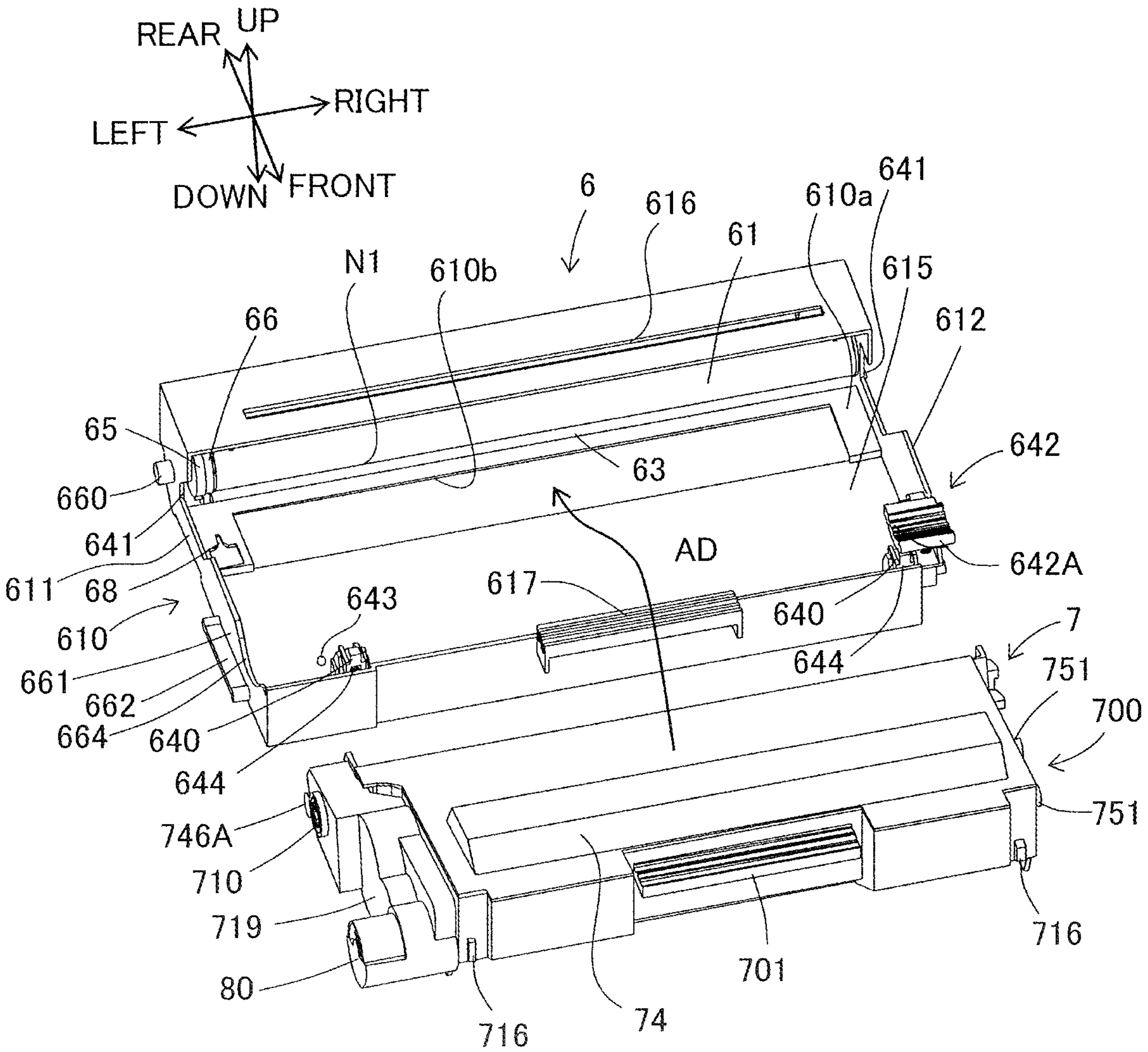
FIG. 2 is a perspective view illustrating a drum unit and a development unit.

As illustrated in FIG. 2, the process cartridge 5 includes the drum unit 6 serving as a first unit and the development unit 7 serving as a second unit that is detachably supported to the drum unit 6. The development unit 7 is mounted on the drum unit 6 in a mounting direction AD in a state in which a grip portion 701 is gripped by a user. Note that, in all embodiments to be described below, the mounting direction AD is the same as a direction that substantially face a backward side from a forward side of an apparatus.

Development Unit

As illustrated in FIG. 2 to FIG. 5, the development unit 7 includes a casing 700, the development roller 71, the supply roller 72, the first agitator 75A, the second agitator 75B, a drive train 720, and a side holder 719. The casing 700 includes a left side wall 704 and a right side wall 705 which rotatably support both ends of the development roller 71, the supply roller 72, the first agitator 75A, and the second agitator 75B, and a grip portion 701 that is provided in a front direction of the casing 700 and is gripped by a user. The side holder 719 covers the drive train 720 and is supported to the left side wall 704. Hereinafter, a rotational axis direction of the development roller 71 is referred to as an axial direction in description.

The first agitator 75A includes a stirring rod 78A and a stirring sheet 79A. The stirring rod 78A stirs the developer inside the toner storage portion 74 in the axial direction, and the stirring sheet 79A stirs the developer in a diameter direction orthogonal to the axial direction. Similarly, the second agitator 75B includes a stirring rod 78B and a stirring sheet 79B. The stirring rod 78B stirs the developer inside the toner storage portion 74 in the axial direction, and the stirring sheet 79B stirs the developer in the diameter direction. The supply roller 72 is supplied with the developer by the stirring sheet 79A.

Figure 3:
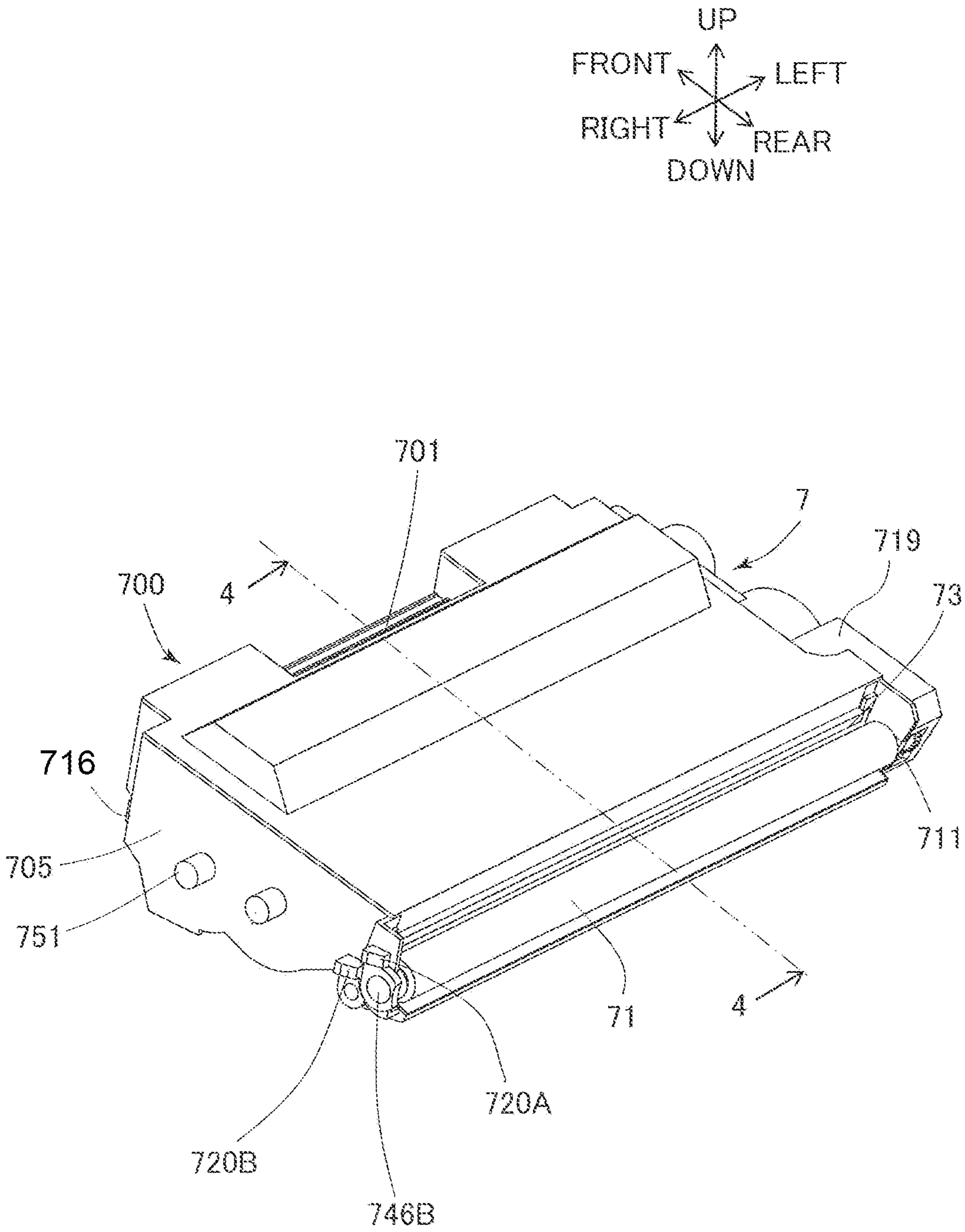
FIG. 3 is a perspective view illustrating the development unit.
Figure 4:
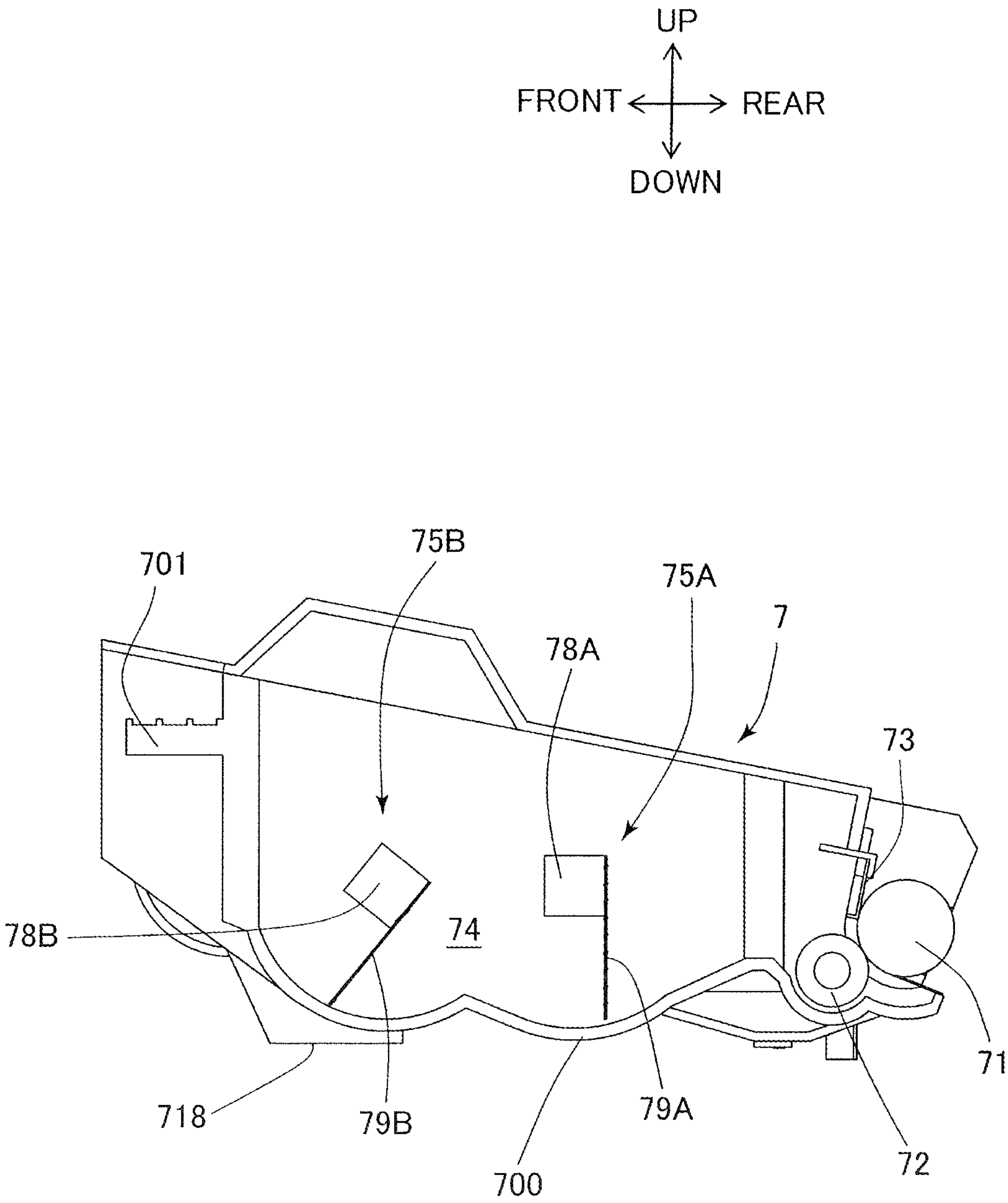
FIG. 4 is a cross-sectional view illustrating a cross-section 4-4 in FIG. 3.

The development roller 71 is rotatably supported by a bearing 746A provided in the side holder 719, and a bearing 746B attached to the right side wall 705 of the casing 700. As illustrated in FIG. 3, the development unit 7 includes a first contact 720A and a second contact 720B which are disposed in the vicinity of the bearing 746B. The first contact 720A is electrically connected to the development roller 71, and a voltage applied to the development roller 71 is supplied from the apparatus body 2. The second contact 720B is electrically connected to the supply roller 72, and a voltage applied to the supply roller 72 is supplied from the apparatus body 2. The first contact 720A and the second contact 720B can come into contact with a power supply contact (not illustrated) provided in the apparatus body 2.

Figure 5:
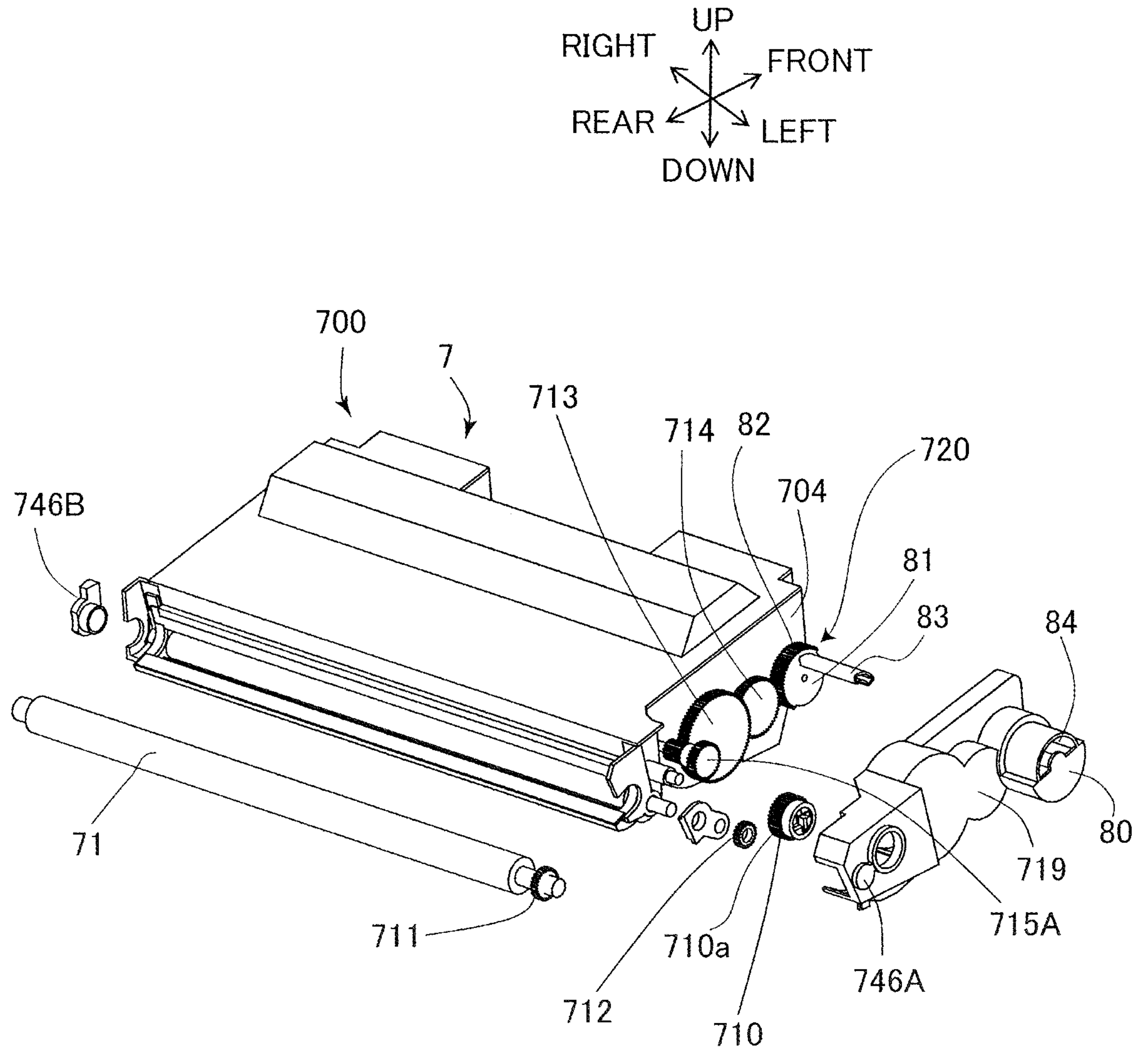
FIG. 5 is an exploded perspective view illustrating the development unit.
Figure 6:
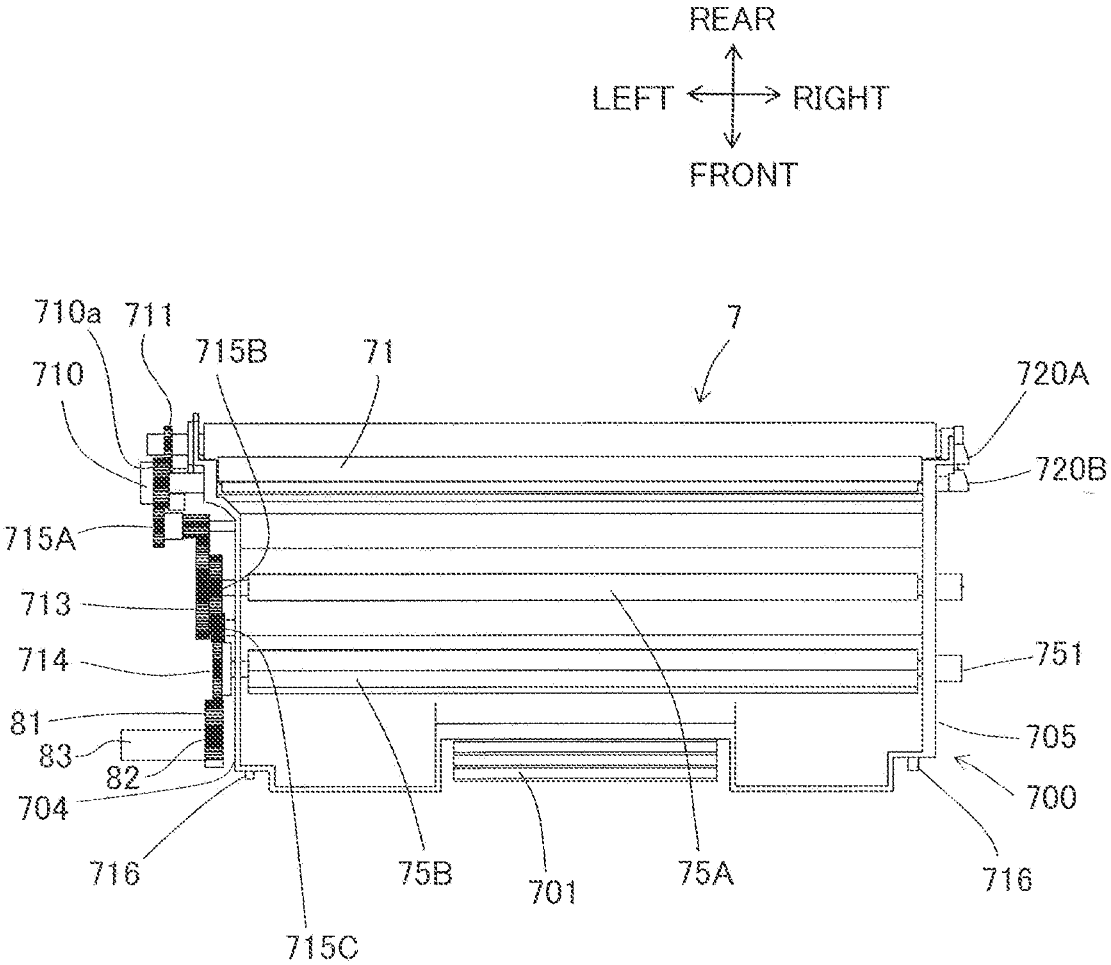
FIG. 6 is a plan view illustrating the development unit.

As illustrated in FIG. 5 and FIG. 6, the drive train 720 provided on the left side of the development unit 7 includes a development coupling 710, a supply roller gear 712, a development roller gear 711, a first agitator gear 713, and a second agitator gear 714. In addition, the drive train 720 includes idle gears 715A, 715B, and 715C.

The development coupling 710 is rotatably supported to the left side wall 704 of the development unit 7, and a drive transmission member (not illustrated) provided in the apparatus body 2 engages with the development coupling 710 in conjunction with an operation of closing the door 21 (refer to FIG. 1) provided in the apparatus body 2. In contrast, the drive transmission member is spaced apart from the development coupling 710 in conjunction with an operation of opening the door 21. The drive transmission member is configured to transmit a driving force to the development coupling 710 while permitting a displacement of the development coupling 710 within a predetermined range. In addition, movement of the development coupling 710, the development roller gear 711, and the supply roller gear 712 in an axial direction is regulated by the side holder 719.

When the apparatus body 2 operates after the door 21 is closed, the driving force is transmitted from the drive transmission member to the development coupling 710, and a gear 710*a* provided in a peripheral surface of the development coupling 710 rotates. The gear 710*a* engages with the development roller gear 711 provided in an end of the development roller 71 and the supply roller gear 712 provided in an end of the supply roller 72, and when the gear 710*a* rotates, the development roller 71 and the supply roller 72 rotate.

In addition, the gear 710*a* of the development coupling 710 engages with the first agitator gear 713 through the idle gear 715A, and when the first agitator gear 713 rotates, the first agitator 75A rotates. The idle gear 715B that is provided coaxially with the first agitator 75A engages with the second agitator gear 714 through the idle gear 715C, and when the second agitator gear 714 rotates, the second agitator 75B rotates.

In addition, as illustrated in FIG. 5 to FIG. 7B, the second agitator gear 714 is configured to engage with a gear portion 82 of a detection gear 81. The detection gear 81 is provided with a detection protrusion 83 that is disposed at a position distant from the rotation center by a predetermined distance and extends in an axial direction, and the detection protrusion 83 serving as a detection unit passes through a hole 84 of a detection unit 80 of the side holder 719. The hole 84 has a long hole shape that is long in a circumferential direction. The apparatus body 2 is provided with a detection mechanism (not illustrated) that detects a position of the detection protrusion 83, and the detection mechanism outputs a detection signal on the basis of the position of the detection protrusion 83. According to this, it is possible to determine whether the development unit 7 is an object that is not used, or an object that is used already.

Figure 7A:
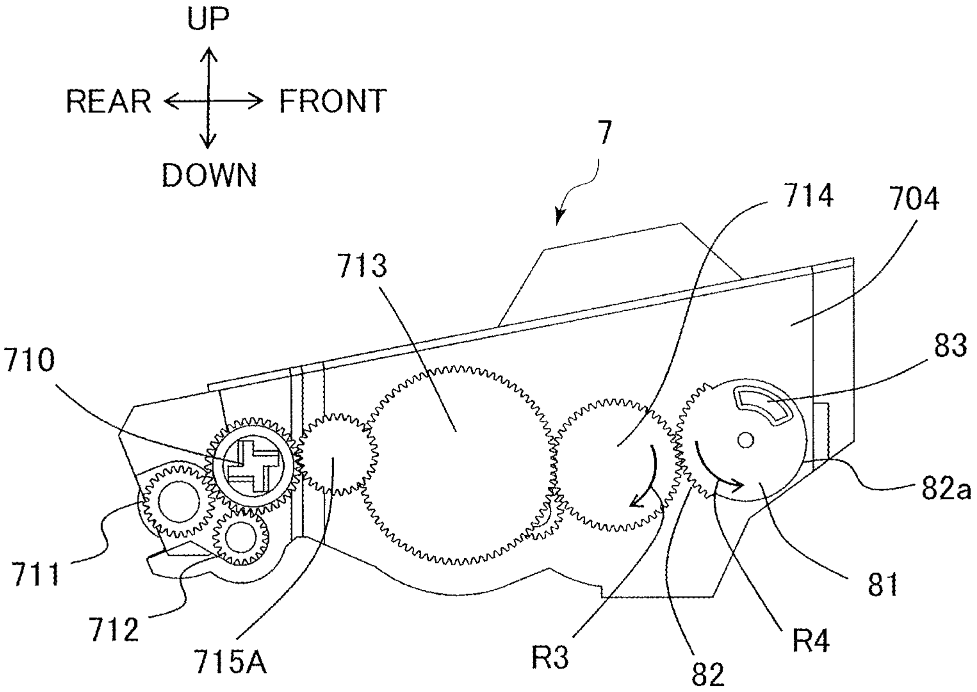
FIG. 7A is a side view illustrating a development unit that is not used.
Figure 7B:
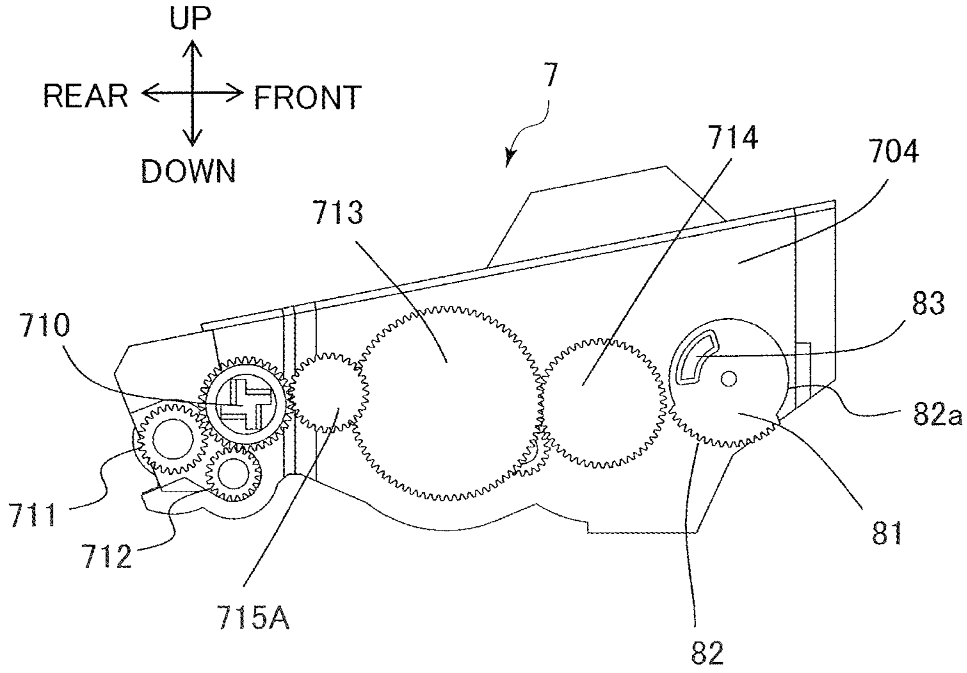
FIG. 7B is a side view illustrating a development unit that is used already.

FIG. 7A is a side view illustrating the development unit 7 that is not used, and FIG. 7B is a side view illustrating the development unit 7 that is used already. The detection gear 81 is a chipped tooth gear and includes the gear portion 82 and a non-gear portion 82*a*. As illustrated in FIG. 7A, the second agitator gear 714 of the development unit 7 that is not used engages with the gear portion 82 of the detection gear 81. At this time, the detection protrusion 83 is located at a position on an upper-front side serving as a first position.

In addition, when the development unit 7 is used and the second agitator gear 714 rotates in a direction indicated by an arrow R3, the detection gear 81 that engages with the second agitator gear 714 rotates in a direction indicated by an arrow R4. In addition, as illustrated in FIG. 7B, when the gear portion 82 of the detection gear 81 does not engage with the second agitator gear 714, the detection gear 81 is stopped. At this time, the detection protrusion 83 is located at a position on an upper-rear side serving as a second position.

As described above, since the development unit 7 is used, the detection protrusion 83 pivots within in a range of the hole 84 of the detection unit 80, and a position of the detection protrusion 83 is detected by the detection mechanism provided in the apparatus body 2. According to this, it is possible to determine whether the development unit 7 is an object that is not used or an object that is used already.

Figure 8:
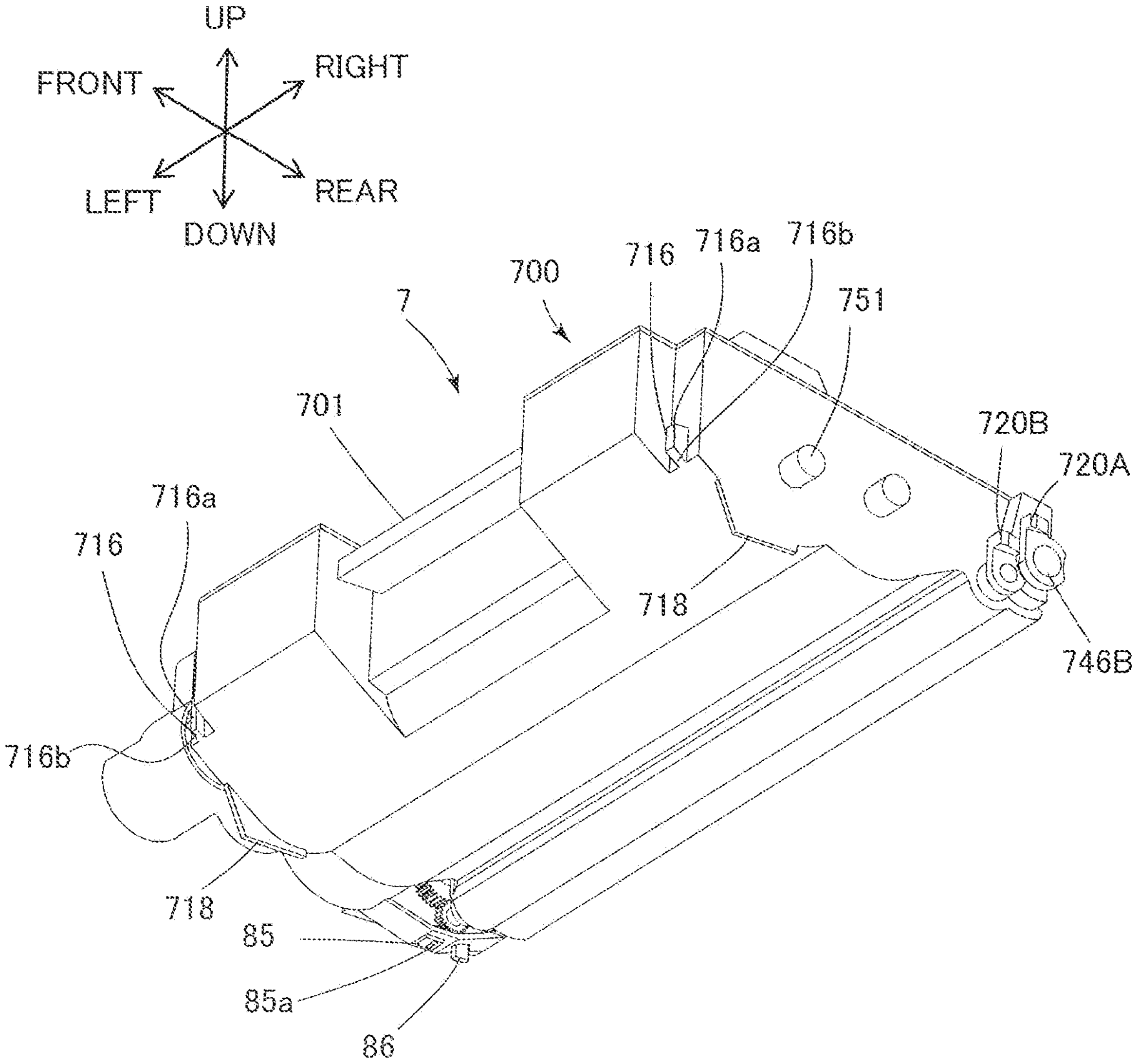
FIG. 8 is a perspective view illustrating the development unit.
Figure 9:
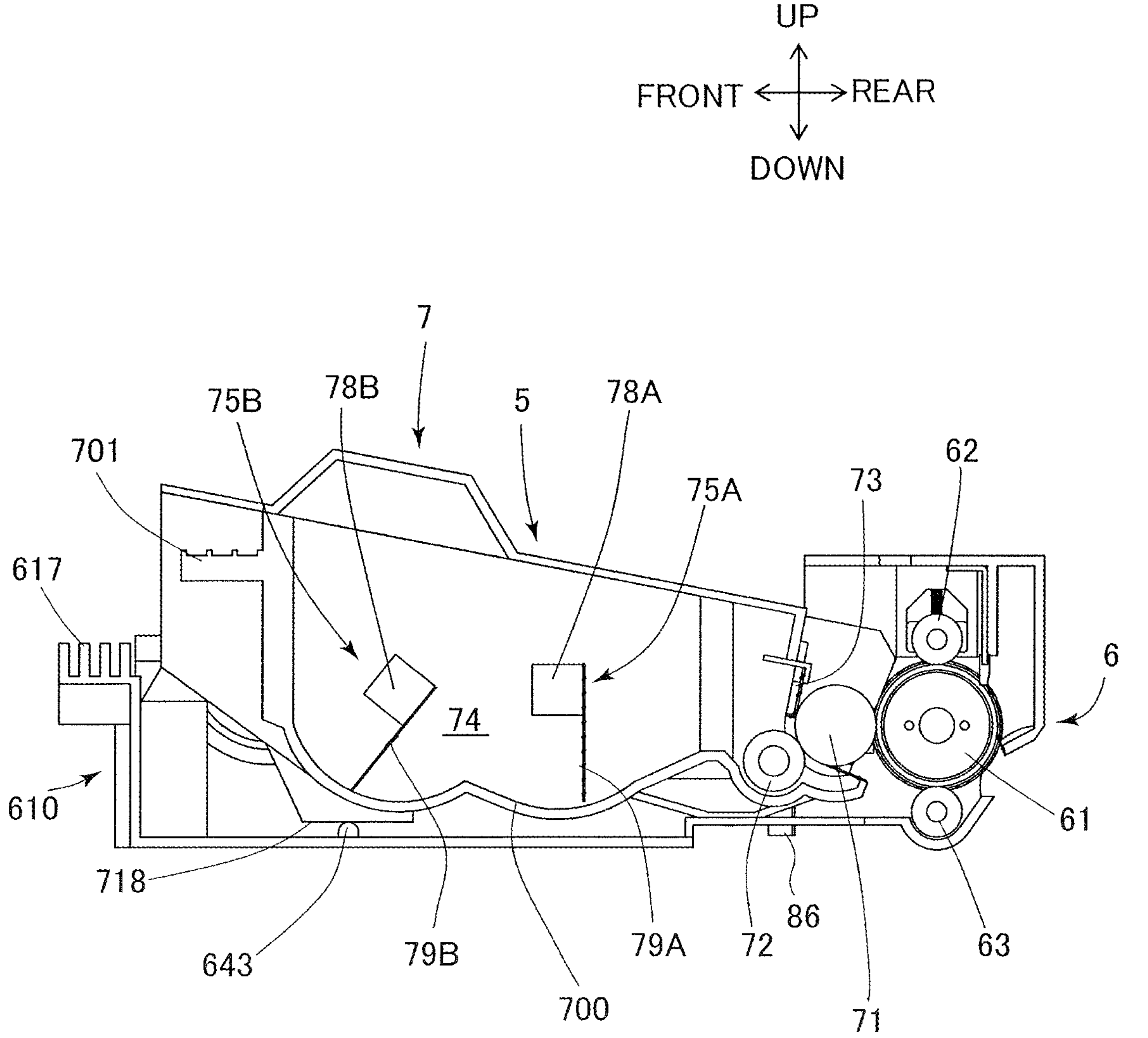
FIG. 9 is a cross-sectional view illustrating a process cartridge.

In addition, as illustrated in FIG. 8, a bottom surface of the development unit 7 is provided with a pair of left and right ribs 718 and 718 which protrudes downward, and a memory 85 and a positioning protrusion 86 which are provided on a left side. More specifically, the memory 85 and the positioning protrusion 86 are provided on a bottom surface of the side holder 719 of the development unit 7. The memory 85 includes a memory chip (not illustrated) that stores information about the development unit 7, and a memory electrode 85*a* that is electrically connected to the memory chip. The memory electrode 85*a* comes into contact with an electrode (not illustrated) provided in the apparatus body 2, and performs communication with the memory chip and the apparatus body 2. Information that is stored in the memory chip and relates to the development unit 7 includes information about replacement time of the development unit 7, or information about a residual amount of a toner stored in the development unit 7.

Drum Unit

Next, a detailed configuration of the drum unit 6 will be described. As illustrated in FIG. 2, and FIG. 9 to FIG. 11, the drum unit 6 mainly includes a frame 610 and the photosensitive drum 61 that is rotatably supported on a rear side of the frame 610. The frame 610 includes a pair of left side wall 611 and right side wall 612, and the photosensitive drum 61 is rotatably supported to the left side wall 611 and the right side wall 612.

A front portion of the frame 610 is provided with a mounting portion 615 (refer to FIG. 2) to which the development unit 7 can be mounted, a grip portion 617 where a user grips the drum unit 6, a pair of left and right pressing members 640 which presses the development unit 7 to a forward side, and a lift member 642. In a state in which the development unit 7 is mounted on the drum unit 6, the toner storage portion 74 of the development unit 7 is disposed between the left side wall 611 and the right side wall 612.

A laser passage hole 616 through which laser light emitted from the exposing unit 4 passes is formed in a rear-upper portion of the frame 610. In addition, a first positioning protrusion 660 and a first guide rib 662 which protrude to an outer side in an axial direction are provided on the left side wall 611 serving as a second side wall of the frame 610, and the first positioning protrusion 660 is disposed behind the first guide rib 662. Similarly, a second positioning protrusion 661 and a second guide rib 663 which protrude to an outer side in the axial direction are provided on the right side wall 612 serving as a first side wall of the frame 610, and the second positioning protrusion 661 is disposed behind the second guide rib 663. The first positioning protrusion 660 and the second positioning protrusion 661 are formed in a cylindrical shape, and the first guide rib 662 and the second guide rib 663 extend in a direction along the front-rear direction.

Figure 11:
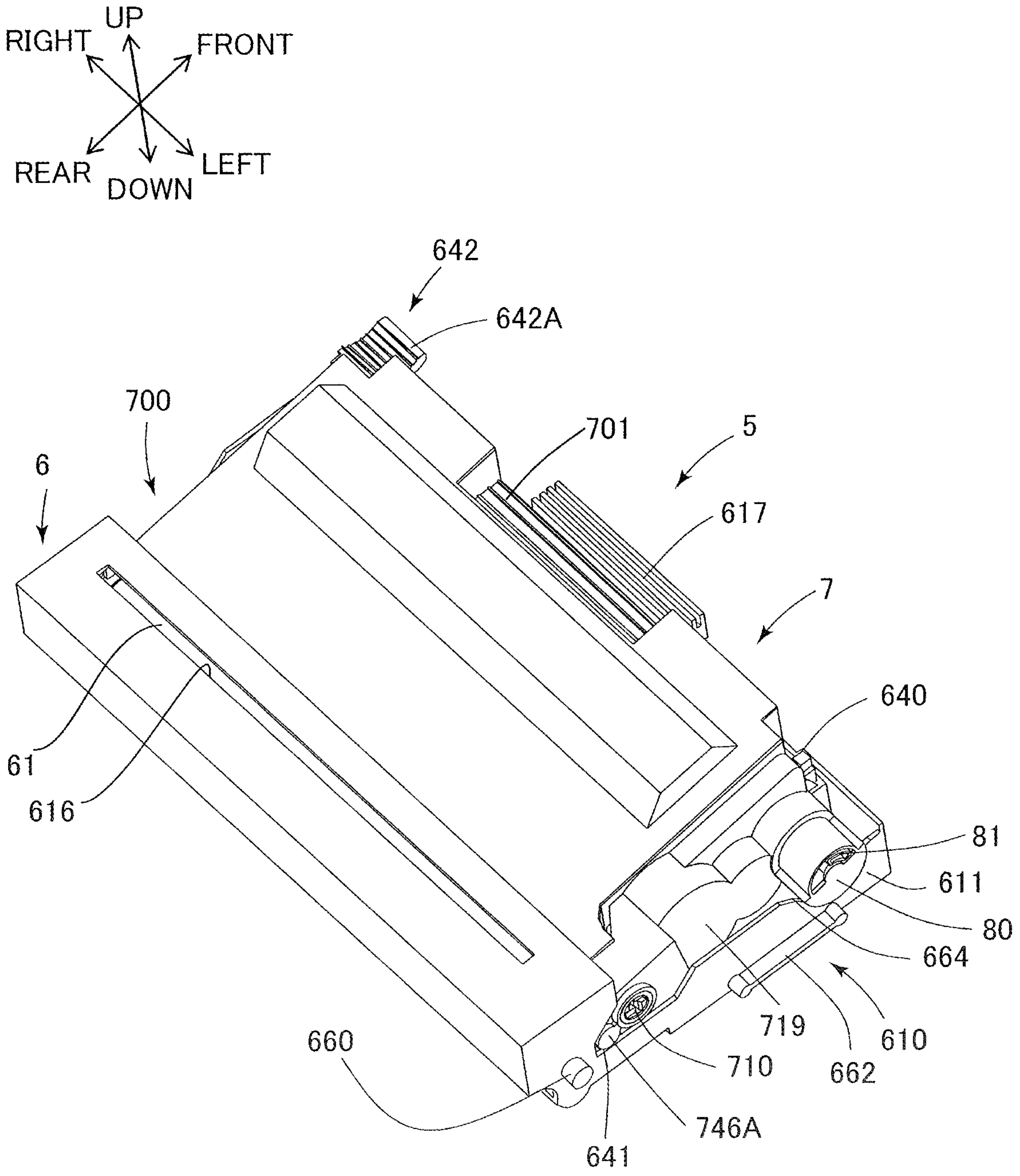
FIG. 11 is a perspective view illustrating the process cartridge.
Figure 14:
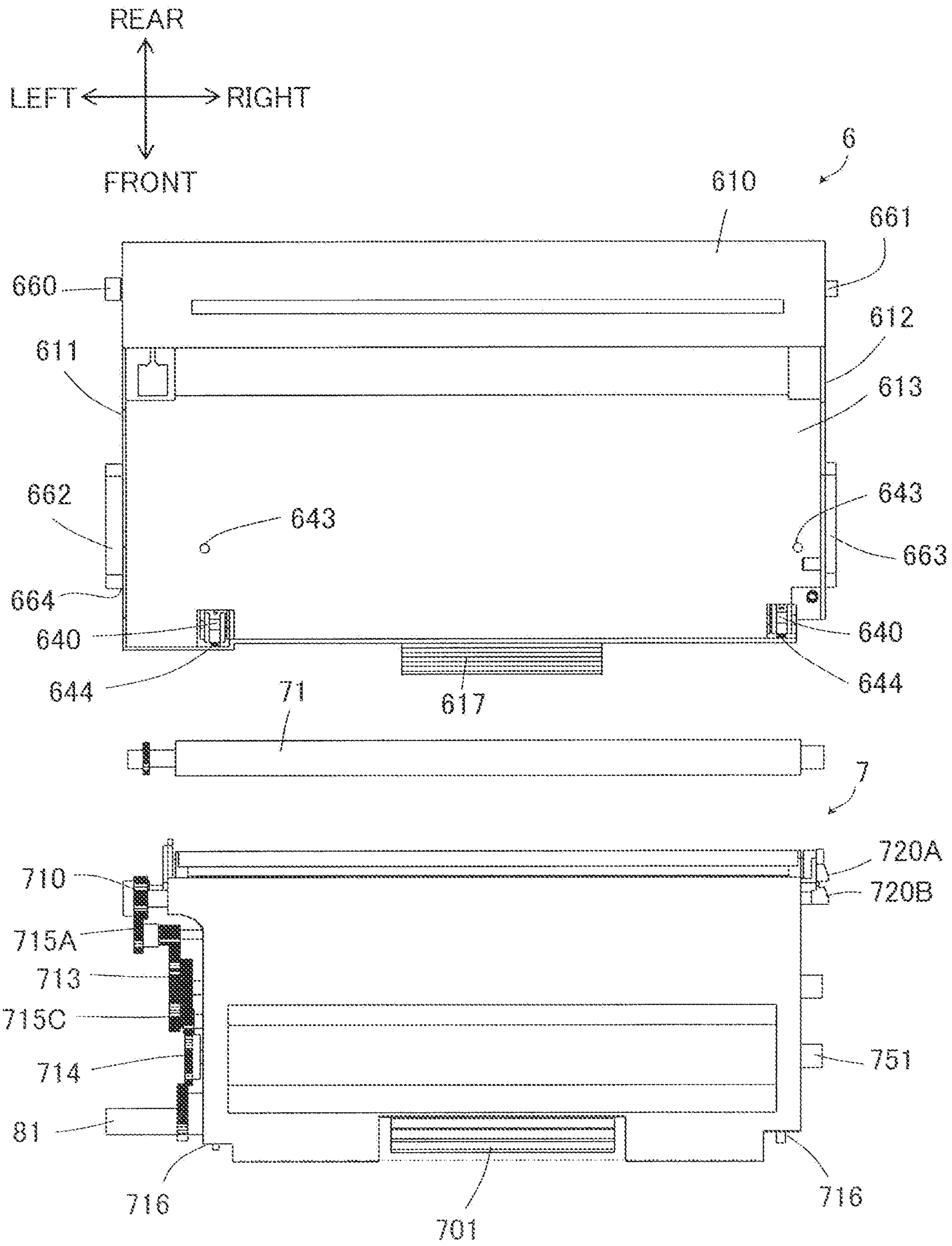
FIG. 14 is a plan view illustrating the drum unit and the development unit.

As illustrated in FIG. 2, FIG. 11, and FIG. 14, a concave portion 664 that is concaved downward and the first guide rib 662, serving as a rib, disposed bellow the concave portion 664 are provided in the left side wall 611 of the drum unit 6. At least a part of the first guide rib 662 overlaps the concave portion 664 in an insertion direction of the development unit 7 into the drum unit 6. The detection unit 80 and the detection protrusion 83 further protrude in a longitudinal direction, i.e. axial direction, than the left side wall 611 above the concave portion 664. Since the concave portion 664 is formed, stiffness of the left side wall 611 decreases. However, since the first guide rib 662 is provided at a position that is located on a downward side of the concave portion 664 and overlaps the concave portion 664 in the front-rear direction, the first guide rib 662 operates as a reinforcing member, and thus it is possible to reduce the decrease in stiffness of the left side wall 611.

By the way, an operational lifespan of the development unit 7 which is determined by a toner amount stored in the development unit 7 is set to be shorter than an operational lifespan of the drum unit 6 which is determined by the thickness of a photosensitive layer of the photosensitive drum 61. Accordingly, it is preferable to replace only the development unit 7 that has reached the end of the operational lifespan separately from the drum unit 6. In the case of replacing only the development unit 7, after opening the door 21 and taking out the process cartridge 5 from the inside of the apparatus body 2, only the development unit 7 is detached from the drum unit 6. In addition, a new development unit 7 is inserted in the mounting direction AD illustrated in FIG. 2 to assemble the development unit 7 to the drum unit 6. Then, the process cartridge 5 in which the development unit 7 and the drum unit 6 are integrated is mounted on the apparatus body 2. When the process cartridge 5 is mounted on the apparatus body 2, the first positioning protrusion 660, the second positioning protrusion 661, the first guide rib 662, and the second guide rib 663 are guided to a guide groove (not illustrated) of the apparatus body 2, and thus the process cartridge 5 is guided to a mounting position.

Figure 10:
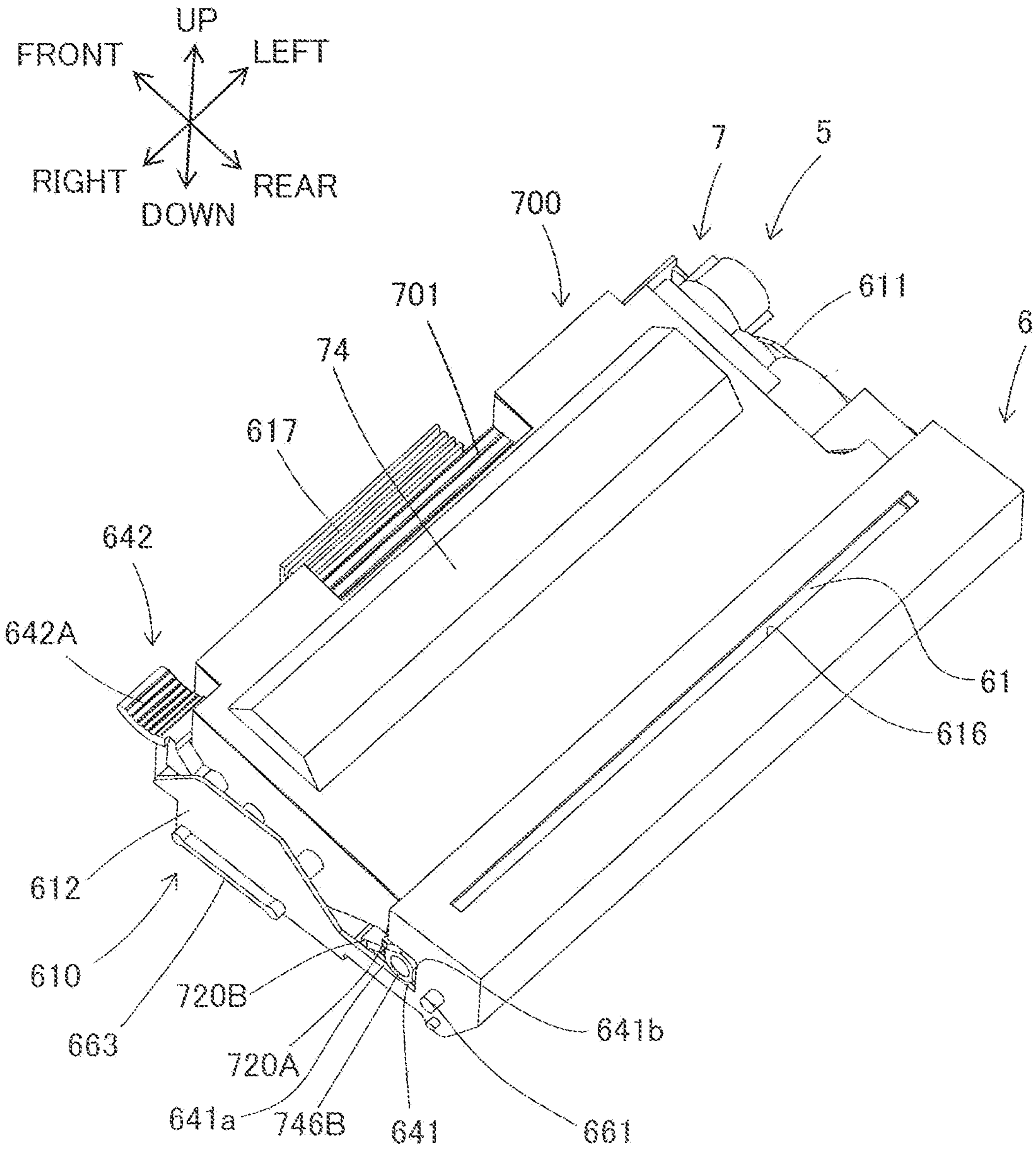
FIG. 10 is a perspective view illustrating the process cartridge.

As illustrated in FIG. 2, FIG. 10, and FIG. 11, a receiving portion 641 is formed in each of the left side wall 611 and the right side wall 612 of the frame 610, and the receiving portion 641 is configured to come into contact with a bearing 746A or 746B of the development unit 7. The receiving portion 641 serving as a contact portion is formed in a substantially U-shape of which a front side is opened, and includes a lower surface 641*a* that extends in the front-rear direction, and an abutting surface 641*b* that extends in the vertical direction (refer to FIG. 10).

Figure 12:
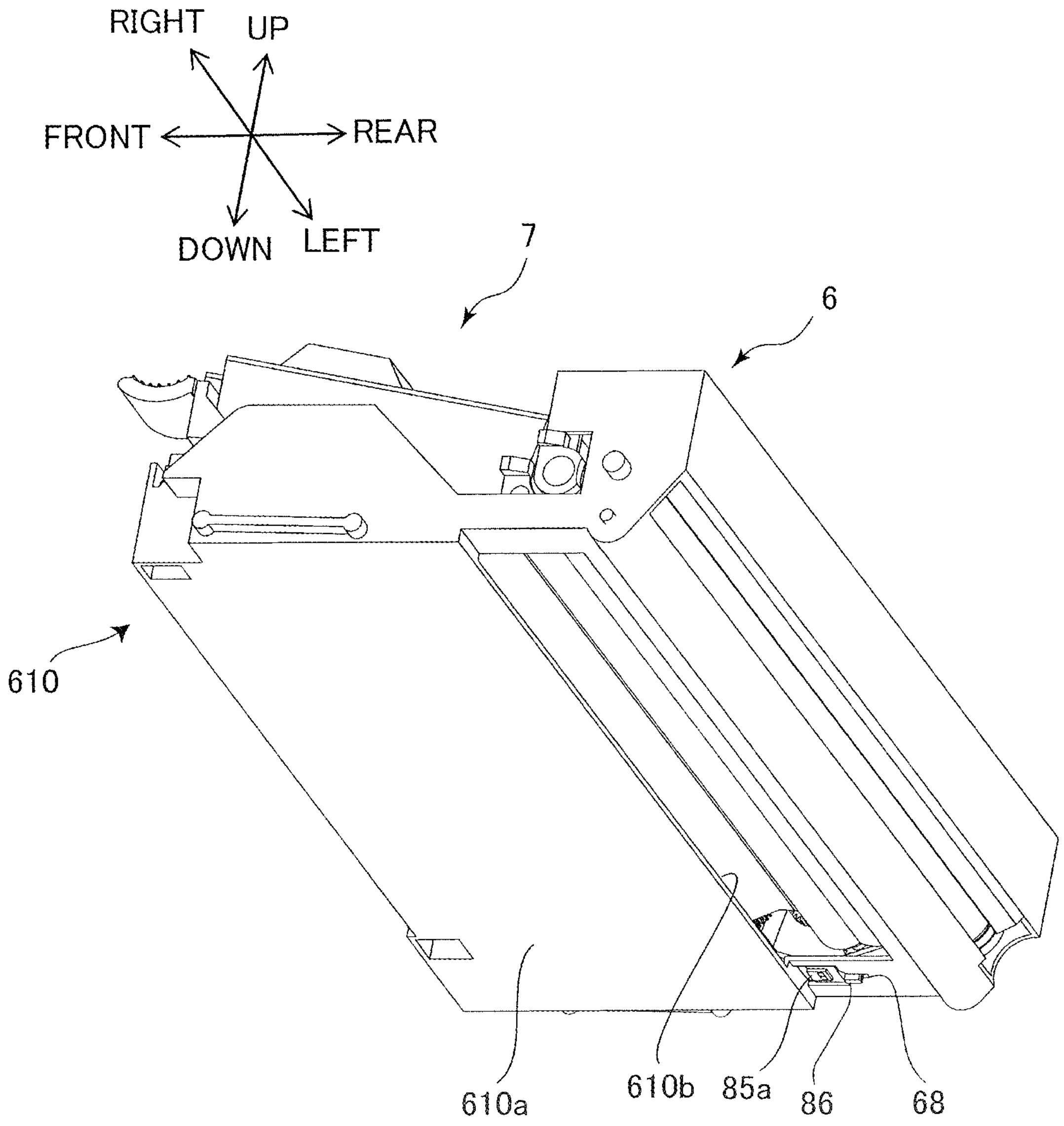
FIG. 12 is a perspective view illustrating the process cartridge.
Figure 13:
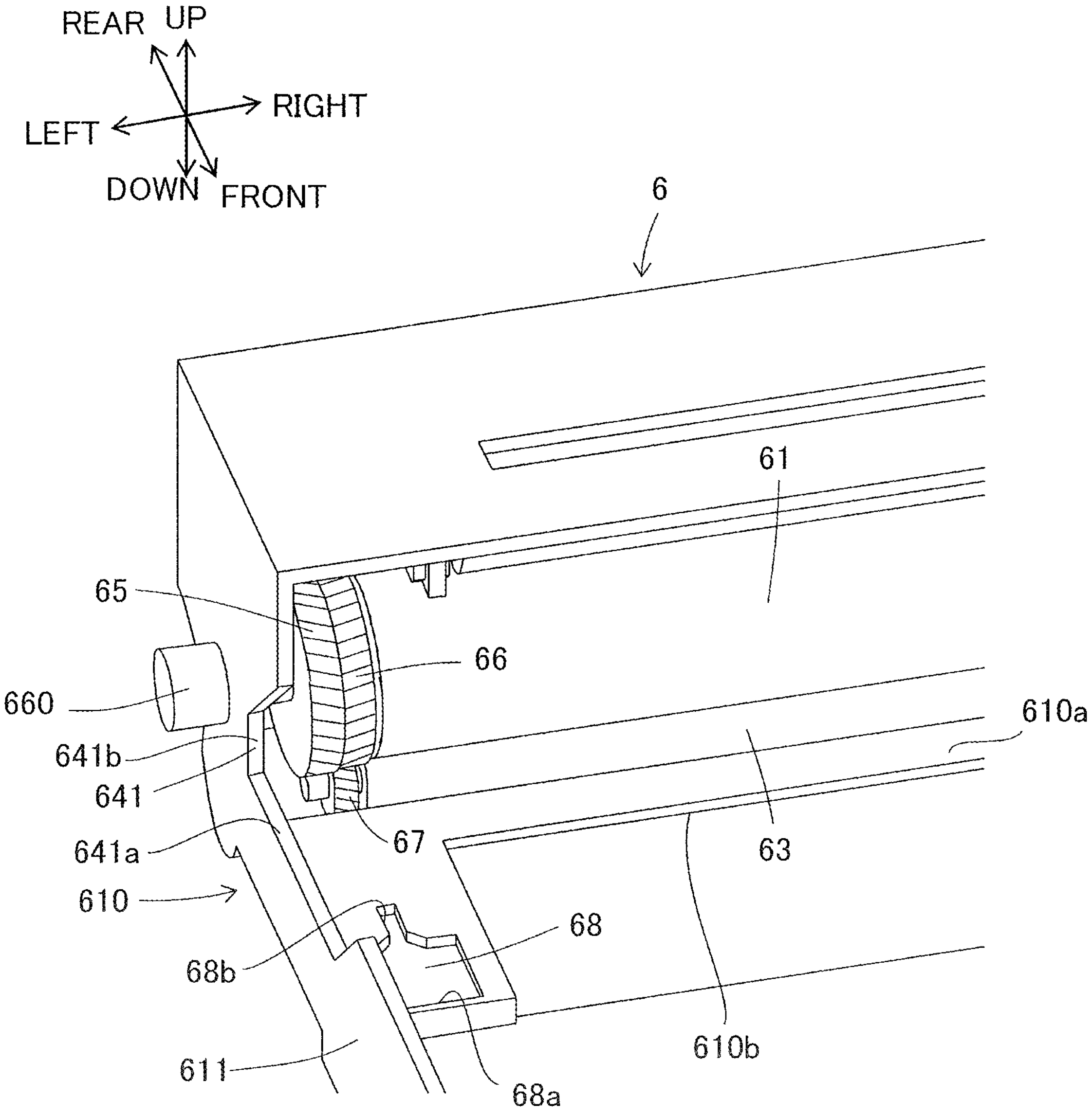
FIG. 13 is an enlarged perspective view illustrating an operation configuration of a photosensitive drum.

In addition, as illustrated in FIG. 2, FIG. 8, FIG. 9, and FIG. 12, a sheet passage hole 610*b* through which a sheet passes when being conveyed to the transfer nip N1, two protruding portions 643 and 643 which protrude upward, and a positioning hole 68 are formed in the bottom surface 610*a* of the frame 610. The protruding portions 643 and 643 respectively come into contact with the pair of ribs 718 and 718 formed on the bottom surface of the development unit 7 to support the development unit 7. As illustrated in FIG. 12 and FIG. 13, the positioning hole 68 is provided on a leftward side of the sheet passage hole 610*b*, and is formed by an electrode exposing hole 68*a* and an engagement hole 68*b*.

The electrode exposing hole 68*a* is configured to expose the memory electrode 85*a* to a downward side of the drum unit 6 in a state in which the development unit 7 is mounted on the drum unit 6 so as to allow the memory electrode 85*a* to come into contact with an electrode (not illustrated) provided in the apparatus body 2. That is, the electrode exposing hole 68*a* serving as an opening portion and a hole exposes the memory electrode 85*a* of the memory 85 to the outside. The engagement hole 68*b* is formed in dimensions smaller than that of the electrode exposing hole 68*a* in the right-left direction, and engages with the positioning protrusion 86 of the development unit 7 in the right-left direction in a state in which the development unit 7 is mounted on the drum unit 6.

As illustrated in FIG. 13, a first photosensitive member gear 65 and a second photosensitive member gear 66 are provided in a left end of the photosensitive drum 61, and a transfer gear 67 that engages with the second photosensitive member gear 66 is provided in a left end of the transfer roller 63. When the process cartridge 5 including the drum unit 6 is mounted on the apparatus body 2, a drive gear provided in the apparatus body 2 engages with the first photosensitive member gear 65. In this state, when the drive gear rotates, the first photosensitive member gear 65 rotates by the drive gear, and the photosensitive drum 61 and the second photosensitive member gear 66 rotate integrally with the first photosensitive member gear 65. In addition, rotation of the second photosensitive member gear 66 is transmitted to the transfer gear 67, and the transfer roller 63 rotates integrally with the transfer gear 67.

Figure 15A:
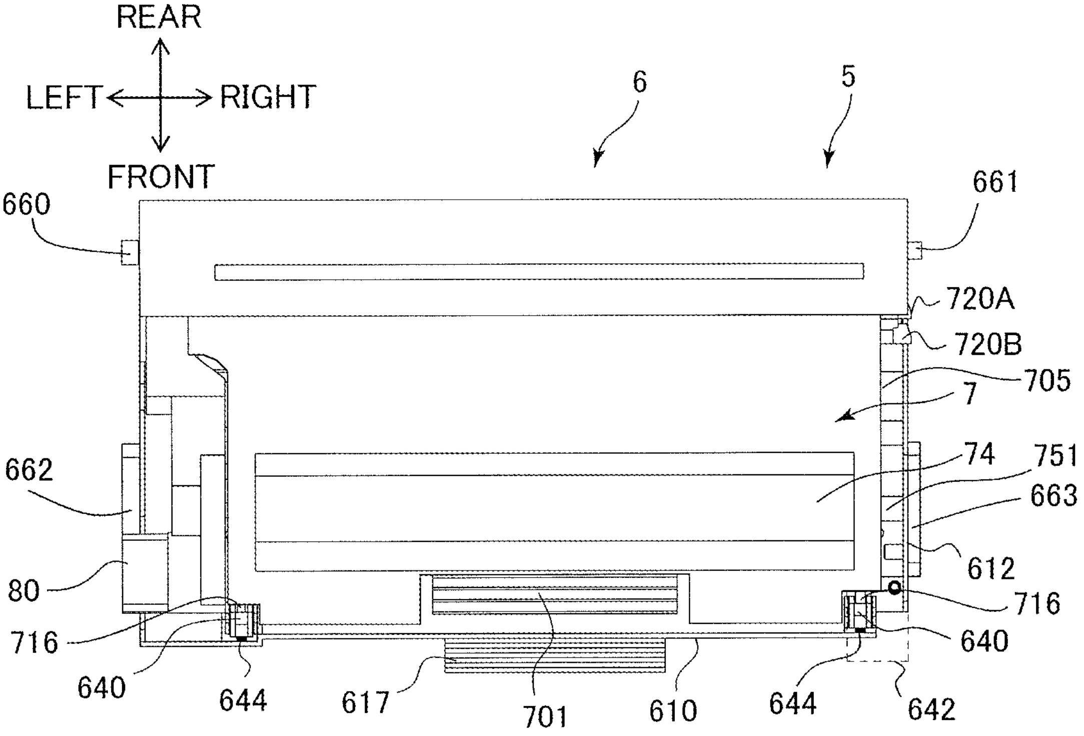
FIG. 15A is a plan view illustrating a pressing member and a lift member, the lift member being indicated by a broken line.
Figure 15B:
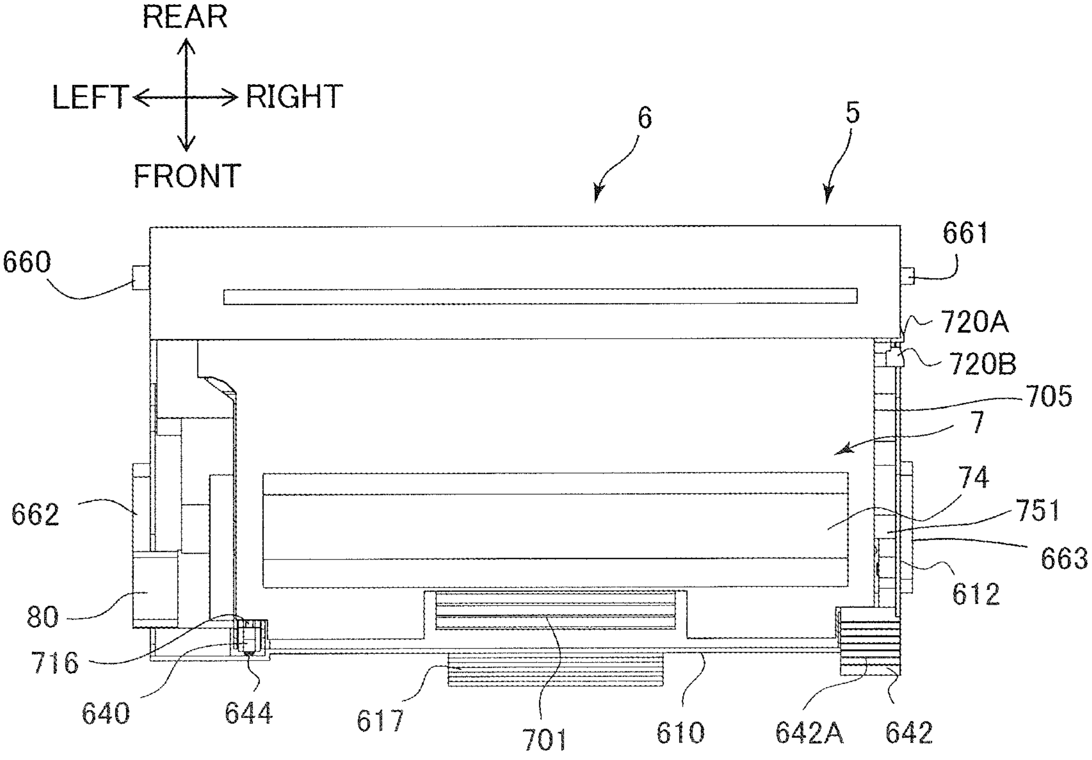
FIG. 15B is a plan view illustrating the pressing member and the lift member, the lift member being indicated by a solid line.

In addition, as illustrated in FIG. 14, FIG. 15A, and FIG. 15B, the pair of pressing members 640 is provided on a front portion of the frame 610 of the drum unit 6. The pressing members 640 are urged to a forward side by urging springs 644, and press a pair of pressed ribs 716 which is provided in the casing 700 of the development unit 7 in a state in which the development unit 7 is mounted on the drum unit 6. According to this, the development roller 71 of the development unit 7 is pressed against the photosensitive drum 61.

Note that, as illustrated in FIG. 14, the pair of left and right pressed ribs 716 is provided so that the pressed rib 716 which is disposed on the right side is disposed behind the pressed rib 716 which is disposed on the left side. The reason for this is because the lift member 642 to be described later is disposed to overlap the right pressed rib 716 in the right-left direction as illustrated in FIG. 15A and FIG. 15B so that the lift member 642 that is pivoted and the right pressed rib 716 do not interfere with each other. In this configuration, a rearward protrusion amount of the lift member 642 is suppressed, and thus it is possible to constitute the process cartridge 5 in a small size.

Since the drum unit 6 is configured as described above, when the development unit 7 is mounted on the drum unit 6 in the mounting direction AD as illustrated in FIG. 2, the bearings 746A and 746B of the development unit 7 are guided to the lower surface 641*a* of the receiving portion 641. In addition, when the development unit 7 is further mounted on the drum unit 6, the bearings 746A and 746B abut the abutting surface 641*b* of the receiving portion 641.

In this state, when a user separates a hand from the grip portion 701 of the development unit 7, the development unit 7 is supported by the protruding portions 643 and 643 formed on the bottom surface 610*a* of the drum unit 6 and is pressed forward by the pressing member 640. The bearings 746A and 746B of the development unit 7 are pressed against the abutting surface 641*b* due to an urging force of the urging spring 644 that presses the pressing member 640, and the development unit 7 is positioned with respect to the drum unit 6 in the front-rear direction. In combination with the positioning, the positioning protrusion 86 serving as a protruding portion of the development unit 7 engages with the engagement hole 68*b* of the positioning hole 68, and thus the development unit 7 is positioned with respect to the drum unit 6 in the right-left direction.

The positioning protrusion 86 and the engagement hole 68*b* are provided downstream of the memory electrode 85*a* and the electrode exposing hole 68*a* in the mounting direction AD. According to this, when mounting the development unit 7 on the drum unit 6, it is possible to easily cause the positioning protrusion 86 to engage with the engagement hole 68*b* without causing the memory electrode 85*a* to come into contact with the drum unit 6. Accordingly, usability when mounting the development unit 7 on the drum unit 6 is improved, and breakage of the memory electrode 85*a* can be reduced.

Development Unit Detachment Configuration

Figure 16:
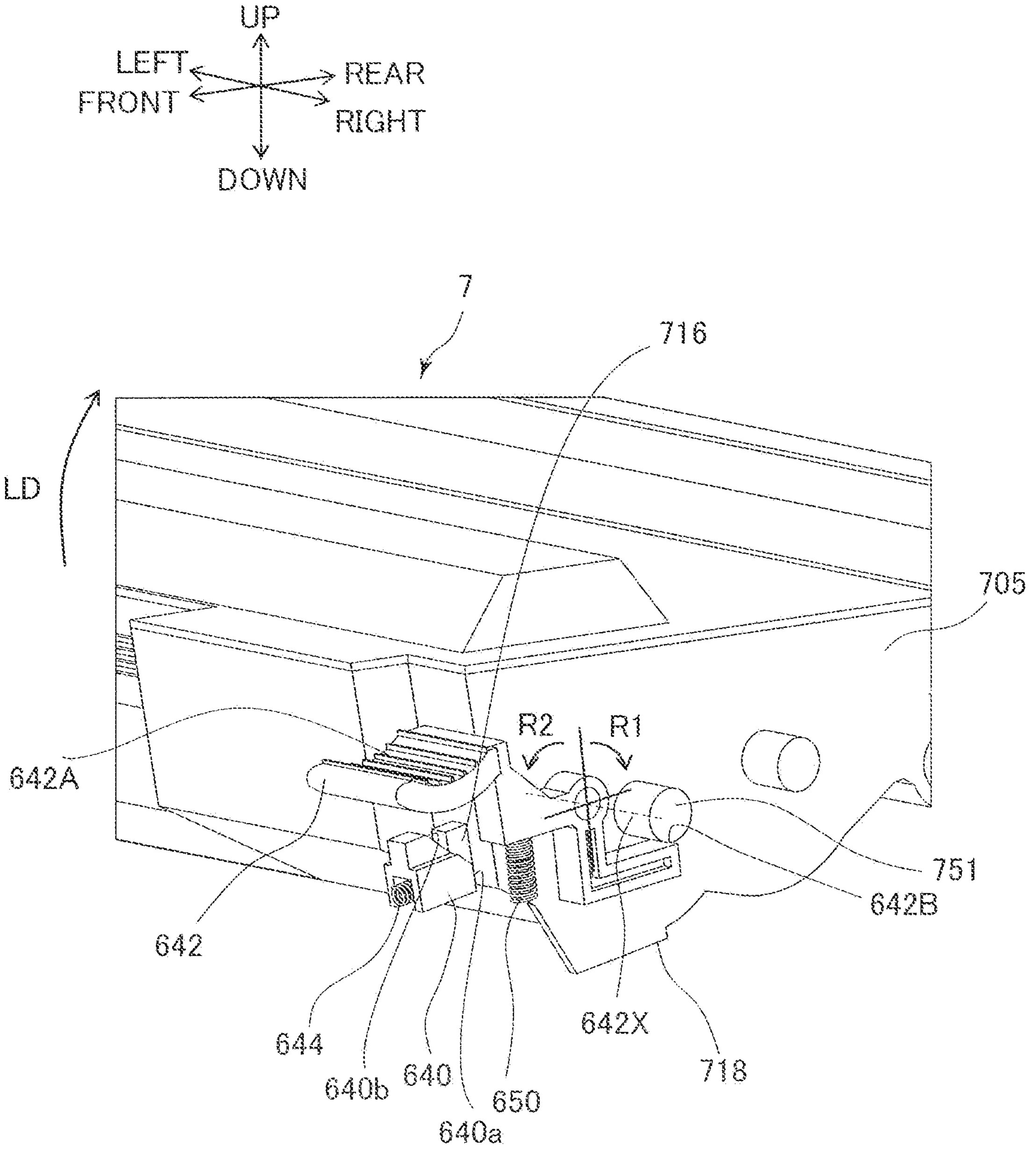
FIG. 16 is a perspective view illustrating the pressing member and the lift member.

Next, a configuration for detaching the development unit 7 from the drum unit 6 will be described. In FIG. 15A, the lift member 642 illustrated in FIG. 15B is indicated by a broken line. As illustrated in FIG. 15A to FIG. 16, the lift member 642 is provided in a leading edge portion and a right edge portion of the drum unit 6, and the lift member 642 is supported to the right side wall 612 of the drum unit 6 to be rotatable around the rotational axis 642X. The rotational axis 642X extends in parallel to the rotational axis direction of the photosensitive drum 61 and the development roller 71. The lift member 642 is urged by a compression spring 650 to rotate in a direction indicated by an arrow R1, and when an operation portion 642A provided in a first end portion of the lift member 642 is pressed downward, the lift member 642 pivots against an urging force of the compression spring 650 in a direction indicated by an arrow R2.

A cylindrical protruding portion 751 that protrudes to a rightward side is provided in the right side wall 705 of the development unit 7, and a contact portion 642B that can come into contact with the protruding portion 751 is provided in a second end portion of the lift member 642. The contact portion 642B is provided on a side opposite to the operation portion 642A with the rotational axis 642X interposed therebetween.

By the way, as illustrated in FIG. 8, and FIG. 16 to FIG. 17B, the pressing member 640 includes a pressing surface 640*a* that is provided on a front surface of the pressing member 640 and extends in a vertical direction, and an inclined surface 640*b* that is inclined upward from an upper end of the pressing surface 640*a* to a rearward side. The pressed rib 716 in the development unit 7 includes a pressed surface 716*a* which is pressed forward by the pressing surface 640*a*, and an inclined surface 716*b* that is inclined downward from a lower end of the pressed surface 716*a* toward a forward side.

Figure 17A:
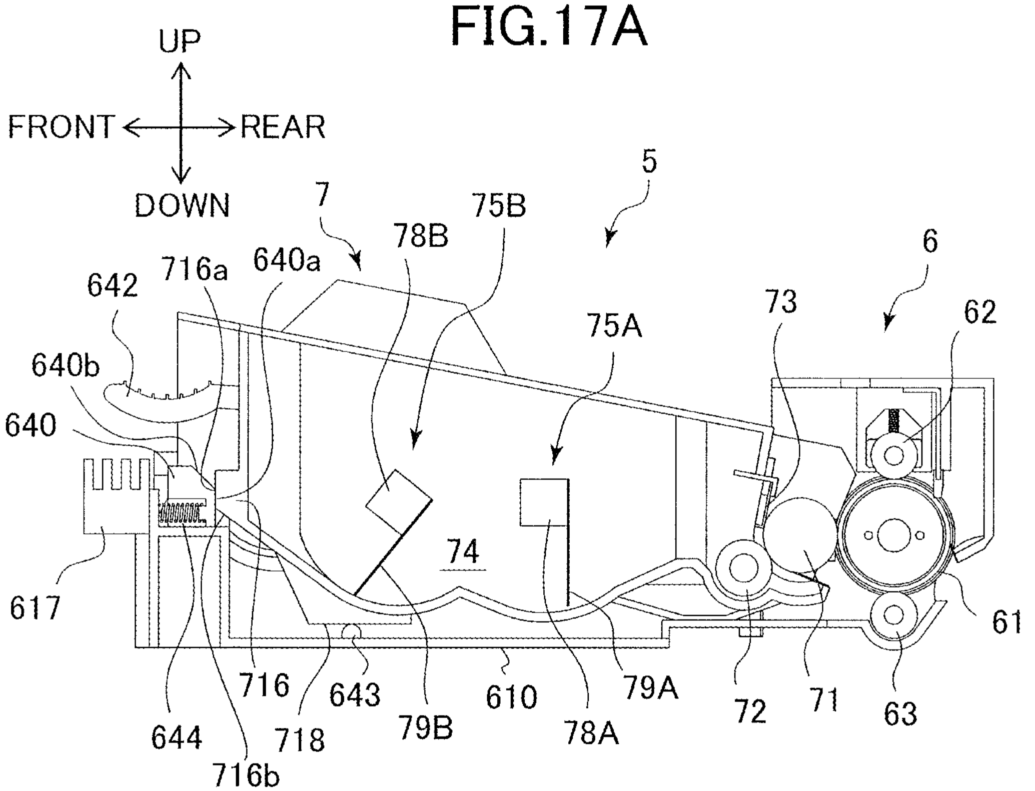
FIG. 17A is a cross-sectional view illustrating a state in which the development unit is mounted on the drum unit.

As illustrated in FIG. 17A, in a state in which the development unit 7 is mounted on the drum unit 6, the pressing surface 640*a* of the pressing member 640 that is urged by the urging spring 644 presses the pressed surface 716*a* in the pressed rib 716 in the development unit 7. At this time, the pressing surface 640*a* and the pressed surface 716*a* extend in a substantially vertical direction, and thus an urging force of the urging spring 644 vertically operates on the pressed surface 716*a*, and the development unit 7 is urged to the front direction. According to this, the development unit 7 is locked at a mounting position so as not to be detached from the drum unit 6.

Figure 17B:
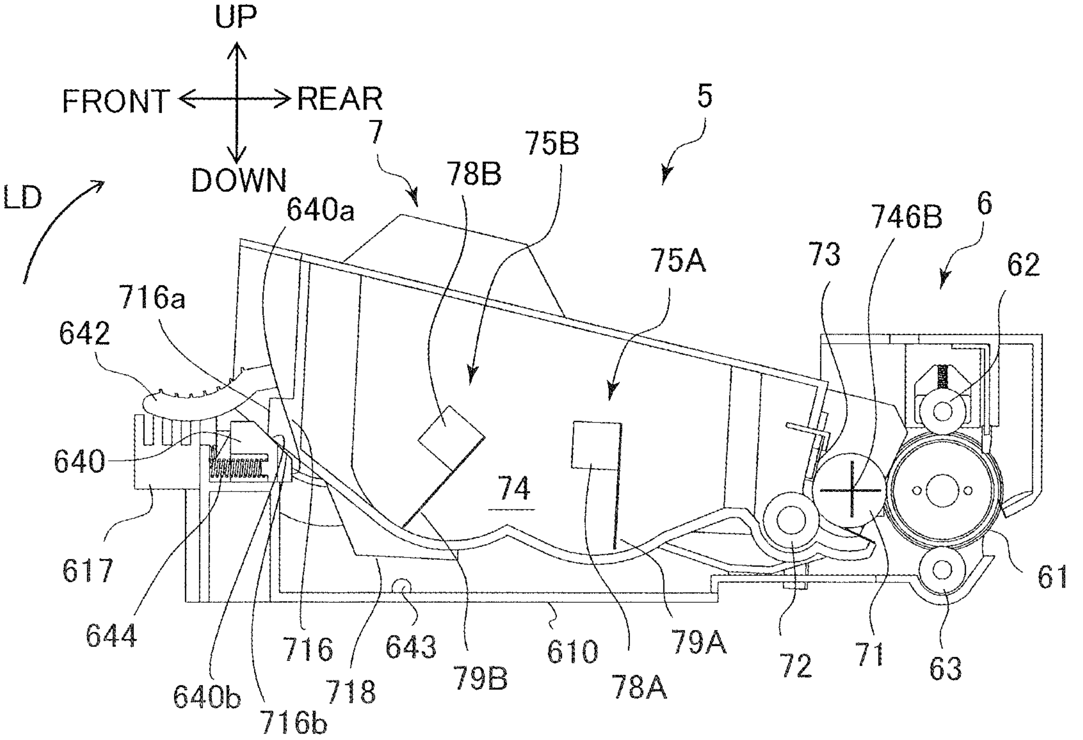
FIG. 17B is a cross-sectional view illustrating the development unit that enters a lift-up state by the lift member.

As illustrated in FIG. 16, when the operation portion 642A of the lift member 642 is pressed downward, the lift member 642 rotates in a direction indicated by an arrow R2, and the contact portion 642B of the lift member 642 lifts up the protruding portion 751 of the development unit 7 to an upward side. According to this, as illustrated in FIG. 17B, a front direction of the development unit 7 mounted on the drum unit 6 pivots upward, and the development unit 7 pivots in a detachment direction LD from the mounting position. According to this, the pressed surface 716*a* in the development unit 7 is separated upward from the pressing surface 640*a*, and the inclined surface 716*b* of the development unit 7 rides on the inclined surface 640*b* of the pressing member 640.

At this time, the bearings 746A and 746B of the development unit 7 are in a state of being supported by the receiving portions 641 and 641. A state of the development unit 7 at this time is referred to as a lift-up state, and a position of the development unit 7 that enters the lift-up state is referred to as a detachment position. When the development unit 7 is in the lift-up state, the inclined surfaces 640*b* and 716*b* are inclined with respect to the front direction that is an urging direction of the pressing member 640. That is, when the development unit 7 is pivoted in the detachment direction LD by the lift member 642, the pressed surface 716*a* in the development unit 7 is separated upward from the pressing surface 640*a*. In this case, the inclined surface 716*b* of the development unit 7 can be lifted upward by the inclined surface 640*b* of the pressing member 640 that is urged forward by the urging spring 644, and thus the development unit 7 further pivots in the detachment direction LD by the urging force of the urging spring 644. According to this, it is possible to reduce an operation force for setting the development unit 7 to the lift-up state.

When the development unit 7 enters the lift-up state, most of the forward urging force of the urging spring 644 is converted as a substantially upward force by the inclined surfaces 640*b* and 716*b*, and thus the development unit 7 is not locked to the drum unit 6. According to this, a user can detach the development unit 7 from the drum unit 6 only by lifting up the grip portion 701 of the development unit 7 without moving other members or the like. In this manner, the user can mount a new development unit 7 on the drum unit 6 after detaching the drum unit 6 from the development unit 7.

Summary of First Embodiment

In the process cartridge 5 in which the development unit 7 is detachably provided in the drum unit 6, when the memory electrode 85*a* of the memory 85 provided in the development unit 7 is abraded, a contact state between the memory electrode 85*a* and the electrode of the apparatus body 2 becomes unstable. Particularly, when the memory electrode 85*a* is disposed near the lift member 642 for detaching the development unit 7 from the drum unit 6, an amount of displacement between the memory electrode 85*a* and the electrode of the apparatus body 2 tends to increase in accordance with an operation of the lift member 642.

Here, in this embodiment, in the longitudinal direction, i.e. axial direction, of the photosensitive drum 61 serving as the image bearing member, the lift member 642 serving as the moving member is disposed on a first side of the process cartridge 5, and the memory electrode 85*a* of the memory 85 serving as a storage unit is disposed on a second side. More specifically, the lift member 642 is disposed on the right side of the process cartridge 5, and the memory electrode 85*a* serving as an electrode is disposed on the left side of the process cartridge 5.

According to this, when detaching the development unit 7 from the drum unit 6 by pressing the lift member 642 to a downward side, it is possible to reduce a displacement between the memory electrode 85*a* and the electrode of the apparatus body 2. According to this, abrasion of the memory electrode 85*a* is suppressed, and thus it is possible to stabilize a contact state between the memory electrode 85*a* and the electrode of the apparatus body 2.

In addition, the detection protrusion 83 is disposed on the second side of the process cartridge 5 on a side opposite to the lift member 642, that is, on the left side in the longitudinal direction, i.e. axial direction, of the photosensitive drum 61. According to this, by enlarging the size of the lift member 642 and raising the part stiffness, a user's operation is made to be easy, and the lift member 642 becomes hardly to be bent. When the lift member 642 is bent, the displacement amount between the memory electrode 85*a* and the electrode of the apparatus body 2 increases. However, abrasion of the memory electrode 85*a* can be suppressed by suppressing bending of the lift member 642.

In addition, at least a part of the detection protrusion 83 overlaps the lift member 642 when viewed in a longitudinal direction of the photosensitive drum 61. According to this, the size of the process cartridge 5 is not enlarged, and thus it is possible to dispose the lift member 642 at a position where a user's operation is easy.

In addition, the concave portion 664 is provided in the left side wall 611 of the drum unit 6 in order for the detection unit 80 and the detection protrusion 83 to protrude in the longitudinal direction. When the concave portion 664 is formed, stiffness of the left side wall 611 decreases. However, since the first guide rib 662 is provided at a position that is located bellow the concave portion 664 and overlaps the concave portion 664 in the front-rear direction, the first guide rib 662 operates as a reinforcing member, and thus it is possible to reduce the decrease in stiffness of the left side wall 611.

Note that, the lift member 642 may be disposed on the left side of the process cartridge 5, and the memory electrode 85*a* may be disposed on the right side of the process cartridge 5. In addition, the detection protrusion 83 may be disposed on the same side as in the lift member 642.

Second Embodiment

Next, a second embodiment of the invention will be described. In the second embodiment, the positioning protrusion 86 of the first embodiment is disposed at a different position. Accordingly, illustration of the same configuration as in the first embodiment will be omitted, or the same reference numeral will be given to the same configuration in the following description.

Figure 18:
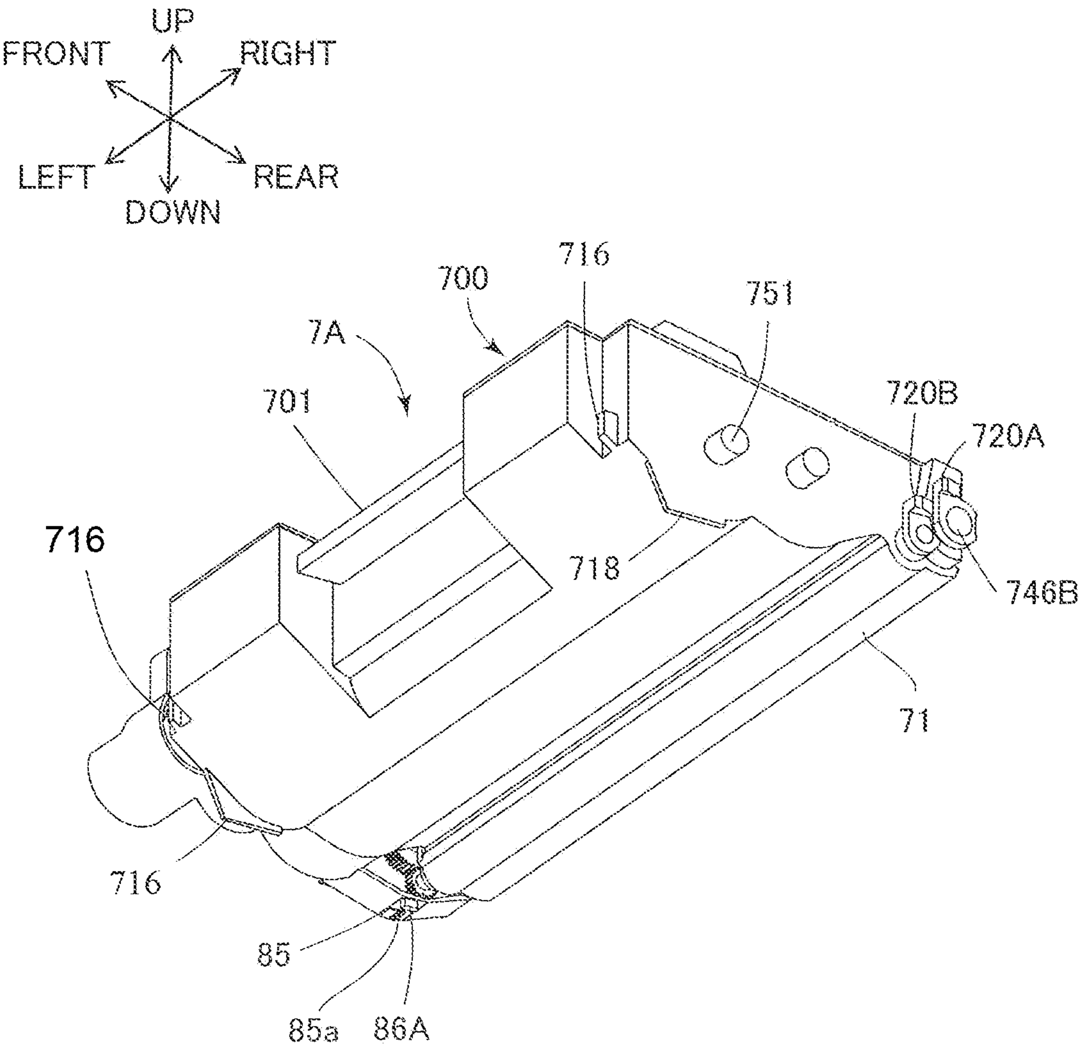
FIG. 18 is a perspective view illustrating a memory and a positioning protrusion of a development unit according to a second embodiment.

As illustrated in FIG. 18, in a development unit 7A according to this embodiment, the positioning protrusion 86A protrudes downward from the bottom surface, and the memory 85 is disposed in a left direction of the positioning protrusion 86A serving as a protruding portion. The memory 85 includes a memory chip (not illustrated) that stores information about the development unit 7A, and a memory electrode 85*a* that is electrically connected to the memory chip.

Figure 19:
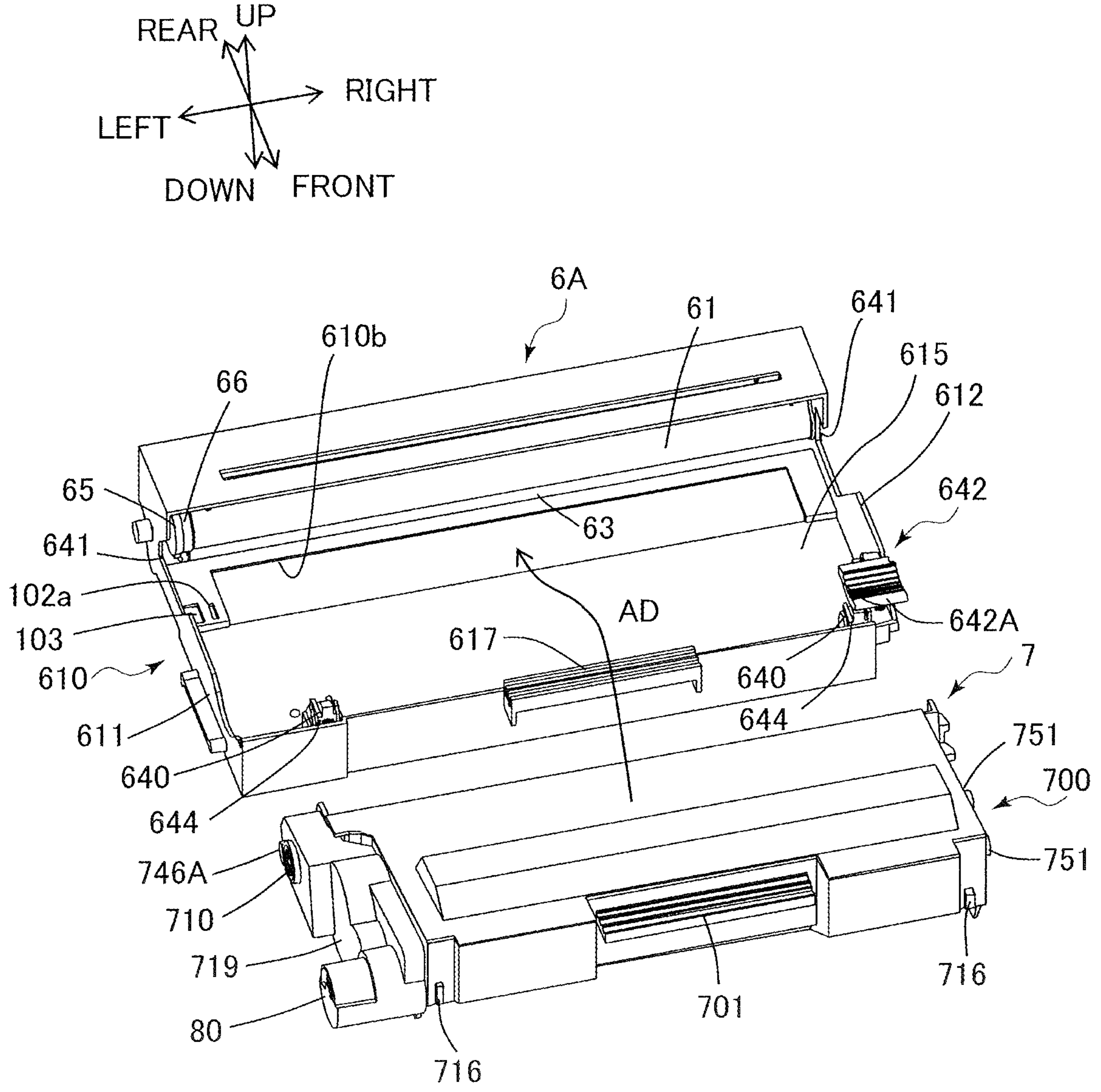
FIG. 19 is a perspective view illustrating the drum unit and the development unit.

In the drum unit 6A, as illustrated in FIG. 19, an engagement hole 102*a* and an electrode exposing hole 103 which are provided to be adjacent in the axial direction, i.e. right-left direction, are formed. The engagement hole 102*a* is configured so that the positioning protrusion 86A engages with the engagement hole 102*a* in the right-left direction, and the development unit 7A can be positioned with respect to the drum unit 6A in the right-left direction. In a state in which the development unit 7A is mounted on the drum unit 6A, the electrode exposing hole 103 exposes the memory electrode 85*a* to a downward side of the drum unit 6A so that the memory electrode 85*a* can come into contact with an electrode (not illustrated) provided in the apparatus body 2.

In contact between the memory electrode 85*a* and the electrode provided in the apparatus body 2, high positional accuracy is required from the viewpoints of stabilization of an electrode contact situation in communication or mutual abrasion of the electrodes. Accordingly, it is preferable that the positioning mechanism of the development unit 7A with respect to the drum unit 6A is provided at a position close to the memory 85. As in the first embodiment, positioning of the development unit 7A with respect to the drum unit 6A in the front-rear direction is performed when the bearings 746A and 746B of the development unit 7A come into press contact with the receiving portions 641 and 641 of the drum unit 6A.

Figure 20:
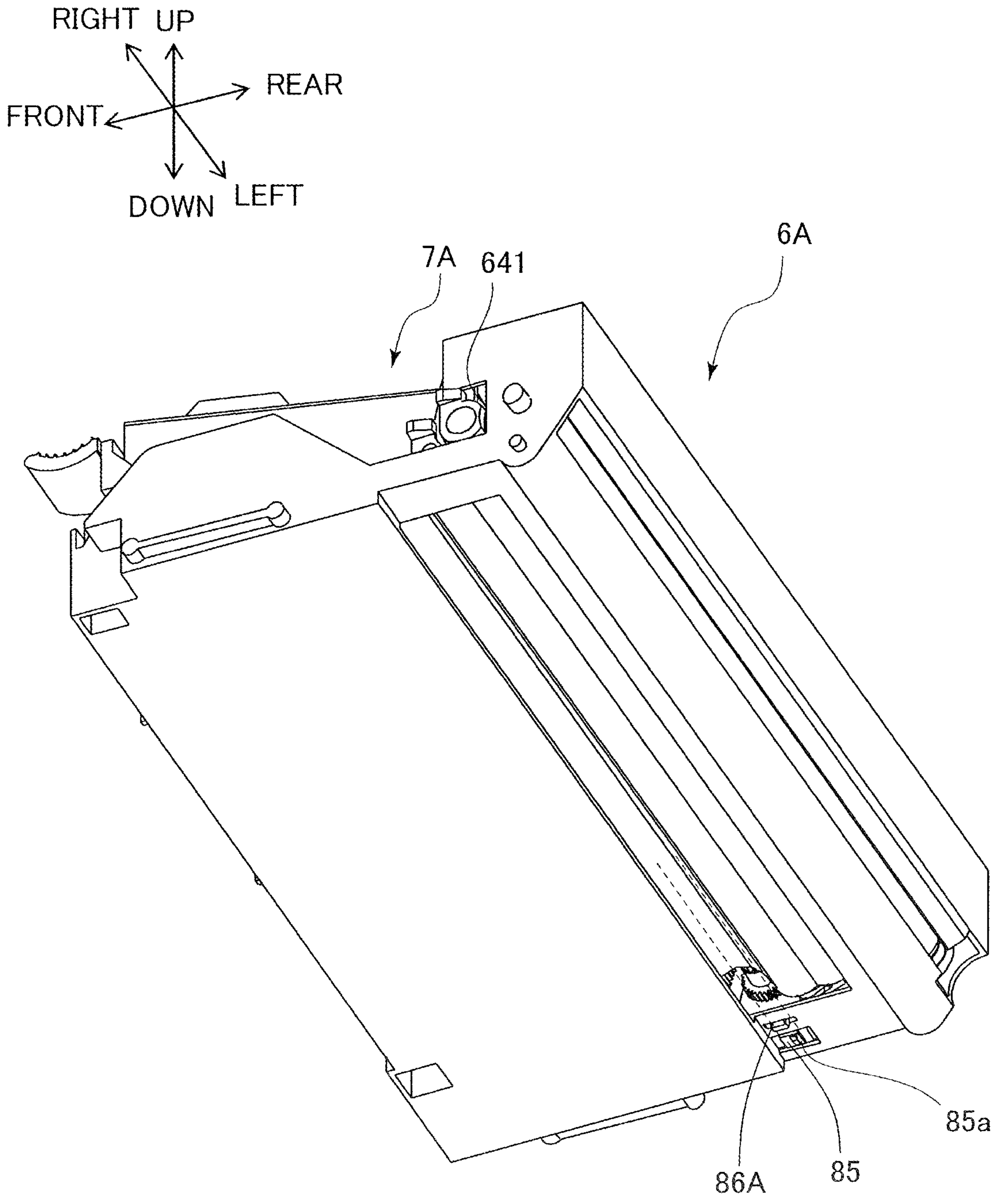
FIG. 20 is a perspective view illustrating an arrangement relationship between a memory electrode and the positioning protrusion.

In this embodiment, to improve positional accuracy between the memory electrode 85*a* and the electrode provided in the apparatus body 2 in the right-left direction, as illustrated in FIG. 20, the positioning protrusion 86A is disposed so that at least a part overlaps the memory electrode 85*a* in the front-rear direction. In other words, when viewed in the axial direction, the positioning protrusion 86A is disposed so that at least a part overlaps the memory electrode 85*a* in the front-rear direction.

In addition, in this embodiment, in a state in which the development unit 7A is mounted on the drum unit 6A, the positioning protrusion 86A is disposed on a front side of the drum unit 6A. The receiving portion 641 that performs positioning of the development unit 7A in the front-rear direction is also disposed on a front side of the drum unit 6A. As described above, when the receiving portion 641 of the drum unit 6A and the memory electrode 85*a* are disposed to be adjacent to each other, the positioning accuracy of the memory electrode 85*a* can be further improved.

Figure 21:
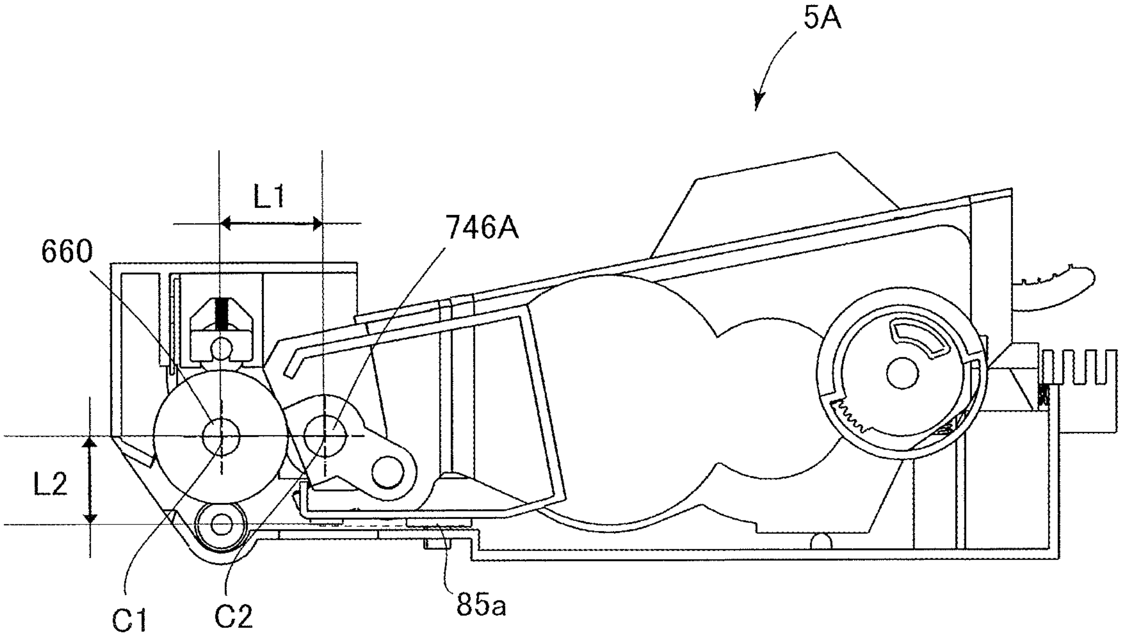
FIG. 21 is a cross-sectional view illustrating a preferred configuration for suppressing a displacement of the memory electrode.

In addition, as illustrated in FIG. 21, it is preferable that the process cartridge 5A is configured so that a distance L2 is shorter than a distance L1. The distance L1 is a distance between the central line C1 of the first positioning protrusion 660 of the drum unit 6A and the central line C2 of the bearing 746A, and the distance L2 is a distance between the central line C1 and the memory electrode 85*a* in the upper-lower direction. When the process cartridge 5A is configured as described above, it is possible to suppress a displacement of the memory electrode 85*a* with respect to swinging of the drum unit 6A for the apparatus body 2, and swinging of the development unit 7A for the drum unit 6A. That is, a fluctuation of a contact position between the memory electrode 85*a* and the electrode of the apparatus body 2 in the front-rear direction and a contact direction is suppressed, a contact state between the memory electrode 85*a* and the electrode of the apparatus body 2 is stabilized, and abrasion of electrodes is suppressed.

Figure 22:
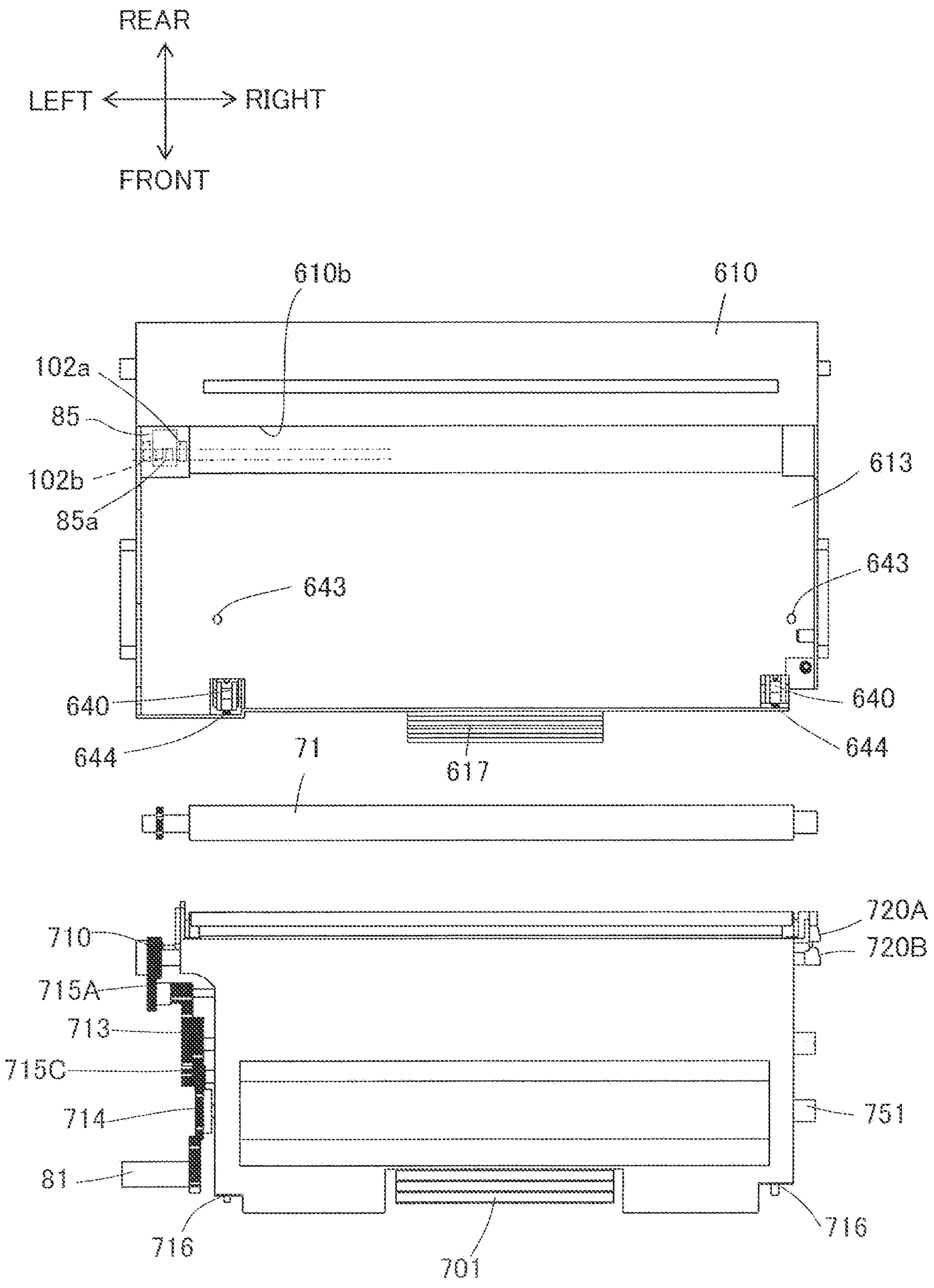
FIG. 22 is a plan view illustrating an arrangement relationship between the memory electrode and the positioning protrusion.

Note that, when the development unit 7A is mounted on the drum unit 6A, the positioning protrusion 86A is disposed at a position illustrated in the engagement hole 102*a* in FIG. 22. In this embodiment, the positioning protrusion 86A and the engagement hole 102*a* are located on a further rightward than the memory electrode 85*a* and the electrode exposing hole 103, but the position of the positioning protrusion 86A and the engagement hole 102*a* is not limited thereto. For example, as illustrated by a position 102*b* of FIG. 22, the positioning protrusion 86A and the engagement hole 102*a* may be disposed on a further leftward than the memory electrode 85*a* and the electrode exposing hole 103. On the other hand, when the positioning protrusion 86A and the engagement hole 102*a* are disposed on a further rightward than the memory electrode 85*a* and the electrode exposing hole 103, the positioning protrusion 86A is located at a position closer to the sheet passage hole 610*b* than the memory electrode 85*a*. According to this, it is possible to regulate entrance of a sheet that passes through the sheet passage hole 610*b* to a contact between the memory electrode 85*a* and the electrode on the apparatus body 2 side by the positioning protrusion 86A, and a contact state of electrodes can be stabilized.

In addition, a configuration for positioning the development unit 7A to the drum unit 6A is not limited to the above-described positioning protrusion 86A and the engagement hole 102*a*. For example, the engagement hole may be provided in the development unit 7A and the positioning protrusion may be provided in the drum unit.

Summary of Second Embodiment

Recently, in contact between the memory electrode 85*a* and the electrode provided in the apparatus body 2, high positional accuracy is required from the viewpoints of stabilization of an electrode contact situation in communication or mutual abrasion of the electrodes. Here, in this embodiment, the positioning protrusion 86A is disposed so that at least a part of the positioning protrusion 86A overlaps the memory electrode 85*a* in the front-rear direction, that is, in a direction orthogonal to the longitudinal direction, i.e. axial direction, of the photosensitive drum 61. In other words, when viewed in the axial direction, the positioning protrusion 86A is disposed so that at least apart overlaps the memory electrode 85*a* in the front-rear direction.

According to this, a fluctuation of a contact position between the memory electrode 85*a* and the electrode of the apparatus body 2 in the front-rear direction and a contact direction is suppressed, a contact state between the memory electrode 85*a* and the electrode of the apparatus body 2 is stabilized, and abrasion of electrodes is suppressed.

Third Embodiment

Next, a third embodiment of the invention will be described. In the third embodiment, arrangement of the pressing member, the memory, and the electrode exposing hole is changed from the arrangement in the first embodiment. According to this, illustration of the same configuration as in the first embodiment will be omitted, or the same reference numeral will be given to the same configuration in the following description.

Figure 23:
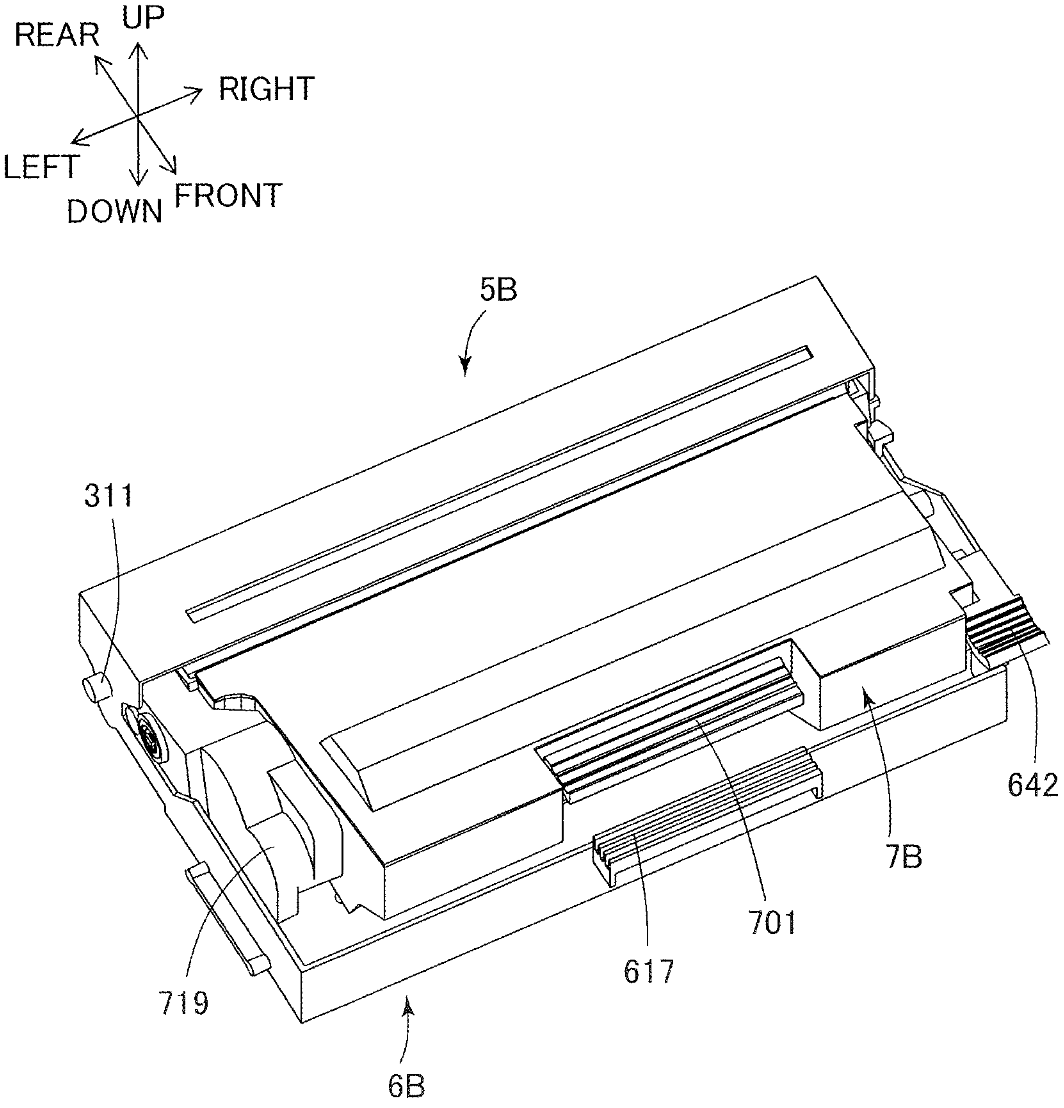
FIG. 23 is a perspective view illustrating a process cartridge according to a third embodiment.
Figure 24:
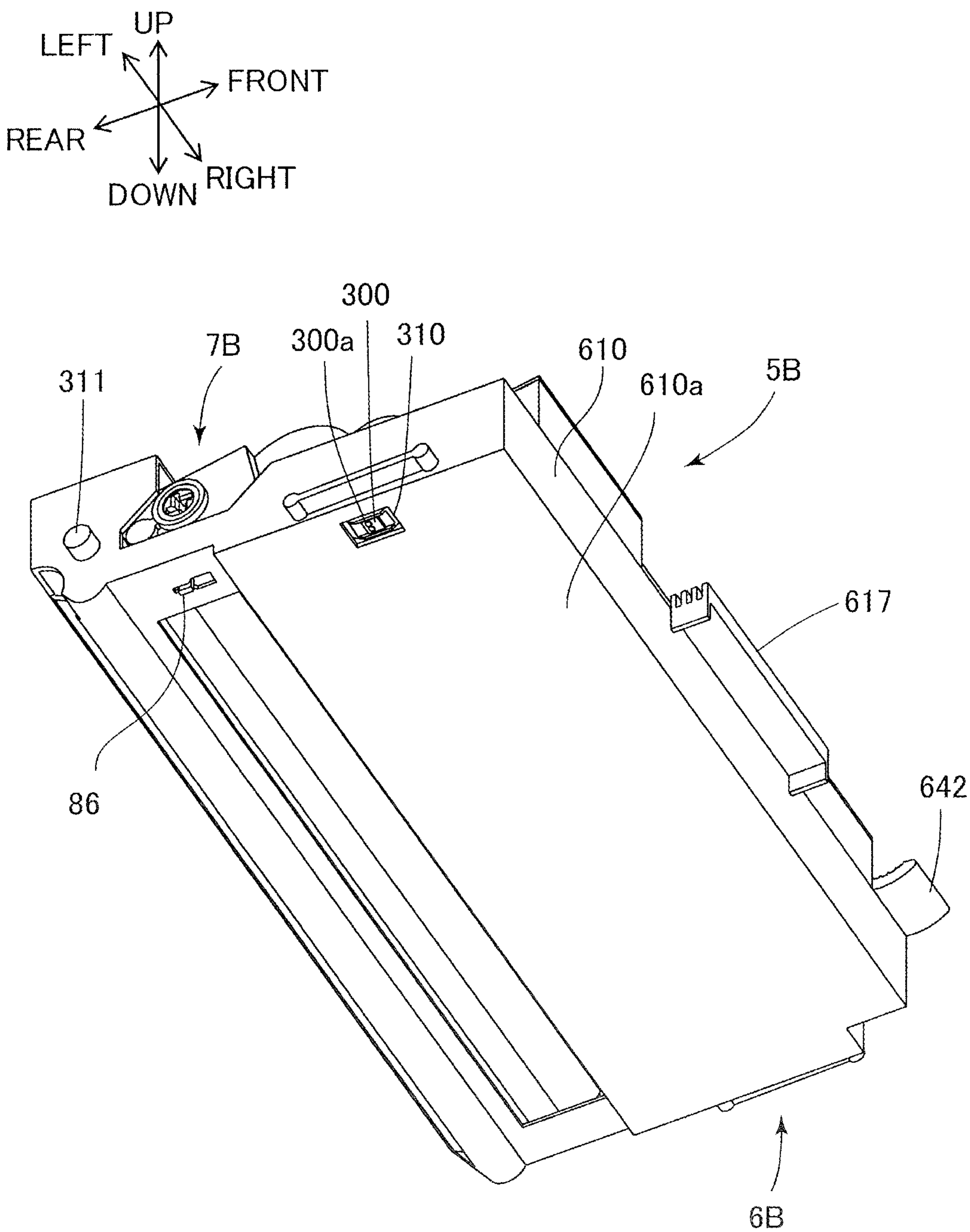
FIG. 24 is a perspective view illustrating arrangement of the memory electrode.
Figure 25:
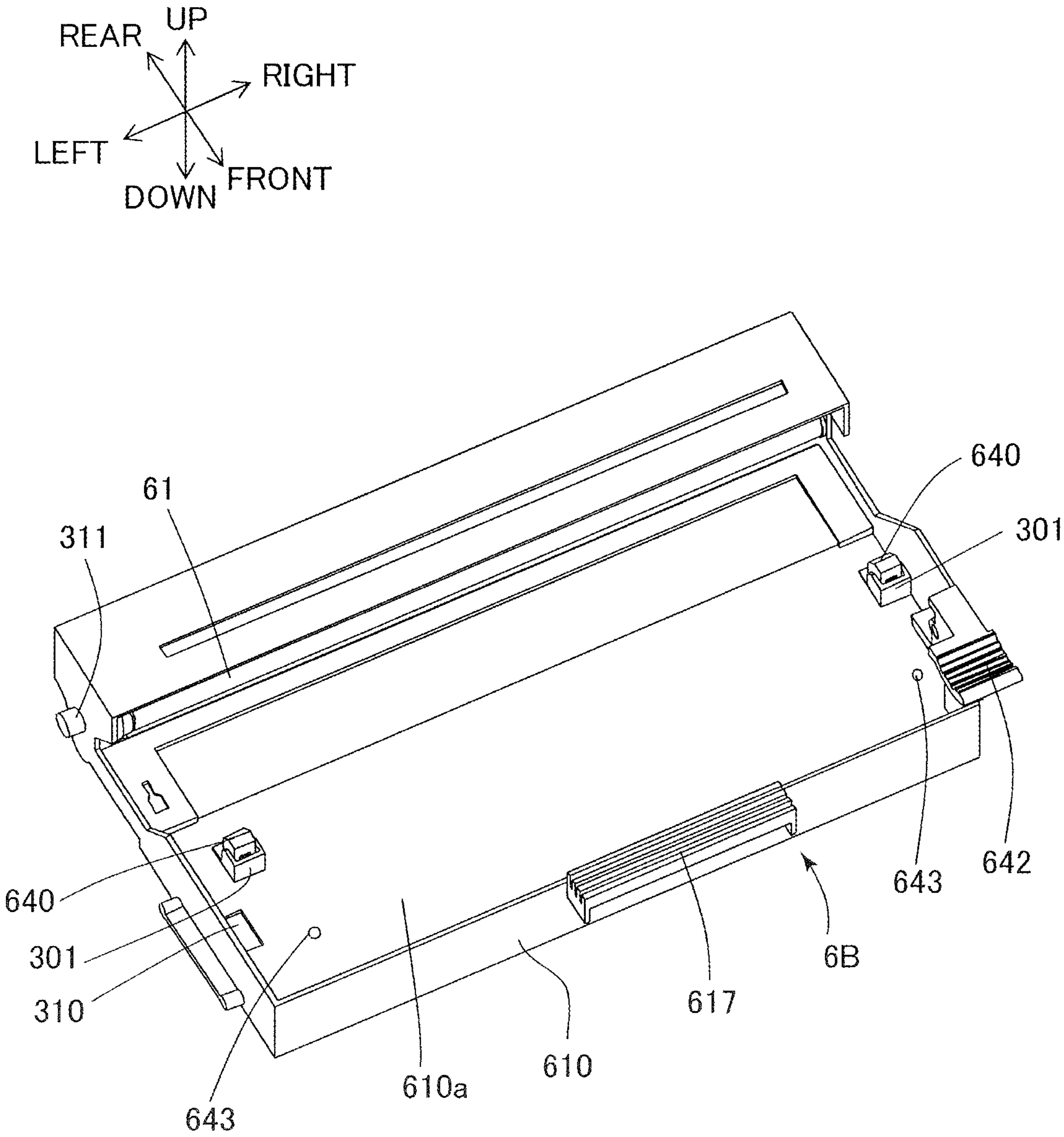
FIG. 25 is a perspective view illustrating the pressing member and an electrode exposing hole.

As illustrated in FIG. 23 to FIG. 25, a process cartridge 5B according to this embodiment includes a drum unit 6B and a development unit 7B. In a state of being mounted on the drum unit 6B, the development unit 7B is locked to the drum unit 6B by the lift member 642, and detachment from the drum unit 6B is prevented.

In the drum unit 6B, an electrode exposing hole 310 is formed in the bottom surface 610*a* of the frame 610. In addition, a supporting portion 301 protrudes upward at both ends of the bottom surface 610*a* in the axial direction, and the pressing member 640 is disposed on a forward side of the supporting portion 301. The pressing member 640 is urged forward by a compression spring 302 (refer to FIG. 28) disposed between the pressing member 640 and the supporting portion 301. A spring contact portion 301*a* of the supporting portion 301 comes into contact with the compression spring 302 and receives an elastic force from the compression spring 302. The electrode exposing hole 310 is disposed rearward and leftward of the supporting portion 301 and the pressing member 640 which are disposed on a left side of the drum unit 6B.

Figure 26:
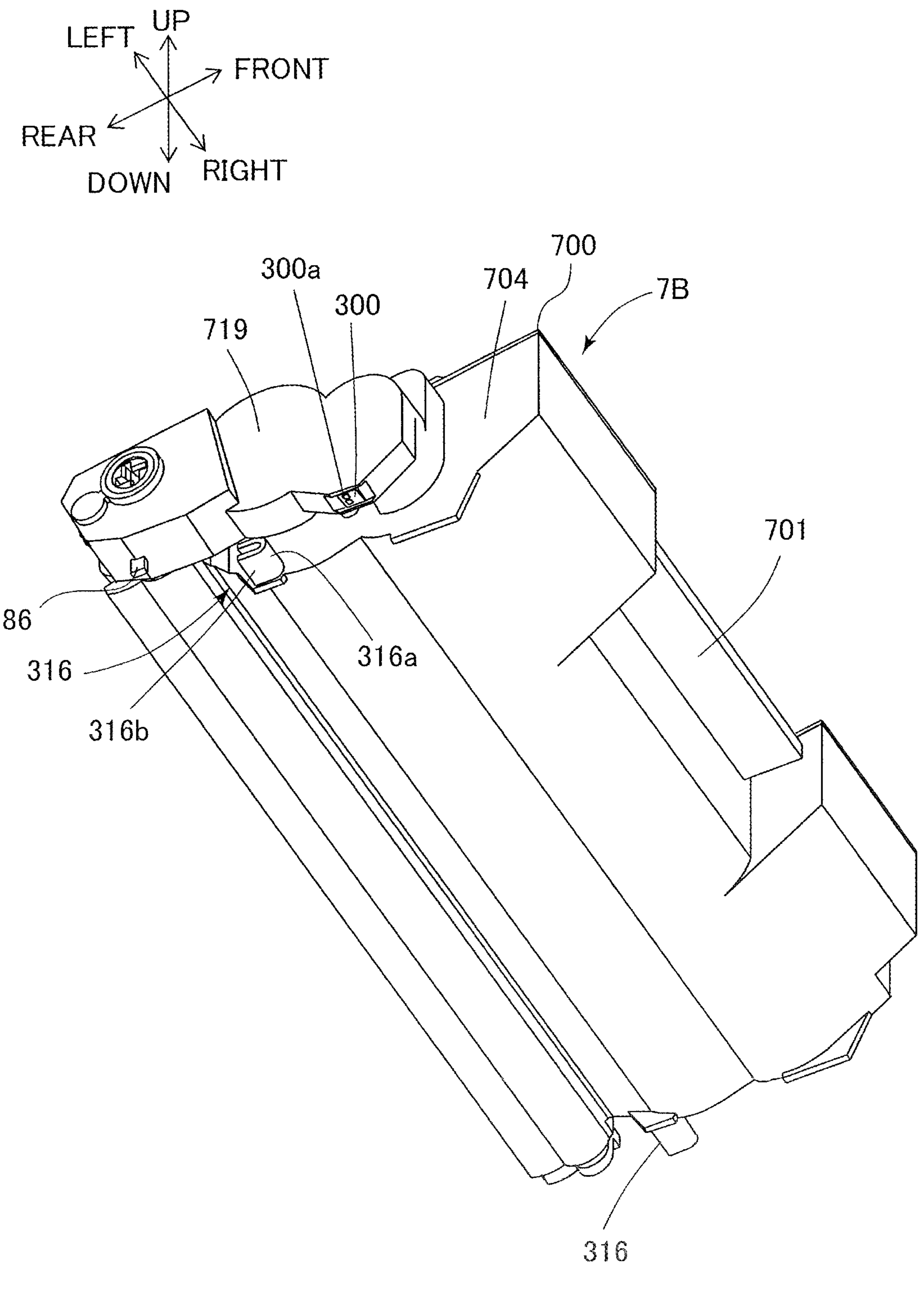
FIG. 26 is a perspective view illustrating the development unit.
Figure 27:
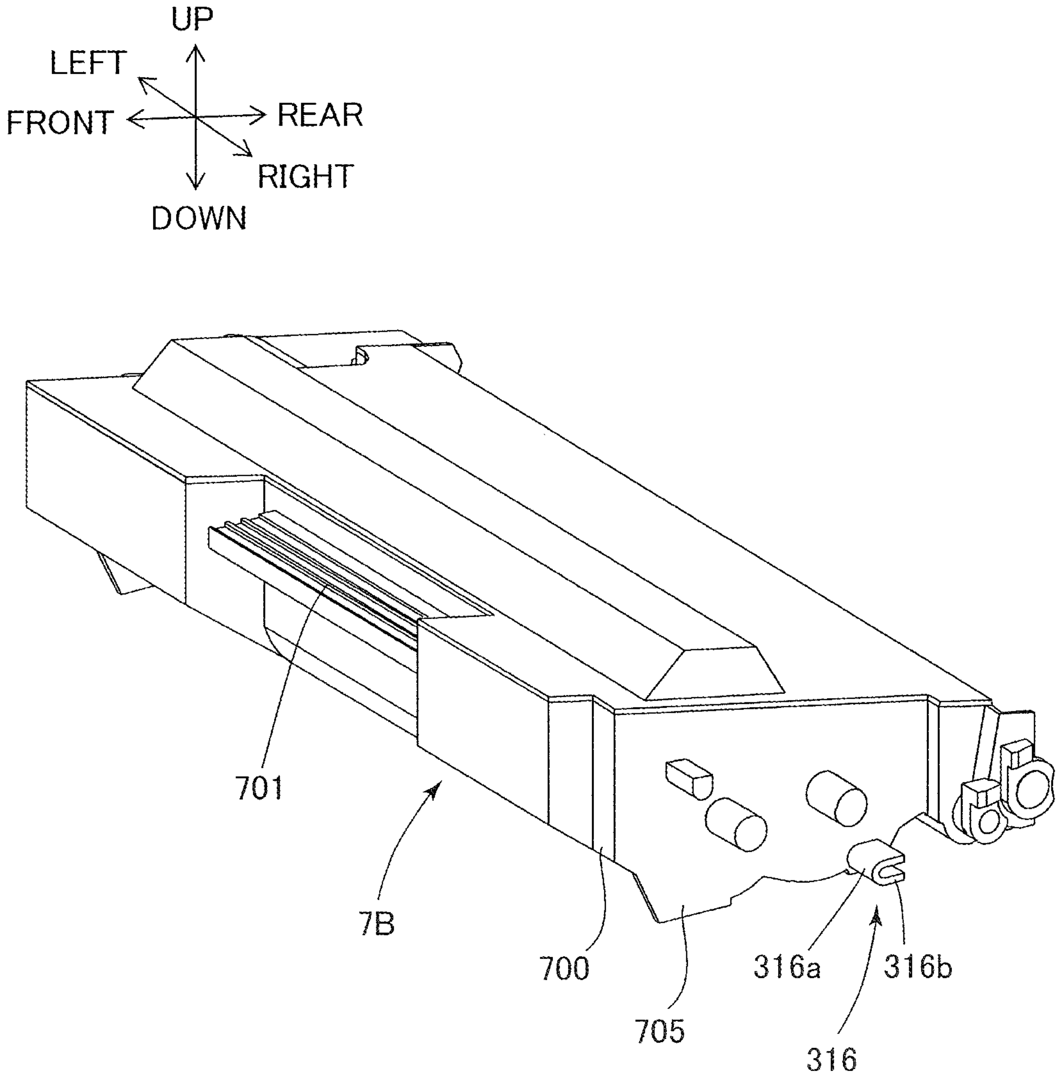
FIG. 27 is a perspective view illustrating a pressed portion in the development unit.

As illustrated in FIG. 26 and FIG. 27, the development unit 7B includes a pressed portion 316 which is provided in the left side wall 704 and the right side wall 705 of the casing 700. The pressed portion 316 which is provided in the left side wall 704 is provided to protrude leftward from the left side wall 704, and the pressed portion 316 which is provided in the right side wall 705 is provided to protrude rightward from the right side wall 705.

Figure 28:
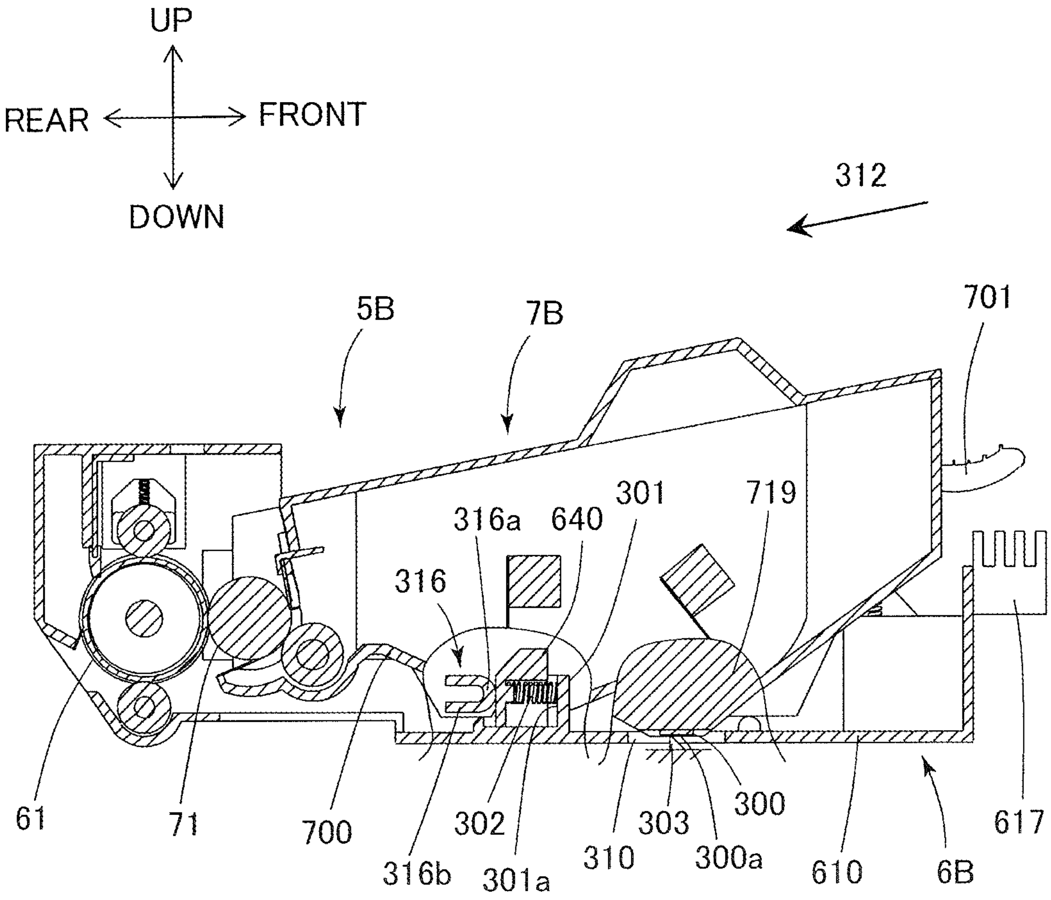
FIG. 28 is a cross-sectional view illustrating an arrangement relationship between the memory electrode and a spring contact portion.

FIG. 28 is a cross-sectional view illustrating the process cartridge 5B, and a part of the cross-sectional view illustrates a cross-section in the vicinity of the pressing member 640 of the development unit 7B, and another part of the cross-sectional view illustrates a cross-section in the vicinity of a memory 300. As illustrated in FIG. 28, when viewed in the axial direction, each of the pressed portions 316 includes an arc portion 316*a* that is formed in an arc shape, and an extending portion 316*b* that extends forward from both ends of the arc portion 316*a*. The arc portion 316*a* of the pressed portion 316 is pressed forward by the pressing member 640 in a state in which the development unit 7B is mounted on the drum unit 6B. Since the both ends of the arc portion 316*a* are supported by the extending portion 316*b*, even when a pressing force is applied to the arc portion 316*a*, it is possible to reduce deformation of the arc portion 316*a*.

In addition, when the pressed portion 316 in the development unit 7B is pressed forward, the development roller 71 of the development unit 7B is urged to a direction approaching the photosensitive drum 61, and comes into contact with the photosensitive drum 61. In a state in which the development roller 71 comes into contact with the photosensitive drum 61, the above-described image forming process is performed.

Next, the memory 300 of the development unit 7B will be described. As illustrated in FIG. 24, FIG. 26, and FIG. 28, the memory 300 is attached to the bottom surface of the side holder 719 attached to the left side wall 704 of the development unit 7B. The memory 300 includes a memory chip (not illustrated) that stores information about the development unit 7B, and a memory electrode 300*a* that is an electric contact connected to the memory chip, and the memory chip and the memory electrode 300*a* are provided on the same substrate. When the process cartridge 5B is mounted on the apparatus body 2 (refer to FIG. 1), the memory electrode 300*a* and an electrode 303 serving as a body electrode of the apparatus body 2 come into contact with each other, and the apparatus body 2 reads information about the development unit 7B and performs various kinds of control.

The memory electrode 300*a* of the memory 300 is disposed to face downward, and is disposed at a position corresponding to the electrode exposing hole 310 of the drum unit 6B in a state in which the development unit 7B is mounted on the drum unit 6B. When the process cartridge 5B is mounted on the apparatus body 2, the memory electrode 300*a* exposed from the electrode exposing hole 310 comes into contact with the electrode 303 of the apparatus body 2 when viewed from a downward side as illustrated in FIG. 28.

As illustrated in FIG. 28, the pressed portion 316 in the development unit 7B is disposed in front of the memory electrode 300*a* of the memory 300 and the electrode exposing hole 310 when viewed in the axial direction. That is, the pressed portion 316 is disposed at a position closer to the photosensitive drum 61 than the memory electrode 300*a* of the memory 300 and the electrode exposing hole 310 when viewed in the axial direction.

In addition, the pressed portions 316 which are provided on both sides of the development unit 7B in the right-left direction are disposed so as to overlap each other when viewed in the axial direction, and thus an arrangement relationship between the pressed portion 316 on the both sides and the memory electrode 300*a* when viewed in the axial direction of the development roller 71 is the same on the both sides.

Summary of Third Embodiment

When the pressing member 640 for pressing the development unit 7B is provided in the drum unit 6B, the following problem occurs. The development roller 71 comes into contact with the photosensitive drum 61 due to a pressing force applied by the pressing member 640, but there is a concern that the frame 610 of the drum unit 6B may be deformed due to a repulsive force of the pressing force applied by the pressing member 640. Specifically, the compression spring 302 that presses the pressing member 640 comes into contact with the spring contact portion 301*a* of the supporting portion 301 provided in the frame 610. According to this, the same force as the force of pressing the pressing member 640 by the compression spring 302 acts on the supporting portion 301 from the compression spring 302.

In addition, when deformation of the frame 610 due to the repulsive force increases, the pressing force of the pressing member 640 decreases. Therefore, it is difficult to cause the development roller 71 to stably come into contact with the photosensitive drum 61, and the development roller 71 and the photosensitive drum 61 are separated from each other, and thus there is a concern that image defects may occur. To prevent occurrence of the image defects, it is necessary to suppress deformation of the frame 610 of the drum unit 6B due to the repulsive force of the pressing member 640. In addition, to suppress deformation of the frame 610, it is necessary to secure frame strength of a region in which load occurs in the drum unit 6B due to the repulsive force of the pressing member 640. The region in which the load occurs is a region between the supporting portion 311 of the frame 610 that rotatably supports the photosensitive drum 61, and the spring contact portion 301*a* of the supporting portion 301 that comes into contact with the compression spring 302.

In addition, in this embodiment, as illustrated in FIG. 28, the process cartridge 5B is mounted on the apparatus body 2 in a rearward and downward direction indicated by an arrow 312. In this case, it is preferable that the memory electrode 300*a* is disposed on a lower surface side of the process cartridge 5B. The reason for this is as follows. When the memory electrode 300*a* is separated from the electrode 303 of the apparatus body 2 immediately before the process cartridge 5B is completely mounted on the apparatus body 2, the memory electrode 300*a* and the electrode 303 do not slide on each other, and thus durability is improved. In addition, it is not necessary to provide an additional device for moving the memory electrode 300*a* or the electrode 303, and thus the arrangement is preferable in terms of the cost.

However, it is necessary to provide a hole or a notch such as the electrode exposing hole 310 in the frame 610 of the drum unit 6B so as to dispose the memory 300 that records information about the development unit 7B on a lower surface side of the process cartridge 5B. The hole or notch becomes a cause for reduction in the frame strength of the frame 610.

Here, in this embodiment, the process cartridge 5B is configured as follows. The spring contact portion 301*a* of the supporting portion 301 that comes into contact with compression spring 302 of the drum unit 6B is disposed at a position closer to the photosensitive drum 61 than the memory electrode 300*a* and the electrode exposing hole 310 when viewed in the axial direction of the development roller 71.

According to this, the electrode exposing hole 310 that is the cause for reduction in the frame strength of the drum unit 6B can be provided out of a range of the region for which the frame strength of the drum unit 6B is necessary. Accordingly, it is possible to secure the frame strength of the drum unit 6B, and the development roller 71 is caused to stably come into contact with the photosensitive drum 61, and thus it is possible to reduce occurrence of image defects.

In addition, in this embodiment, the pressed portion 316 in the development unit 7B is disposed at a position closer to the photosensitive drum 61 than the memory electrode 300*a*. Due to the arrangement relationship in the development unit 7B, it is possible to realize a condition for securing the frame strength of the drum unit 6B. Accordingly, the development roller 71 is caused to stably come into contact with the photosensitive drum 61, and thus occurrence of the image defects can be reduced.

Fourth Embodiment

Next, a fourth embodiment of the invention will be described. In the fourth embodiment, arrangement of the memory is changed from the third embodiment. Accordingly, illustration of the same configuration as in the third embodiment will be omitted, or the same reference numeral will be given to the same configuration in the following description.

Figure 29:
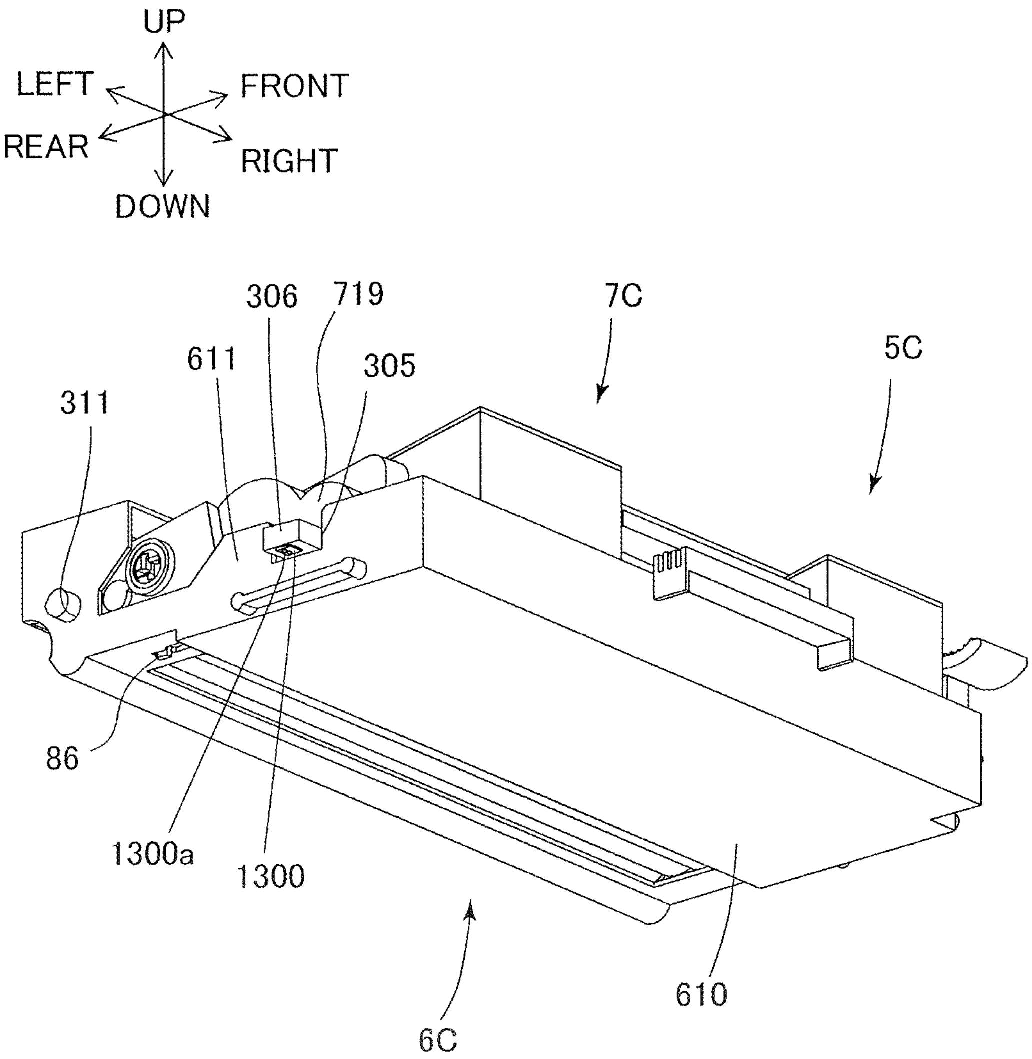
FIG. 29 is a perspective view illustrating a process cartridge according to a fourth embodiment.
Figure 30:
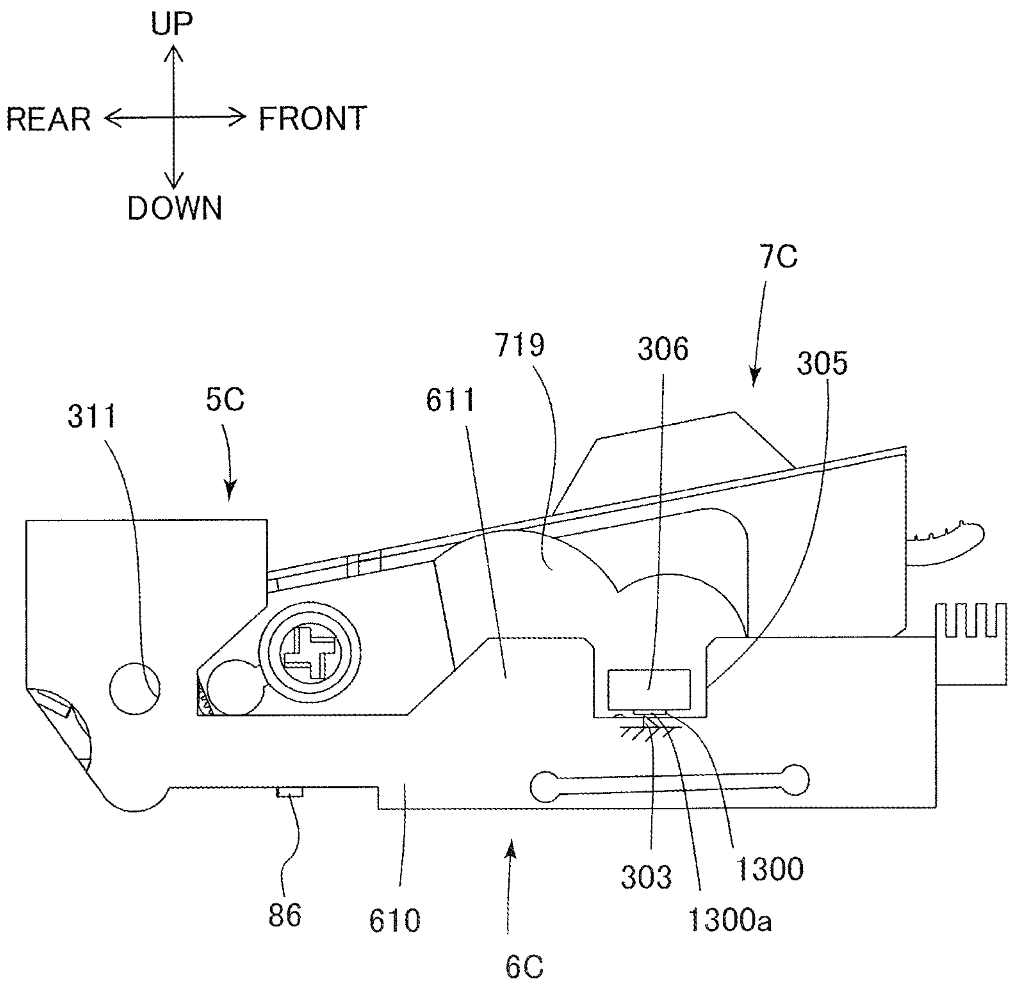
FIG. 30 is a side view illustrating the process cartridge.

As illustrated in FIG. 29 and FIG. 30, the frame 610 of a drum unit 6C of this embodiment includes the left side wall 611, and a notch 305 concaved downward and having a rectangular shape with one side open is formed in the left side wall 611. In addition, a memory supporting portion 306 that protrudes leftward, i.e. in an axial direction, is formed in the side holder 719 of a development unit 7C. A memory 1300 is supported to a lower surface of the memory supporting portion 306, and the memory 1300 is disposed so that a memory electrode 1300*a* faces downward.

When the development unit 7C is mounted on the drum unit 6C, the memory supporting portion 306 protrudes leftward from the notch 305 of the frame 610 of the drum unit 6C. In this state, the memory electrode 1300*a* of the memory 1300 supported to the memory supporting portion 306 is located on a further leftward than the left side wall 611 of the frame 610. In other words, the memory electrode 1300*a* of the memory 1300 is disposed on a side opposite to the development roller 71 with the left side wall 611 interposed therebetween in the longitudinal direction, i.e. axial direction. In addition, when a process cartridge 5C in which the development unit 7C and the drum unit 6C are integrated is mounted on the apparatus body 2 (refer to FIG. 1), the electrode 303 provided in the apparatus body 2 and the memory electrode 1300*a* come into contact with each other, and information of the memory 1300 is read to the apparatus body 2.

Figure 31:
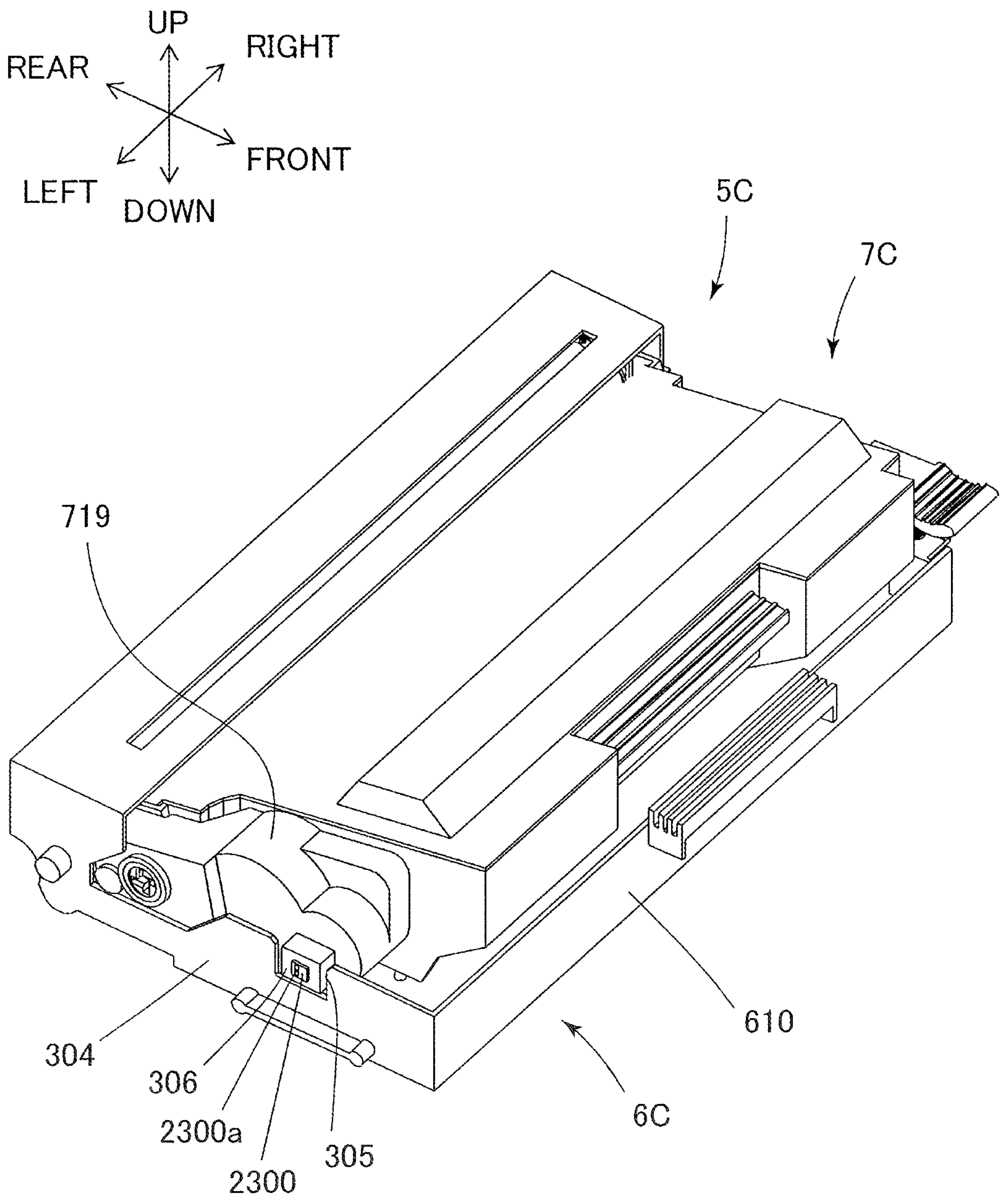
FIG. 31 is a perspective view illustrating a modification example of the process cartridge according to the fourth embodiment.

Note that, as illustrated in FIG. 31, a memory 2300 may be provided on a left side surface of the memory supporting portion 306, and a memory electrode 2300*a* of the memory 2300 may be disposed to face leftward. Even in this embodiment, as in the third embodiment, the spring contact portion 301*a* and the pressed portion 316 are disposed at a position closer to the photosensitive drum 61 than the memory electrodes 1300*a* and 2300*a* when viewed in the axial direction.

That is, the notch 305 serving as an opening portion formed in the frame 610 of the drum unit 6C becomes a cause for reduction in the frame strength, but the notch 305 is provided out of a range of the region for which the frame strength in the frame 610 is necessary. Accordingly, the frame strength of the region of the frame 610 that receives the repulsive force of the pressing member 640 and the compression spring 302 as described in the third embodiment is secured, the development roller 71 is caused to stably come into contact with the photosensitive drum 61, and thus occurrence of the image defects can be reduced.

Summary Fourth Embodiment

A load due to the repulsive force of the pressing member 640 acts on the frame 610 of the drum unit 6C in a region particularly between the supporting portion 311 and the spring contact portion 301*a* of the supporting portion 301 that comes into contact with the compression spring 302. When the frame 610 is deformed due to the load, there is a concern that the pressing force of the pressing member 640 decreases, the development roller 71 cannot be caused to stably come into contact with the photosensitive drum 61, the development roller 71 and the photosensitive drum 61 are separated from each other, and thus the image defects may occur.

Here, in this embodiment, a hole or a notch that becomes a cause for reduction in the frame strength is not provided in the region, and the notch 305 is provided in the left side wall 611. In addition, the memory electrodes 1300*a* or 2300*a* is exposed to the outside from the notch 305. According to this, deformation of the frame 610 is suppressed, and the image defects can be reduced.

Fifth Embodiment

Next, a fifth embodiment of the invention will be described. In the fifth embodiment, a configuration of the development unit and the casing, i.e. frame, of the drum unit, and arrangement of the memory are different from the configuration and the arrangement in the third embodiment. Accordingly, illustration of the same configuration as in the third embodiment will be omitted, or the same reference numeral will be given to the same configuration in the following description.

Figure 32:
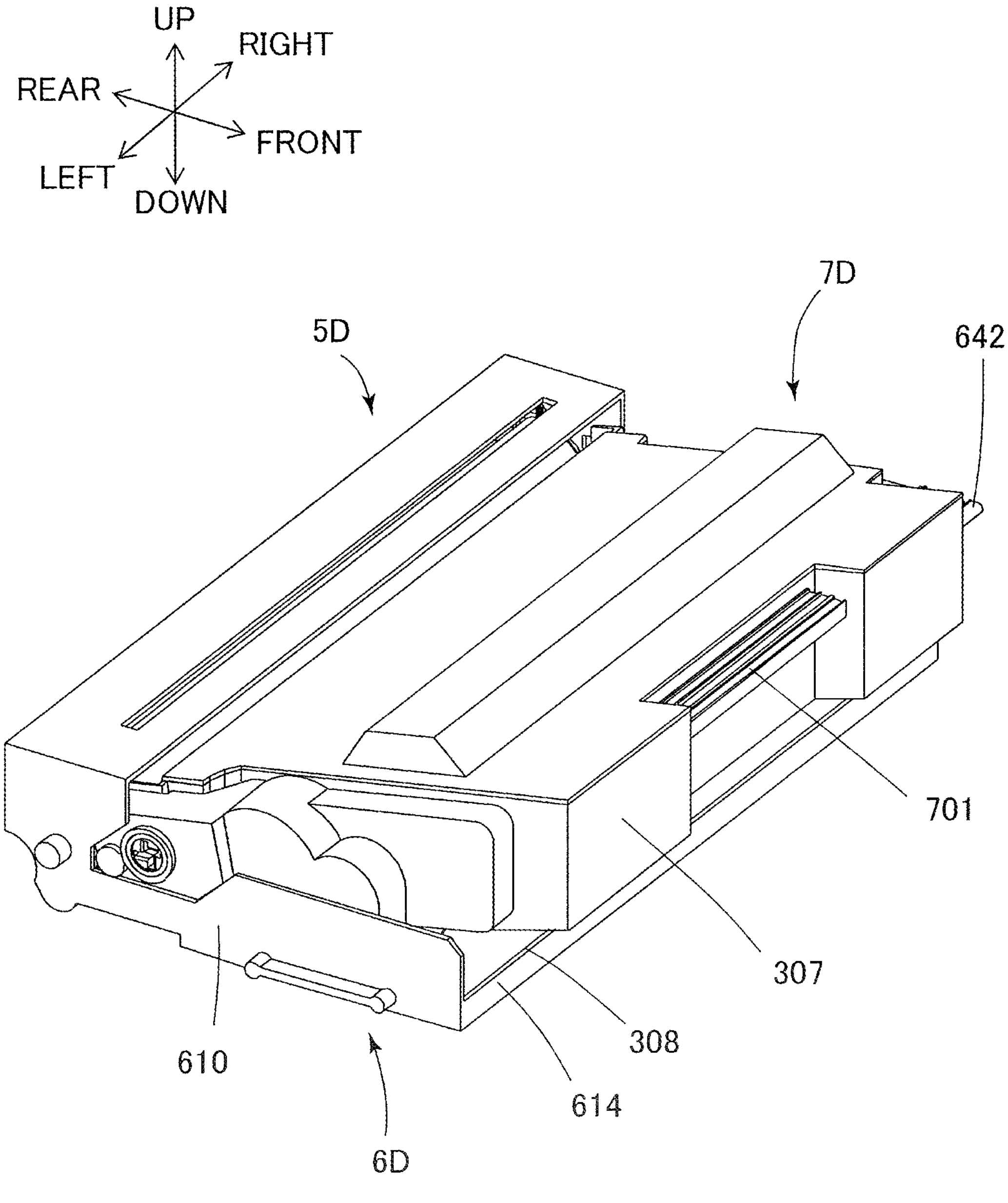
FIG. 32 is a perspective view illustrating a process cartridge according to a fifth embodiment.
Figure 33:
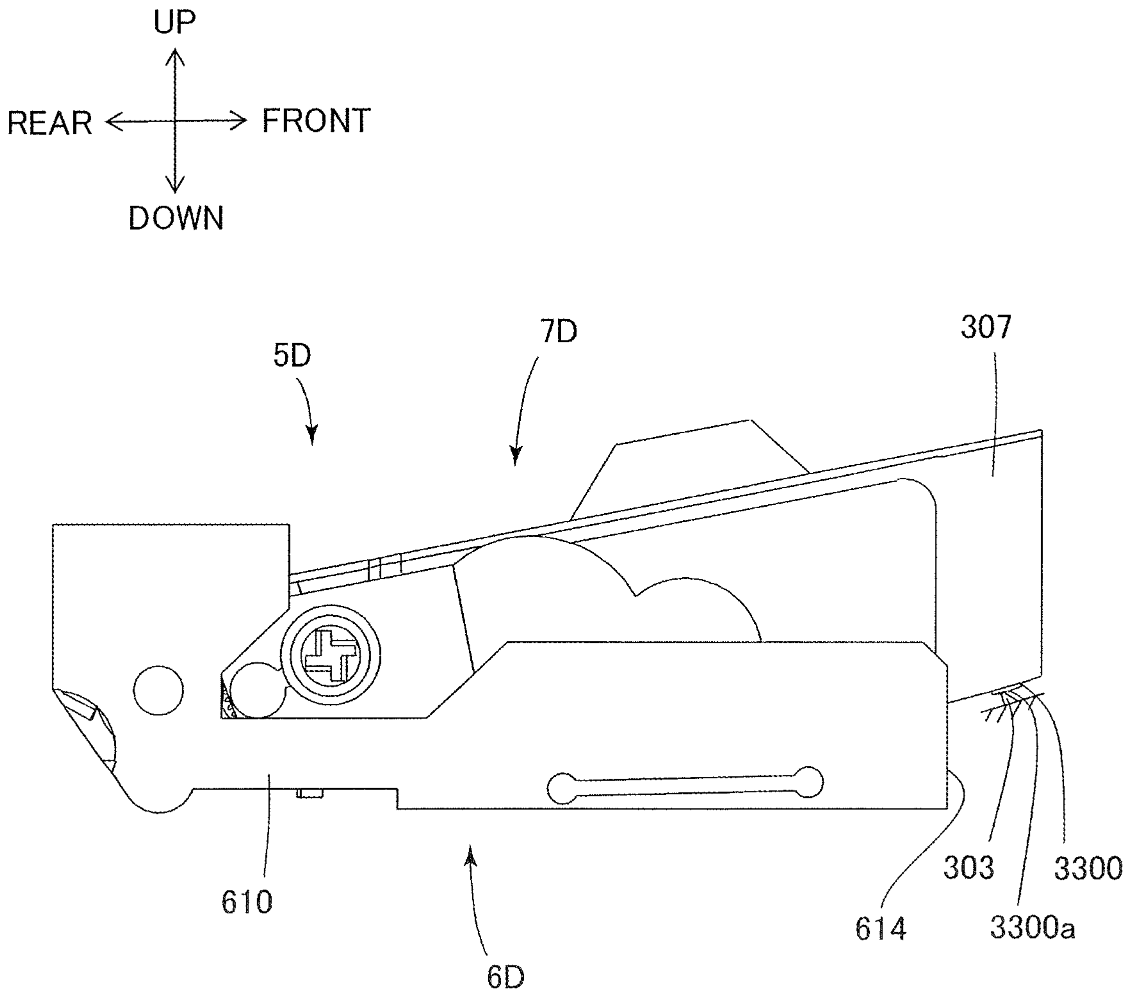
FIG. 33 is a side view illustrating the process cartridge.
Figure 34:
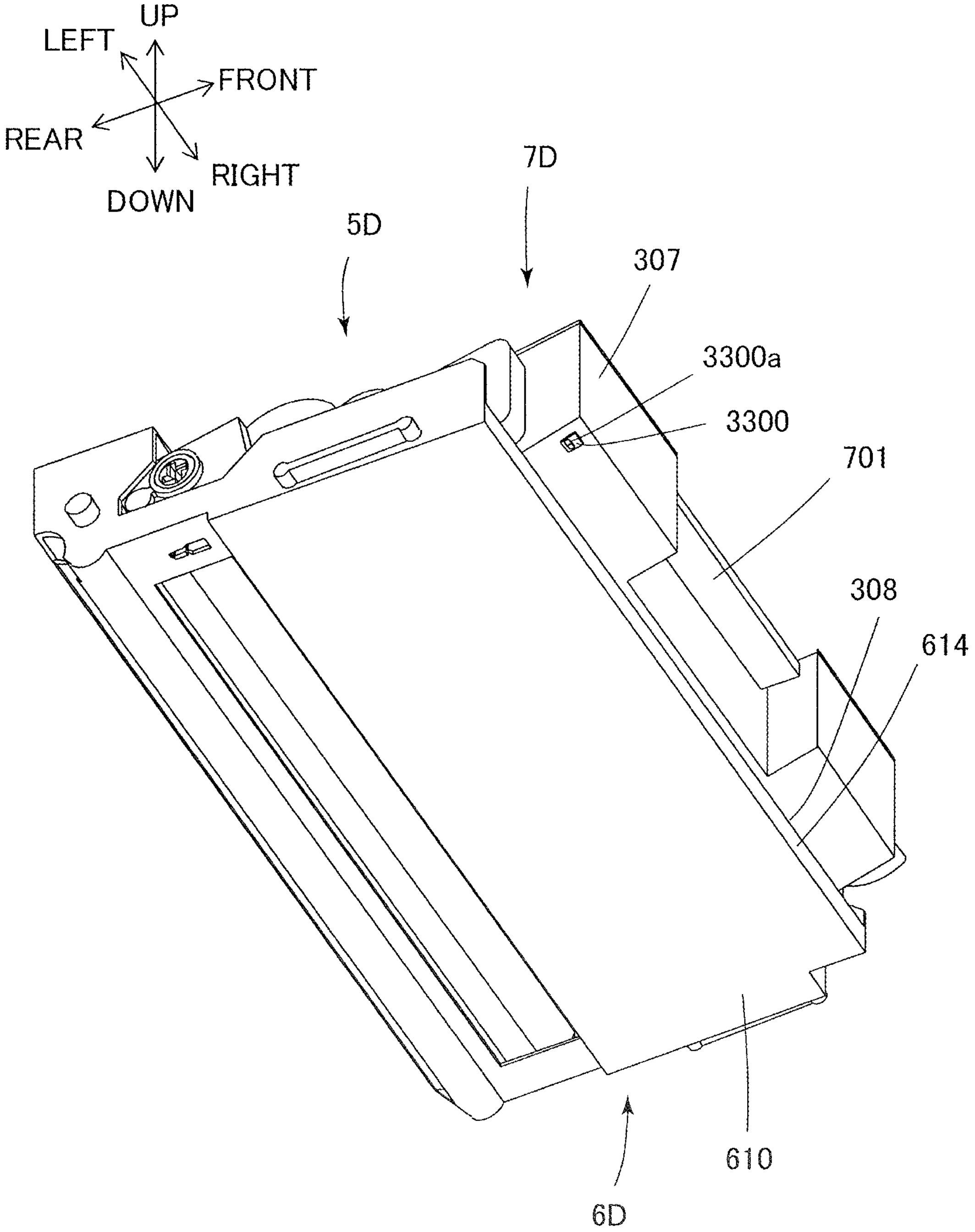
FIG. 34 is a perspective view illustrating the process cartridge.

As illustrated in FIG. 32 to FIG. 34, a drum unit 6D of this embodiment includes a front wall 614 of the frame 610. A notch 308 that is concaved downward is formed in the front wall 614. According to this, the drum unit 6D of this embodiment is not provided with the grip portion 617 described in the first embodiment.

A development unit 7D includes an extending portion 307 that protrudes forward. That is, the extending portion 307 extends more upstream of the mounting direction AD (refer to FIG. 2) than the frame 610 of the drum unit 6D. The extending portion 307 is disposed on both sides in the right-left direction with the grip portion 701 interposed therebetween. A toner that is used in image formation is stored in the extending portion 307. A memory 3300 is supported to a lower surface of the extending portion 307 on the left side, and the memory 3300 is disposed so that a memory electrode 3300*a* faces downward.

When the development unit 7D is mounted on the drum unit 6D, the extending portion 307 protrudes forward from the notch 308 formed in the front wall 614 of the drum unit 6D, and the memory 3300 that is supported to the lower surface of the extending portion 307 on the left side is located behind the front wall 614. In addition, when a process cartridge 5D in which the development unit 7D and the drum unit 6D are integrated is mounted on the apparatus body 2 (refer to FIG. 1), the electrode 303 provided in the apparatus body 2 and the memory electrode 3300*a* come into contact with each other, and information of the memory 3300 is read to the apparatus body 2.

Even in this embodiment, as in the third embodiment, the spring contact portion 301*a* and the pressed portion 316 are disposed at a position closer to the photosensitive drum 61 than the memory electrode 3300*a* when viewed in the axial direction.

Summary of Fifth Embodiment

In the case of enlarging capacity of a toner stored in the development unit 7D, there is the following problem. If a width or a height of the development unit 7D is not changed, the development unit 7D is necessary to protrude forward. In this embodiment, the extending portion 307 that extends forward is formed, and the toner is stored in the extending portion 307. In addition, the notch 308 is formed in the front wall 614 and the extending portion 307 extends into the notch 308 so that the extending portion 307 does not interfere with the front wall 614 of the drum unit 6D. However, the notch 308 becomes a cause for reduction in the frame strength of the frame 610 of the drum unit 6D.

Here, in this embodiment, the memory 3300 including the memory electrode 3300*a* is disposed on the lower surface of the extending portion 307, and the memory electrode 3300*a* is disposed at a position distant from the photosensitive drum 61. That is, as illustrated in FIG. 28, the spring contact portion 301*a* and the pressed portion 316 in the drum unit 6D are disposed at a position closer to the photosensitive drum 61 than the memory electrode 3300*a* when viewed in the axial direction.

According to this, the notch 308 that is the cause for reduction in the frame strength of the drum unit 6D can be provided out of a range of the region for which the frame strength of the drum unit 6D is necessary. Accordingly, it is possible to secure the frame strength of the drum unit 6D while increasing the capacity of the toner stored in the development unit 7D, and the development roller 71 is caused to stably come into contact with the photosensitive drum 61, and thus it is possible to reduce occurrence of image defects.

In addition, when mounting the process cartridge 5D on the apparatus body 2, the development unit 7D and the drum unit 6D are integrated by the lift member 642. According to this, even in a case where the grip portion is not provided in the drum unit 6D, it is possible to easily attach and detach the process cartridge 5D to and from the apparatus body 2 by gripping the grip portion 701 of the development unit 7D without detaching the development unit 7D from the drum unit 6D.

Note that, in this embodiment, the memory electrode 3300*a* is provided in the extending portion 307 of the development unit 7D, but there is no limitation thereto. For example, the memory electrode 3300*a* may be disposed at any one position among the memory electrodes described in the first to fourth embodiments. Even in this disposition of the memory electrode, it is possible to secure strength relating to a region for which frame strength of the drum unit 6 is necessary.

Sixth Embodiment

Next, a sixth embodiment of the invention will be described. In the sixth embodiment, a configuration in which rotation, deformation, and falling of the lift member can be regulated is added to the first embodiment. Accordingly, illustration of the same configuration as in the first embodiment will be omitted, or the same reference numeral will be given to the same configuration in the following description.

Figure 35:
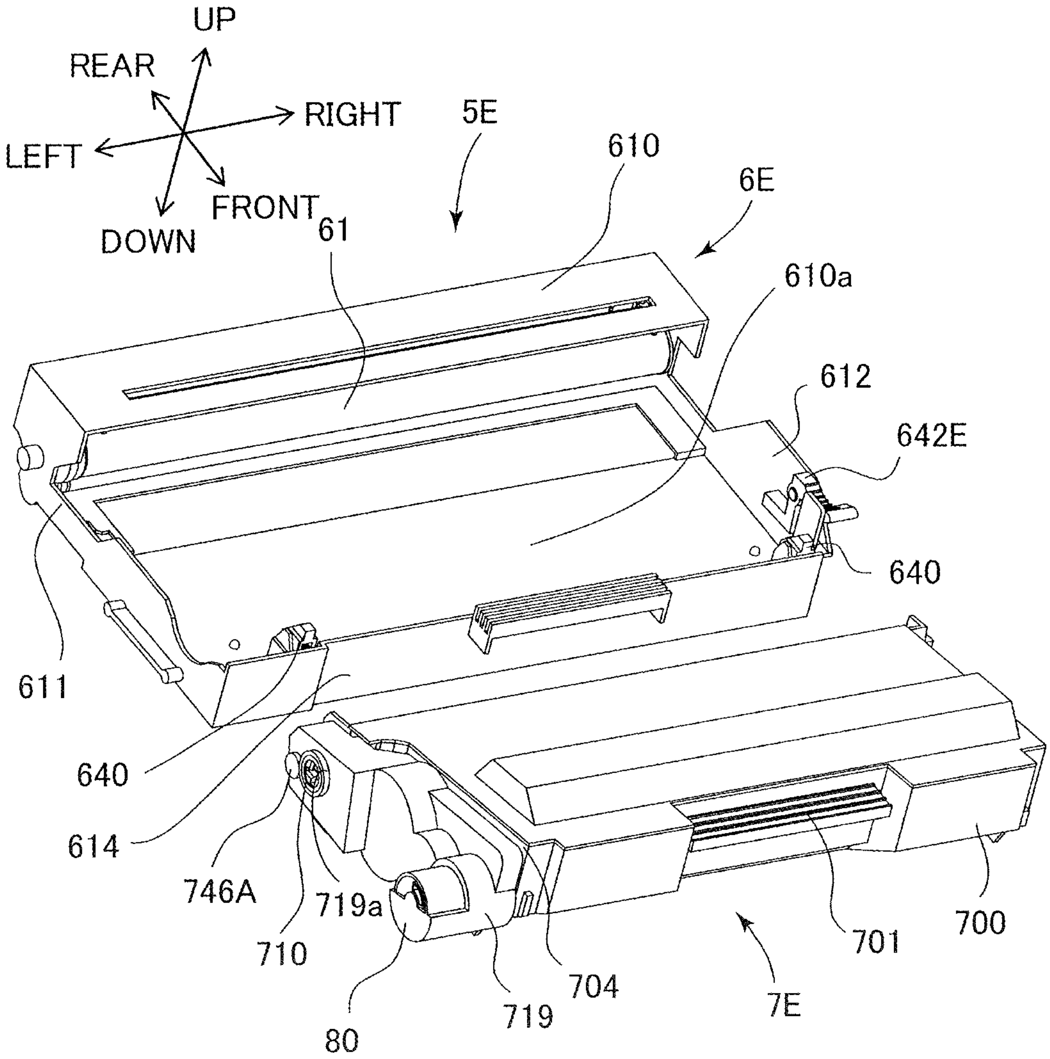
FIG. 35 is a perspective view illustrating a drum unit and a development unit according to a sixth embodiment.
Figure 36:
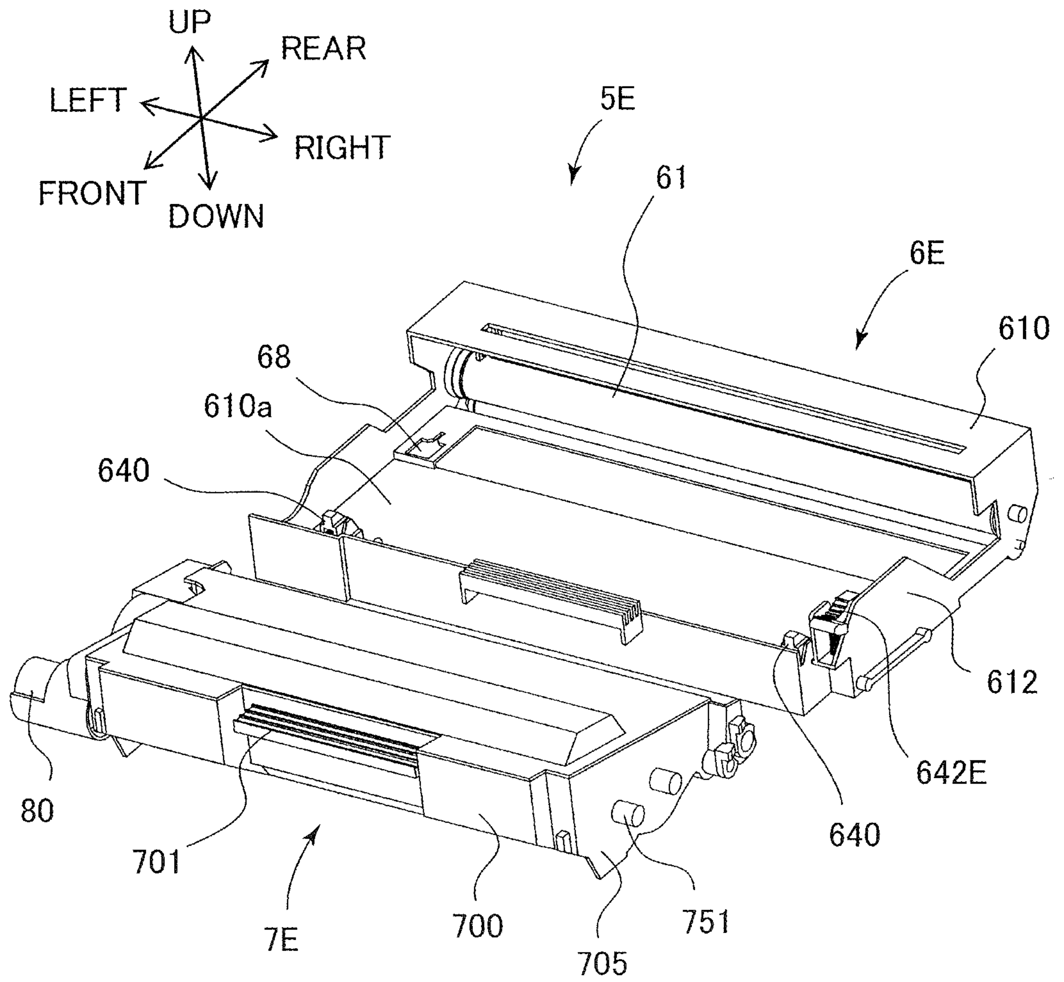
FIG. 36 is a perspective view illustrating the drum unit and the development unit.
Figure 37:
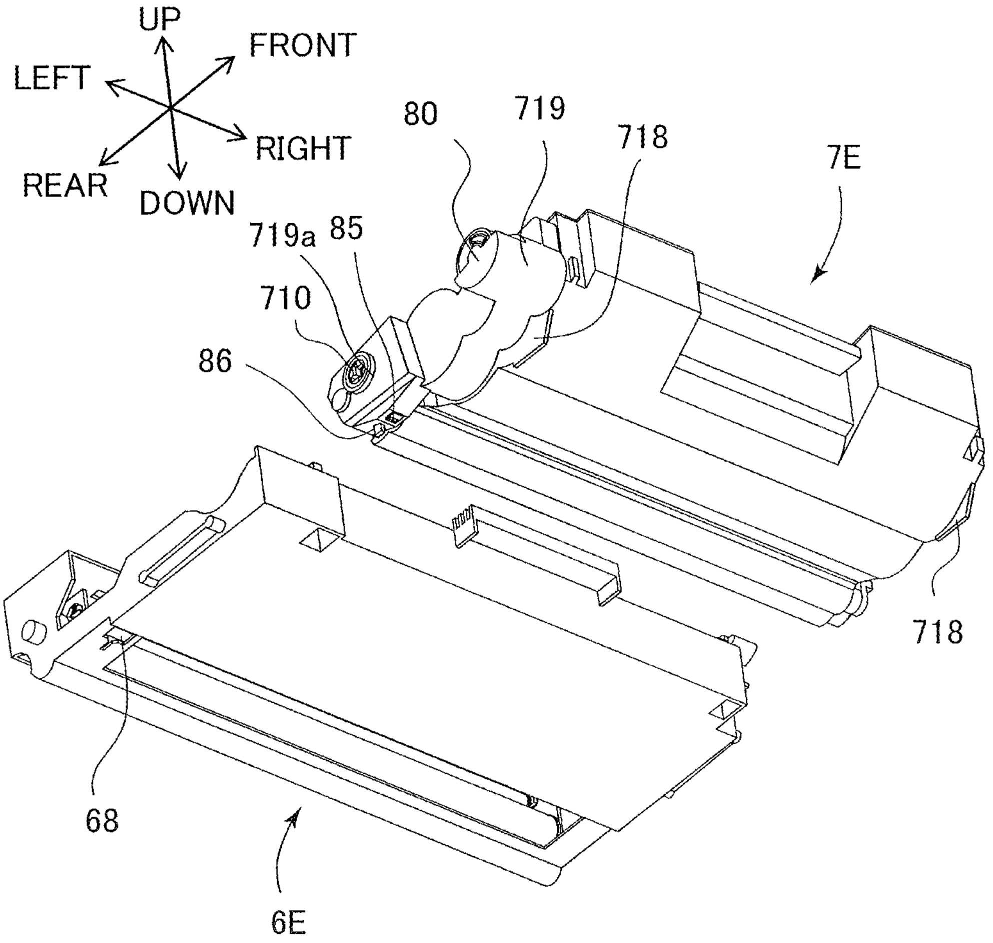
FIG. 37 is a perspective view illustrating the drum unit and the development unit.

As illustrated in FIG. 35 to FIG. 37, a process cartridge 5E according to this embodiment includes a drum unit 6E and a development unit 7E. The drum unit 6E includes the frame 610, and the photosensitive drum 61 that is rotatably supported to the frame 610. The development unit 7E is pressed forward by the pressing members 640 and 640 in a state of being mounted on the drum unit 6E, and according to this, the development roller 71 (refer to FIG. 9) supported to the development unit 7E also comes into contact with the photosensitive drum 61.

The frame 610 of the drum unit 6E includes the left side wall 611 and the right side wall 612, and the bottom surface 610*a* and the front wall 614 which connect the left side wall 611 and the right side wall 612. The pressing members 640 and 640 are supported to the front wall 614, and the lift member 642E is rotatably supported to the right side wall 612.

The development unit 7E includes the casing 700 including the left side wall 704 and the right side wall 705, and the side holder 719 that is supported to the left side wall 704. The detection unit 80 described in the first embodiment is provided in the side holder 719, and a hole 719*a* from which the development coupling 710 is exposed to the outside is formed in the side holder 719. The memory 85 and the positioning protrusion 86 are provided in the bottom surface of the side holder 719. The cylindrical protruding portion 751 that protrudes rightward is provided on the right side wall 705.

Figure 38:
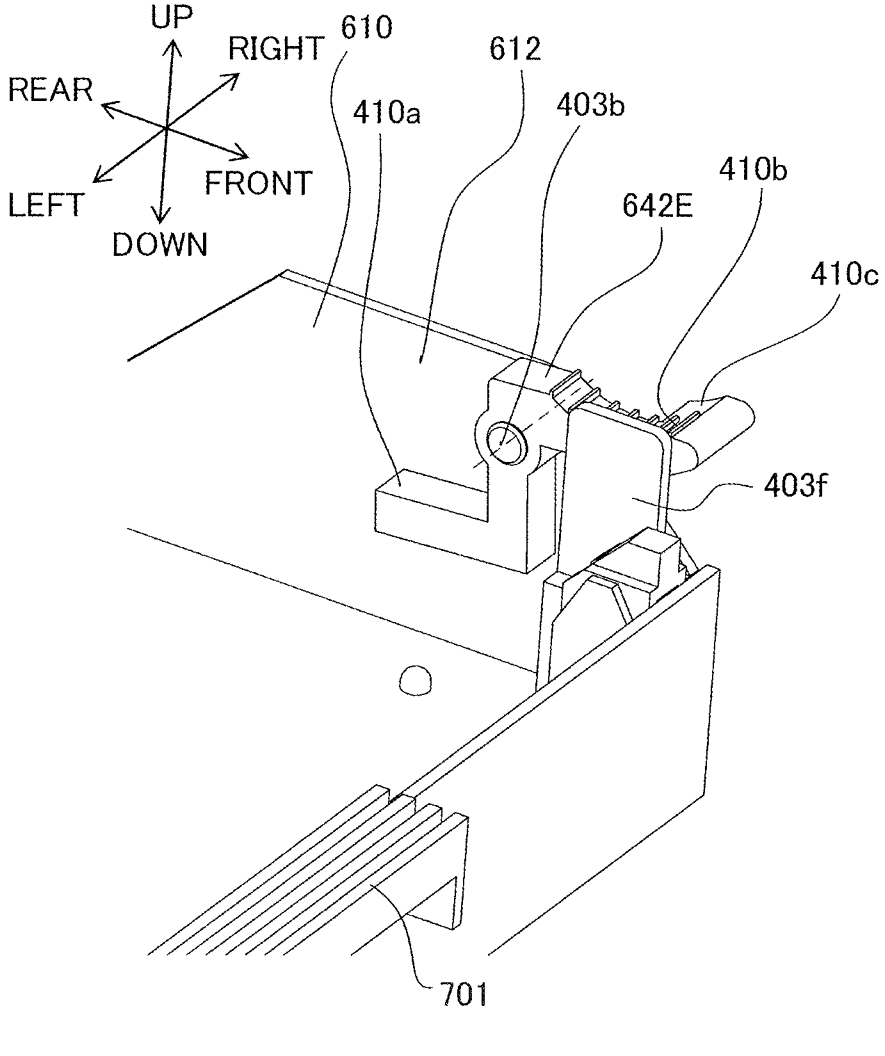
FIG. 38 is an enlarged perspective view illustrating a lift member and an inner side wall.
Figure 39:
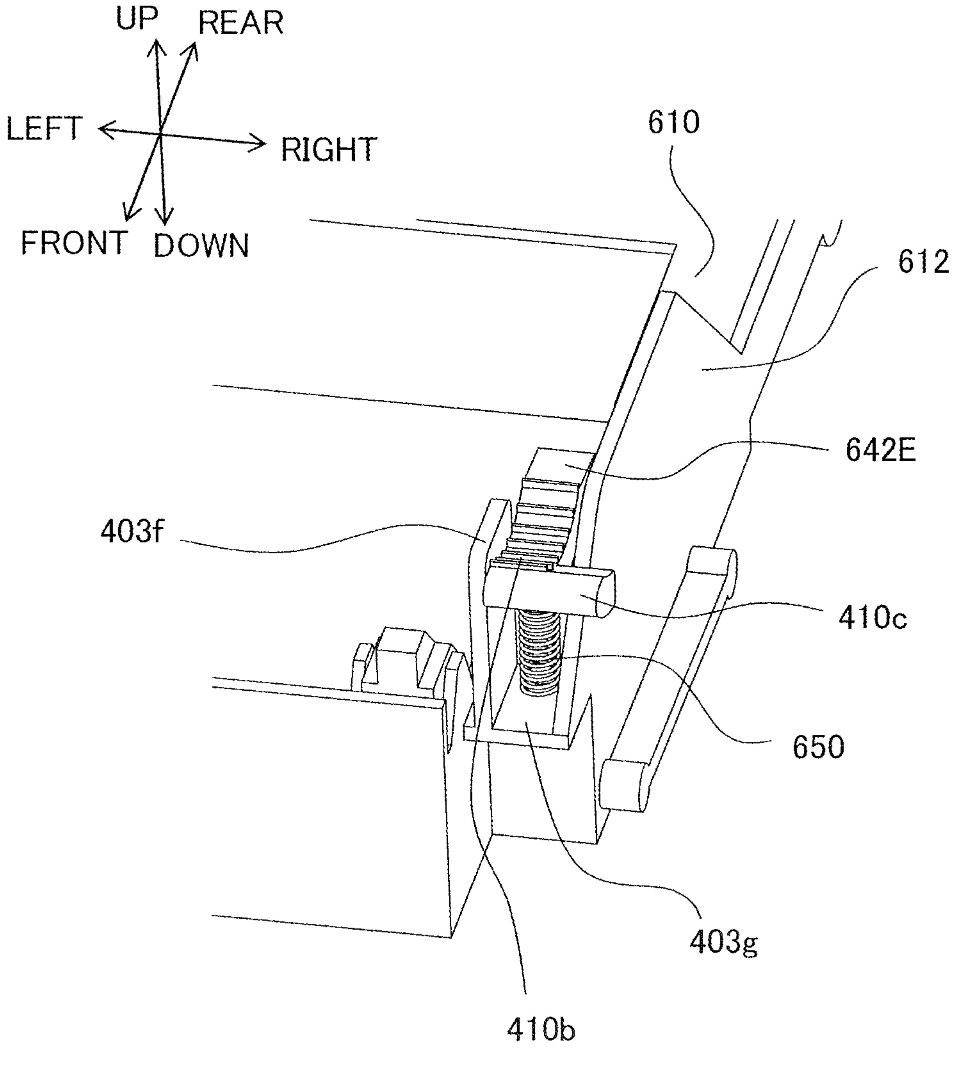
FIG. 39 is an enlarged perspective view illustrating the lift member and the inner side wall.

As illustrated in FIG. 38 and FIG. 39, a lift member 642E is rotatably supported to the right side wall 612 with a rotation shaft 403*b* set as the center, and an inner side wall 403*f* supported to the right side wall 612 is disposed on a leftward side of the lift member 642E. The lift member 642E includes an operation portion 410*b* that is provided in a first end portion of the lift member 642E and can be pressed downward by a user, and a contact portion 410*a* that is provided in a second end portion of the lift member 642E and can come into contact with the protruding portion 751. The operation portion 410*b* is disposed in front of the rotation shaft 403*b*, and the contact portion 410*a* is disposed behind the rotation shaft 403*b*. That is, the operation portion 410*b* and the contact portion 410*a* are disposed to be opposite to each other with the rotation shaft 403*b* interposed therebetween in the front-rear direction.

In addition, the lift member 642E includes a regulation portion 410*c* that is provided integrally with the operation portion 410*b*, and the regulation portion 410*c* is disposed on a rightward side of the operation portion 410*b* to further protrude rightward than the right side wall 612. The inner side wall 403*f* is disposed adjacent to the operation portion 410*b* on a leftward side of the operation portion 410*b*. In other words, the inner side wall 403*f* is disposed on an inner side of the operation portion 410*b* in an axial direction of the photosensitive drum 61. The compression spring 650 is contracted between the operation portion 410*b* of the frame 610 and a seating surface 403*g* provided in the frame 610, and the compression spring 650 presses the operation portion 410*b* to an upward side.

Figure 40A:
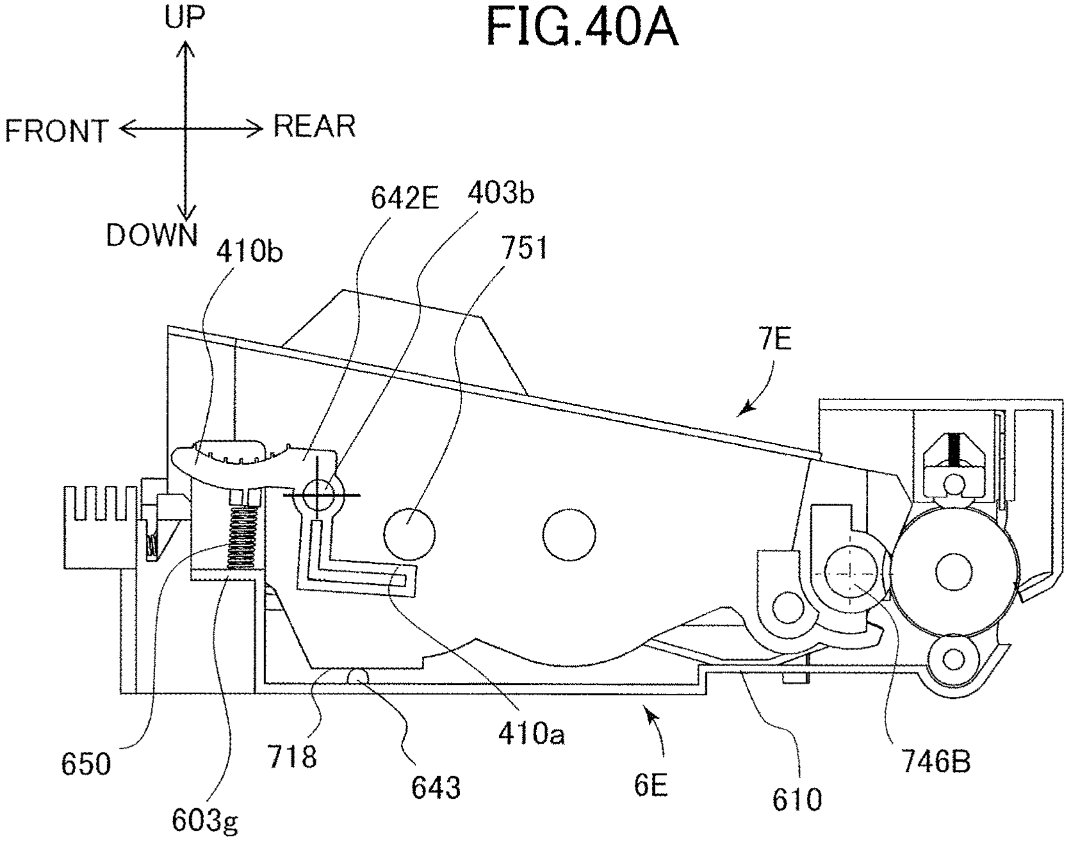
FIG. 40A is a cross-sectional view illustrating a state in which the development unit is mounted on the drum unit.

Next, description will be given of an operation when detaching the development unit 7E from the drum unit 6E. As illustrated in FIG. 40A, the lift member 642E is held at a predetermined standby position in a state in which the operation portion 410*b* is pressed upward, and comes into contact with, for example, a stopper (not illustrated). At this time, the contact portion 410*a* of the development unit 7E mounted on the drum unit 6E is spaced apart from the protruding portion 751, and does not come into contact with the protruding portion 751.

Figure 40B:
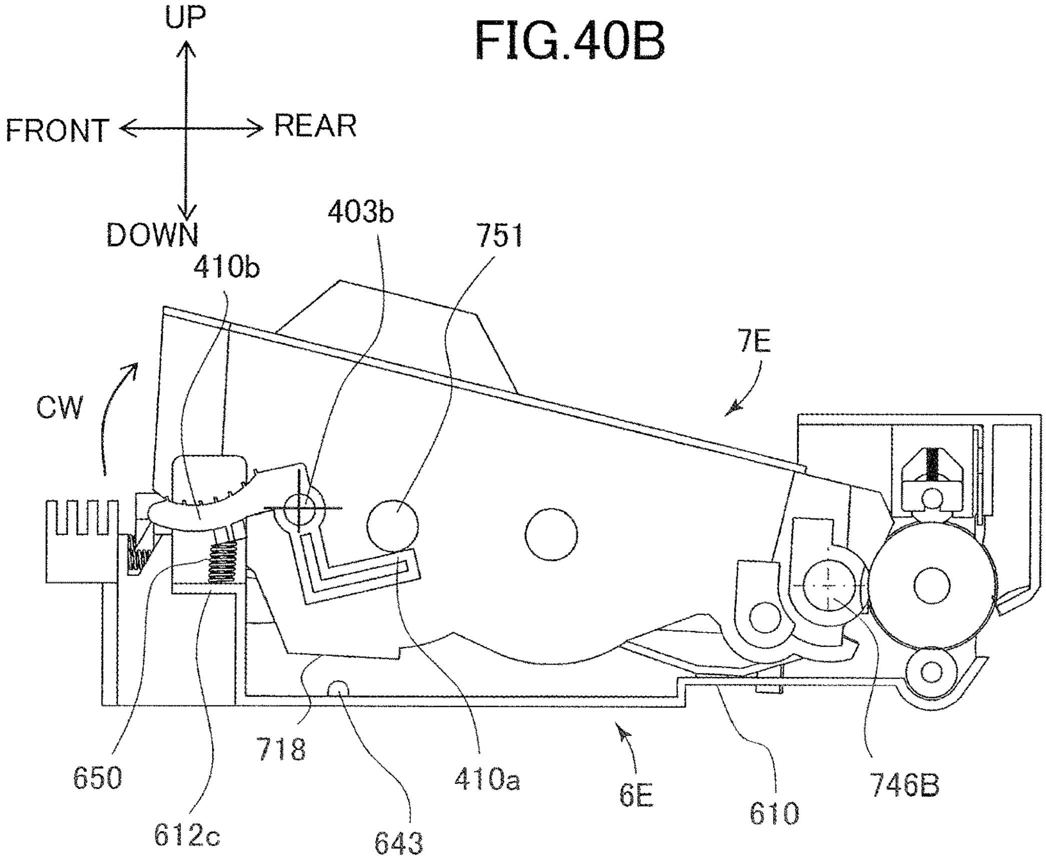
FIG. 40B is a cross-sectional view illustrating the development unit that enters a lift-up state by the lift member.

When a user presses the operation portion 410*b* to a downward side, as illustrated in FIG. 40B, the contact portion 410*a* swings upward, and the protruding portion 751 of the development unit 7E is pressed upward by the contact portion 410*a*. According to this, the development unit 7E rotates in a clockwise, i.e. CW direction, around the bearing 746B (746A) that is disposed on a lateral side in the axial direction of the development roller 71, and is detached from the drum unit 6E. At this time, the pair of left and right ribs 718 and 718 of the development unit 7E that is supported to the protruding portions 643 and 643 of the drum unit 6E is spaced apart from the protruding portions 643 and 643.

As described above, the user completes the work for detaching the development unit 7E by taking out the development unit 7E from the drum unit 6E while gripping the grip portion 701 (refer to FIG. 35) of the development unit 7E that enters the lift-up state as described above.

Figure 41A:
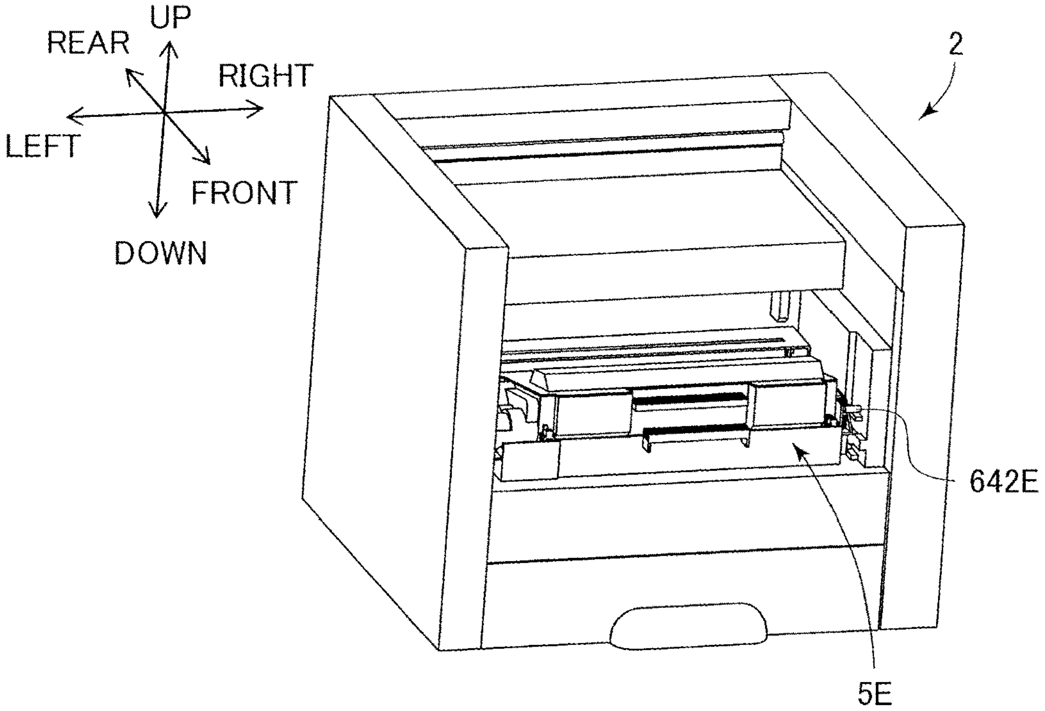
FIG. 41A is a perspective view illustrating an apparatus body.
Figure 41B:
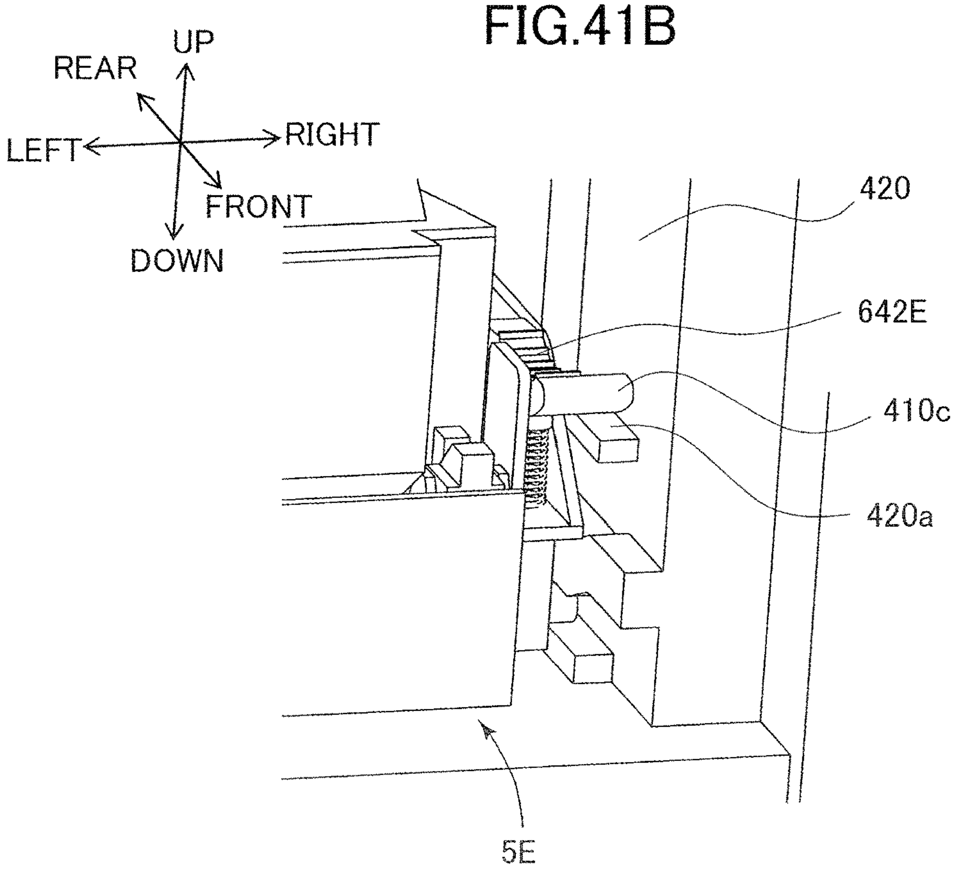
FIG. 41B is an enlarged perspective view illustrating a contact portion of the apparatus body.
Figure 42A:
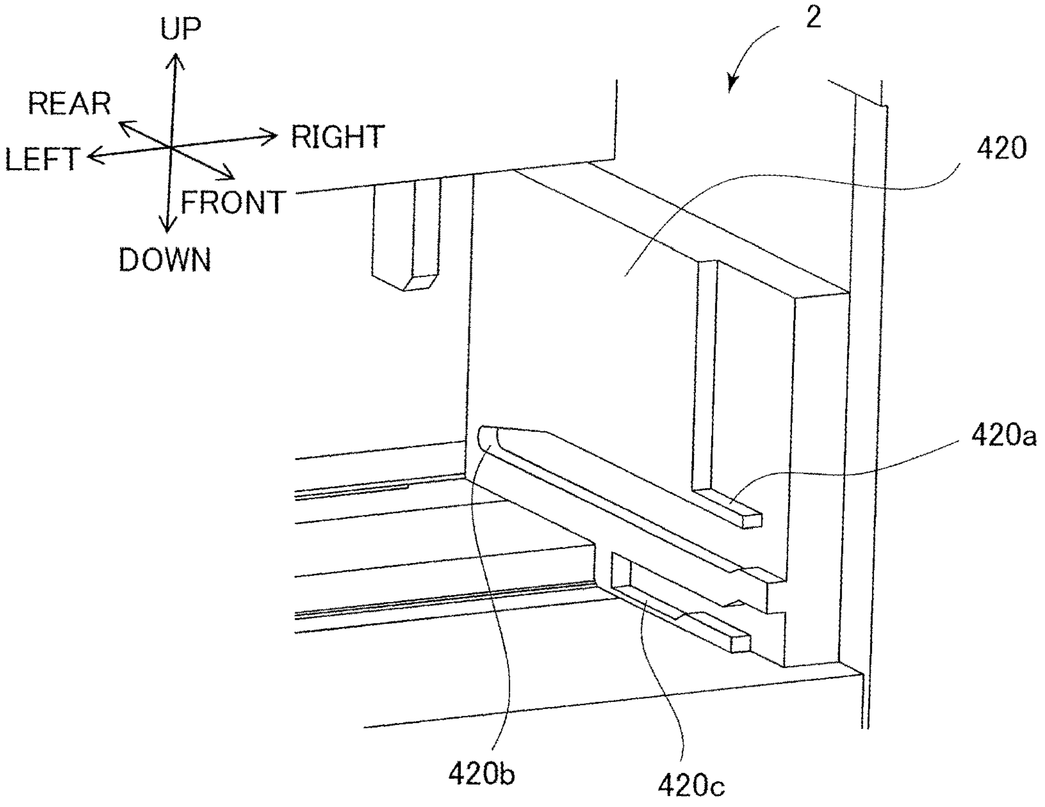
FIG. 42A is a perspective view illustrating a first guide portion and a second guide portion of a right body guide.
Figure 42B:
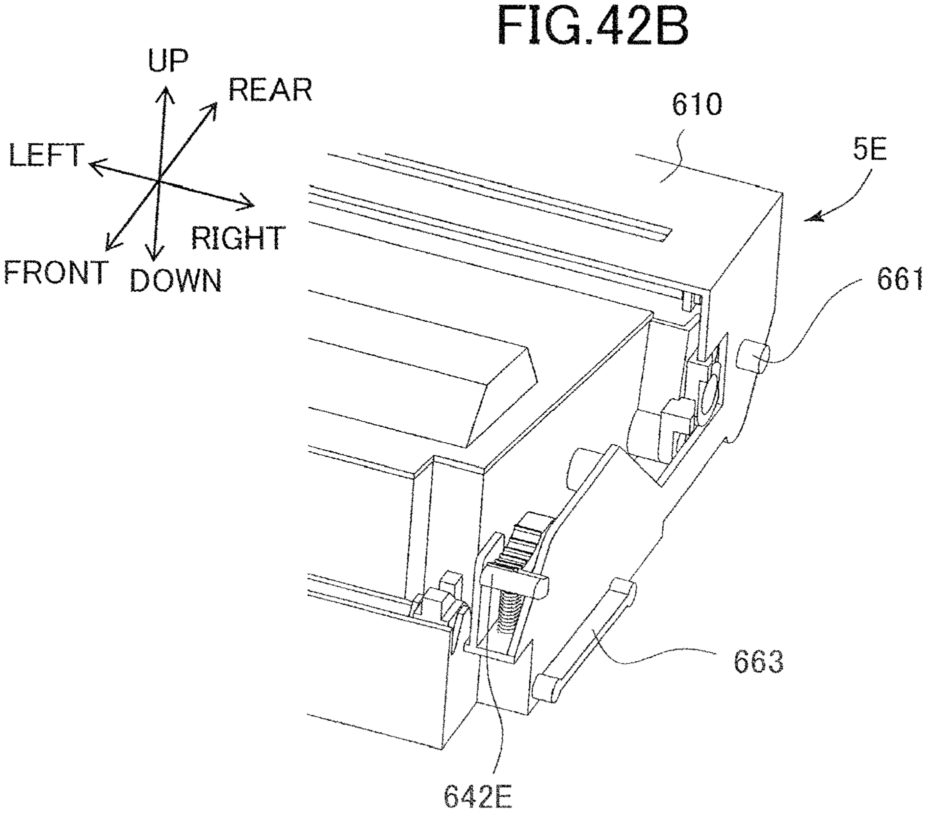
FIG. 42B is a perspective view illustrating a second positioning protrusion and a second guide rib of the drum unit.
Figure 43A:
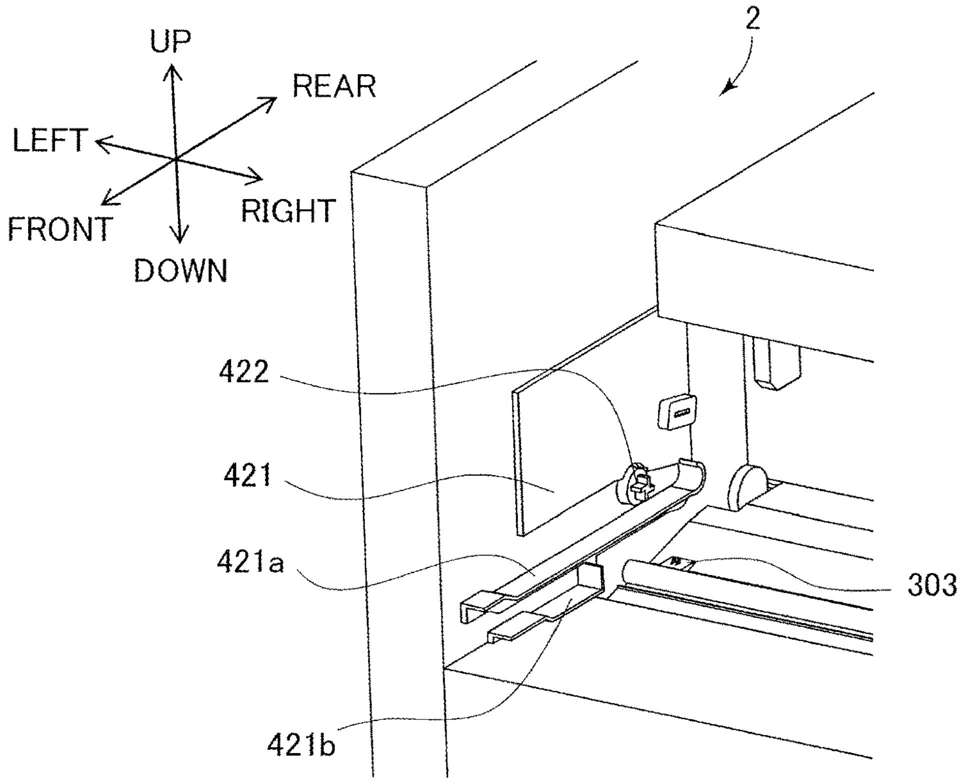
FIG. 43A is a perspective view illustrating a third guide portion and a fourth guide portion of a left body guide.
Figure 43B:
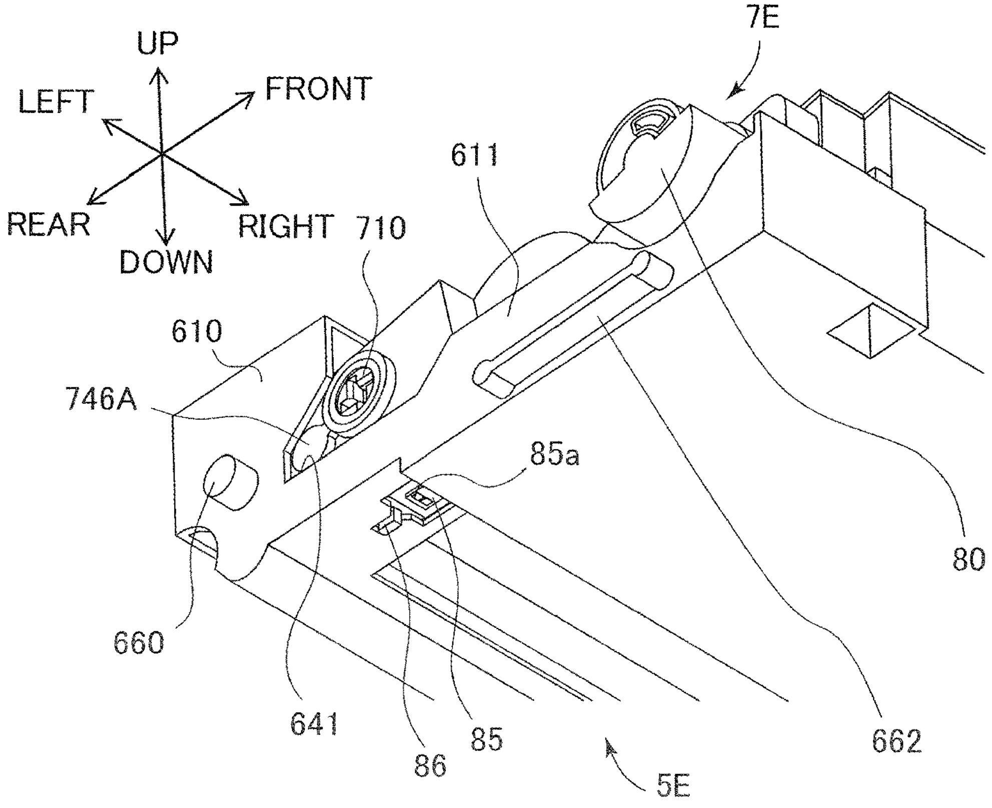
FIG. 43B is a perspective view illustrating the first guide portion and the second guide portion of the right body guide.

Next, description will be given of a configuration for mounting the process cartridge 5E on the apparatus body 2. FIG. 41A is a perspective view illustrating the apparatus body 2 according to this embodiment, and FIG. 41B is an enlarged perspective view illustrating a peripheral configuration of the lift member 642E. Note that, in FIGS. 41A and 41B, the door 21 illustrated in FIG. 1 is omitted.

As illustrated in FIG. 41A to FIG. 43B, the apparatus body 2 includes a right body guide 420 and a left body guide 421. The right body guide 420 is disposed on a right side of a storage portion of the apparatus body 2 in which the process cartridge 5E is stored, and the left body guide 421 is disposed on a left side of the storage portion. The right body guide 420 includes a first guide portion 420*b* and a second guide portion 420*c* which respectively guide the second positioning protrusion 661 and the second guide rib 663 of the process cartridge 5E. The first guide portion 420*b* and the second guide portion 420*c* have a groove shape. In addition, the right body guide 420 includes a contact portion 420*a* that is disposed on an upward side of the first guide portion 420*b* and can come into contact with the regulation portion 410*c* of the lift member 642E.

The left body guide 421 includes a third guide portion 421*a* and a fourth guide portion 421*b* which respectively guide the first positioning protrusion 660 and the first guide rib 662 of the process cartridge 5E. The third guide portion 421*a* and the fourth guide portion 421*b* have a flat plate shape. A drive transmission member 422 that can engage with the development coupling 710 is disposed on an upward side of the third guide portion 421*a*, and the development coupling 710 is driven when the drive transmission member 422 is driven by a drive source (not illustrated) that is provided in the apparatus body 2. In addition, the electrode 303 that can come into contact with the memory electrode 85*a* of the memory 85 provided in the development unit 7E is disposed on a lower-left portion of the apparatus body 2.

Figure 44A:
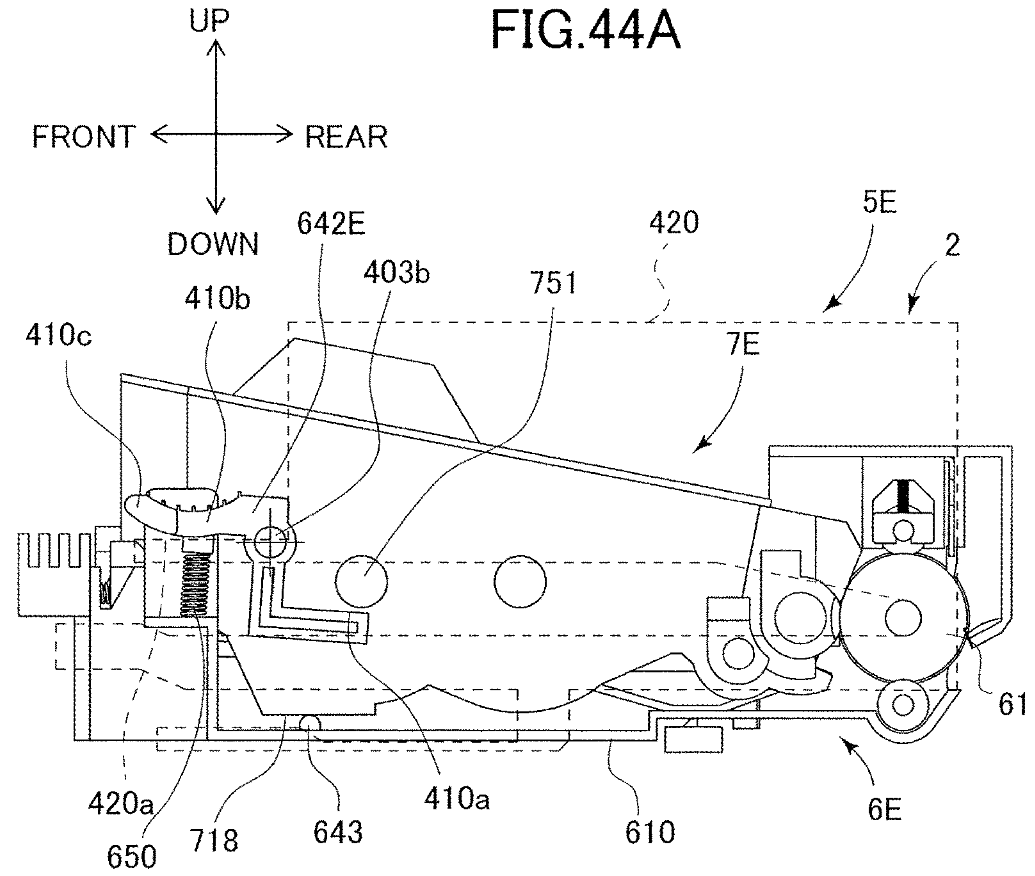
FIG. 44A is a cross-sectional view illustrating a state in which the development unit is mounted on the drum unit.
Figure 45:
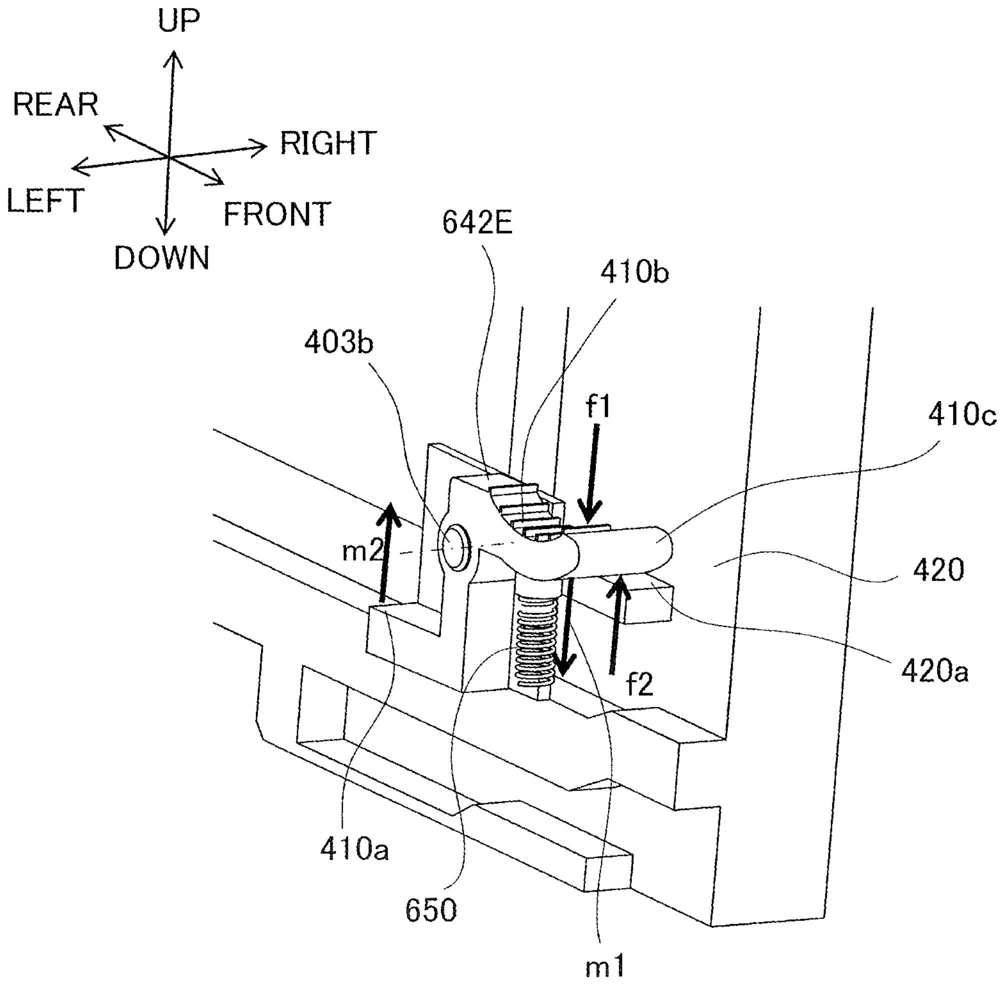
FIG. 45 is a perspective view for describing a force that acts on the lift member.

Next, description will be given of an operation of the lift member 642E in a state in which the process cartridge 5E is mounted on the apparatus body 2. In a state in which the process cartridge 5E is mounted on the apparatus body 2, as illustrated in FIG. 44A and FIG. 45, the contact portion 420*a* is disposed immediately below the regulation portion 410*c* of the lift member 642E. In a state in which the lift member 642E is not operated by a user, the regulation portion 410*c* is spaced apart from the contact portion 420*a* with a slight gap. In addition, the contact portion 410*a* of the lift member 642E is spaced apart from the protruding portion 751 with a slight gap. According to this, the contact portion 420*a* does not hinder the work for mounting the process cartridge 5E on the apparatus body 2. Note that, in a state in which the lift member 642E is not operated by the user, the regulation portion 410*c* may be in contact with the contact portion 420*a*.

Figure 44B:
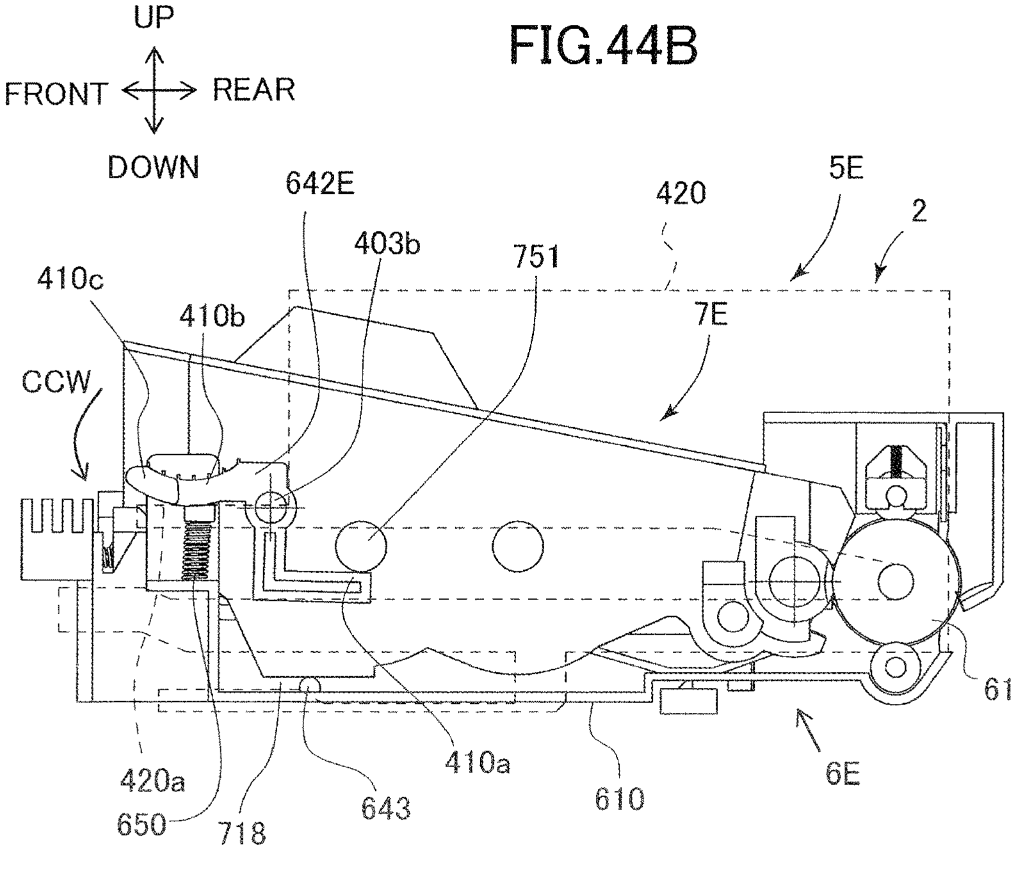
FIG. 44B is a cross-sectional view illustrating the process cartridge in a state in which the lift member is pressed.

As illustrated in FIG. 44B, when the user presses the operation portion 410*b* of the lift member 642E to a downward side, the lift member 642E is apt to pivot against an urging force of the compression spring 650. However, when the lift member 642E slightly pivots, the regulation portion 410*c* of the lift member 642E comes into contact with the contact portion 420*a*, and thus pivoting of the lift member 642E in a counterclockwise, i.e. in a direction indicated by an arrow CCW, is regulated.

According to this, the rib 718 formed on a lower surface of the development unit 7E is maintained in a state of being supported to the protruding portion 643 formed in the drum unit 6E. In addition, the contact portion 410*a* of the lift member 642E is kept in a state of being spaced apart from the protruding portion 751 or a state of slightly coming into contact with the protruding portion 751. However, the development unit 7E is not moved in a direction in which the development unit 7E is detached from the drum unit 6E.

As described above, in a state in which the process cartridge 5E is mounted on the apparatus body 2, a pivoting operation of the lift member 642E is regulated by the contact portion 420*a* provided in the apparatus body 2. That is, the contact portion 420*a* regulates movement of the development unit 7E to a detachment position by coming into contact with the lift member 642E. According to this, even in a case where the user erroneously operates the lift member 642E in a state in which the process cartridge 5E is mounted on the apparatus body 2, the lift member 642 does not lift up the protruding portion 751 of the development unit 7E to an upward side. Accordingly, it is possible to prevent the development unit 7E from being erroneously detached from the drum unit 6E.

When the lift member 642E is operated by a user in a state in which the process cartridge 5E is mounted on the apparatus body 2, there is the following problem. FIG. 45 is a view illustrating a force that acts on the lift member 642E and a deformation direction of the lift member 642E when the user operates the lift member 642E with a strong force in a state in which the process cartridge 5E is mounted on the apparatus body 2.

As illustrated in FIG. 45, when the user presses the operation portion 410*b* of the lift member 642E to a downward side with a force f1, the regulation portion 410*c* of the lift member 642E comes into contact with the contact portion 420*a* of the apparatus body 2. In addition, the regulation portion 410*c* receives a repulsive force f2 from the contact portion 420*a* and is stopped. At this time, the force f1 which the lift member 642E receives acts on a further inner side of the apparatus, i.e. left side, in the axial direction of the rotation shaft 403*b* than the repulsive force f2. According to this, the lift member 642E falls or deforms to the left side, and the left side of the lift member 642E is moved to a direction indicated by an arrow m1.

Since the lift member 642E is held by the rotation shaft 403*b*, the contact portion 410*a* of the lift member 642E is moved to a direction indicated by an arrow m2 which is opposite to the direction indicated by the arrow m1. As a result, the contact portion 410*a* lifts up the protruding portion 751, and a contact state between the memory electrode 85*a* of the memory 85 and the electrode 303 of the apparatus body 2 varies. When the variation repeats, there is a concern that abrasion of the memory 85 is promoted, and thus a contact resistance between electrodes may vary or contact failure may occur.

Figure 46A:
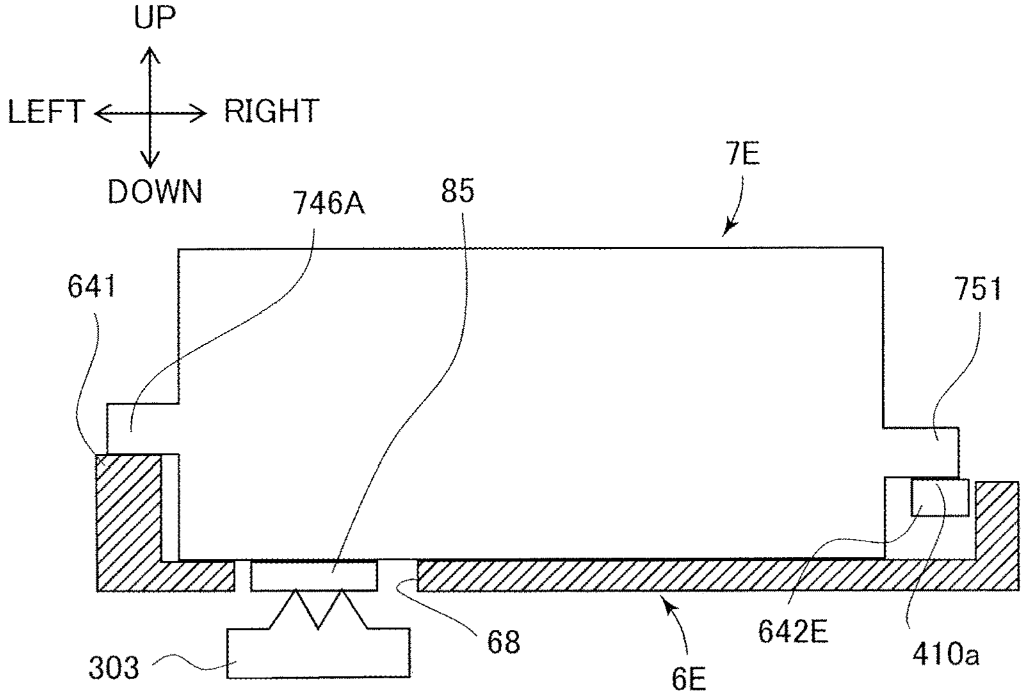
FIG. 46A is a cross-sectional view illustrating a contact state between the memory electrode and an electrode of the apparatus body.
Figure 46B:
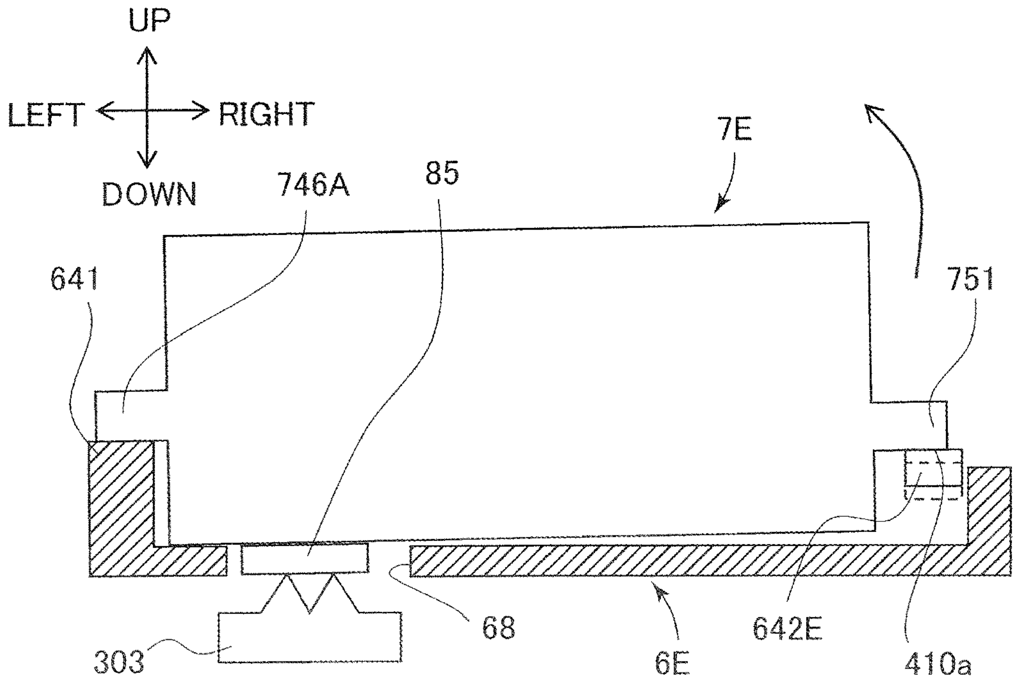
FIG. 46B is a cross-sectional view illustrating a variation of the contact state between the memory electrode and the electrode of the apparatus body.

Here, according to this embodiment, in an axis direction of the rotation shaft 403*b*, the memory 85 is disposed on a side opposite to the protruding portion 751 of the development unit 7E which is lifted up by the lift member 642E, and the inner side wall 403*f* is disposed adjacent to the lift member 642E. As illustrated in FIG. 46A, in the development unit 7E, the bearing 746A is supported by the receiving portion 641 of the drum unit 6E on a side opposite to the protruding portion 751 in the axis direction of the rotation shaft 403*b*. As illustrated in FIG. 46B, when the lift member 642E is pressed by a user, the protruding portion 751 is lifted up by the contact portion of the lift member 642E by falling or deformation of the lift member 642E.

At this time, the development unit 7E is lifted up in an arrow direction by the lift member 642E with a contact portion between the bearing 746A provided on a side opposite to the protruding portion 751 and the receiving portion 641 set as a fulcrum. In addition, the memory 85 is close to the fulcrum in the axis direction of the photosensitive drum 61 and the rotation shaft 403*b*, and as it is distant from a contact portion that is an acting point between the contact portion 410*a* of the lift member 642E and the protruding portion 751, a displacement is small in the operation of lifting up the development unit 7E. According to this, in this embodiment, the memory 85 is disposed at a position closer to the bearing 746A than the contact portion 410*a* of the lift member 642E in the axis direction of the photosensitive drum 61 and the rotation shaft 403*b*, and thus it is possible to reduce abrasion of the memory 85.

Figure 47A:
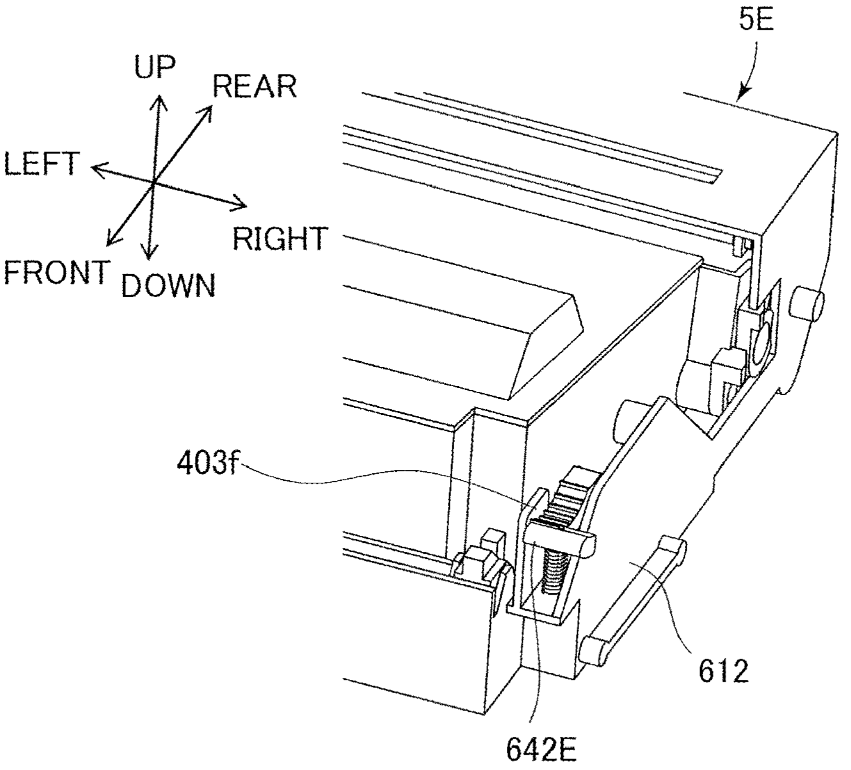
FIG. 47A is a perspective view illustrating an inner side wall.

In addition, as illustrated in FIG. 47A, the inner side wall 403*f* is disposed on the leftward side of the lift member 642E with a slight gap from the lift member 642E. The lift member 642E approaches the inner side wall 403*f* due to the falling or deformation of the lift member 642E. In addition, when the lift member 642E comes into contact with the inner side wall 403*f*, the falling or deformation is regulated. According to this, in a state in which the process cartridge 5E is mounted on the apparatus body 2, a lift-up amount of the development unit 7E by the lift member 642E decreases, and thus it is possible to reduce abrasion of the memory 85.

The inner side wall 403*f* is disposed on a side opposite to a contact portion between the regulation portion 410*c* and the contact portion 420*a* with respect to the operation portion 410*b* in the axis direction of the development roller 71 and the rotation shaft 403*b*. For example, in a case where the contact portion between the regulation portion 410*c* and the contact portion 420*a* is disposed on a rightward side of the operation portion 410*b*, the inner side wall 403*f* is disposed on a leftward side of the operation portion 410*b*.

Figure 47B:
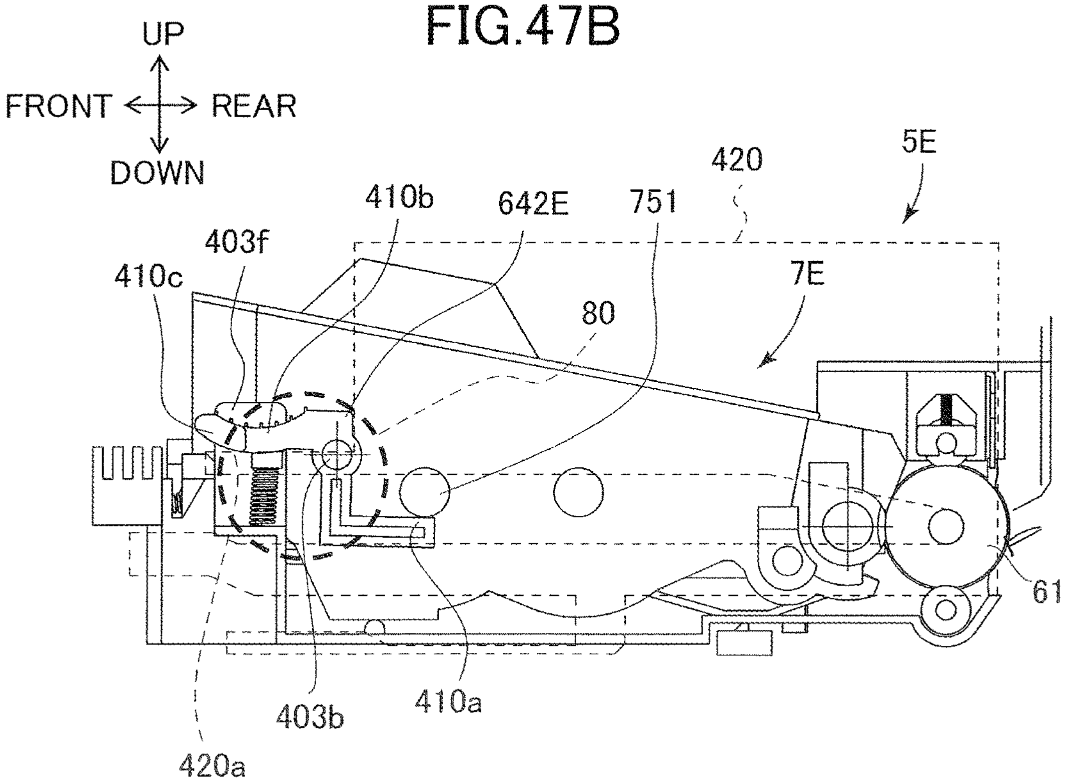
FIG. 47B is a cross-sectional view for describing arrangement of the inner side wall.

Preferably, as illustrated in FIG. 47B, when viewed in the axis direction, the inner side wall 403*f* is provided on a side opposite to the contact portion 410*a* with respect to the rotation shaft 403*b* in the front-rear direction. More preferably, the inner side wall 403*f* is disposed so that at least a part overlaps the operation portion 410*b* or the regulation portion 410*c* when viewed in the axis direction. According to this, the falling or deformation of the lift member 642E is regulated, and it is possible to further reduce abrasion of the memory 85.

In addition, when viewed in the axis direction, the lift member 642E is disposed so that at least a part overlaps the detection unit 80 and the detection protrusion 83. According to this, the process cartridge 5E effectively uses a limited space, and the size of the lift member 642E is secured to maintain stiffness. Accordingly, the deformation or falling of the lift member 642E can be suppressed, or operability for a user can be improved.

Summary of Sixth Embodiment

In a state in which the process cartridge 5E is mounted on the apparatus body 2, when the development unit 7E is detachable from the drum unit 6E, there is a concern that the apparatus body 2 and the development unit 7E may come into contact with each other, and thus there is a concern that the apparatus body 2 or the development unit 7E may be damaged.

Here, according to this embodiment, in a state in which the process cartridge 5E is mounted on the apparatus body 2, a pivoting operation of the lift member 642E is regulated by the contact portion 420*a* provided in the apparatus body 2. That is, when the process cartridge 5E is detached from the apparatus body 2, the contact portion 420*a* of this embodiment does not contact with the lift member 642E, and permits the lift member 642E to move by a first amount. In addition, when the process cartridge 5E is mounted on the apparatus body 2, the contact portion 420*a* comes into contact with the lift member 642E and regulates pivoting of the lift member 642E so that the lift member 642E can move by a second amount smaller than the first amount According to this, on an inner side of the apparatus body 2, the development unit 7E is prevented from being erroneously detached from the drum unit 6E, and thus breakage of the apparatus body 2 or the development unit 7E can be reduced.

In addition, in the configuration in which the pivoting operation of the lift member 642E is regulated by the contact portion 420*a*, when a user presses the operation portion 410*b* of the lift member 642E with a strong force, there is a concern that the lift member 642E may fall down or may be deformed. In addition, when the lift member 642E falls down or is deformed, the memory electrode 85*a* and the electrode 303 on the apparatus body 2 side may be displaced and abraded, and thus there is a concern that contact failure may occur.

Here, according to this embodiment, the lift member is disposed on a first side, i.e. right side, of the process cartridge 5E and the memory electrode 85*a* is disposed on a second side, i.e. left side, of the process cartridge 5E in the longitudinal direction, i.e. axial direction, of the photosensitive drum 61. In addition, the inner side wall 403*f* that regulates falling down or deformation of the lift member 642E is provided on a side opposite to the contact portion 420*a* with the lift member 642E interposed therebetween. According to this, the lift-up amount of the development unit 7E due to the lift member 642E decreases, falling down or deformation of the lift member 642E is regulated, and thus it is possible to further reduce abrasion of the memory 85.

Seventh Embodiment

Next, a seventh embodiment of the invention will be described. The seventh embodiment is different from the first embodiment in disposition of the lift member and a peripheral configuration. Accordingly, illustration of the same configuration as in the first embodiment will be omitted, or the same reference numeral will be given to the same configuration in the following description.

Figure 48:
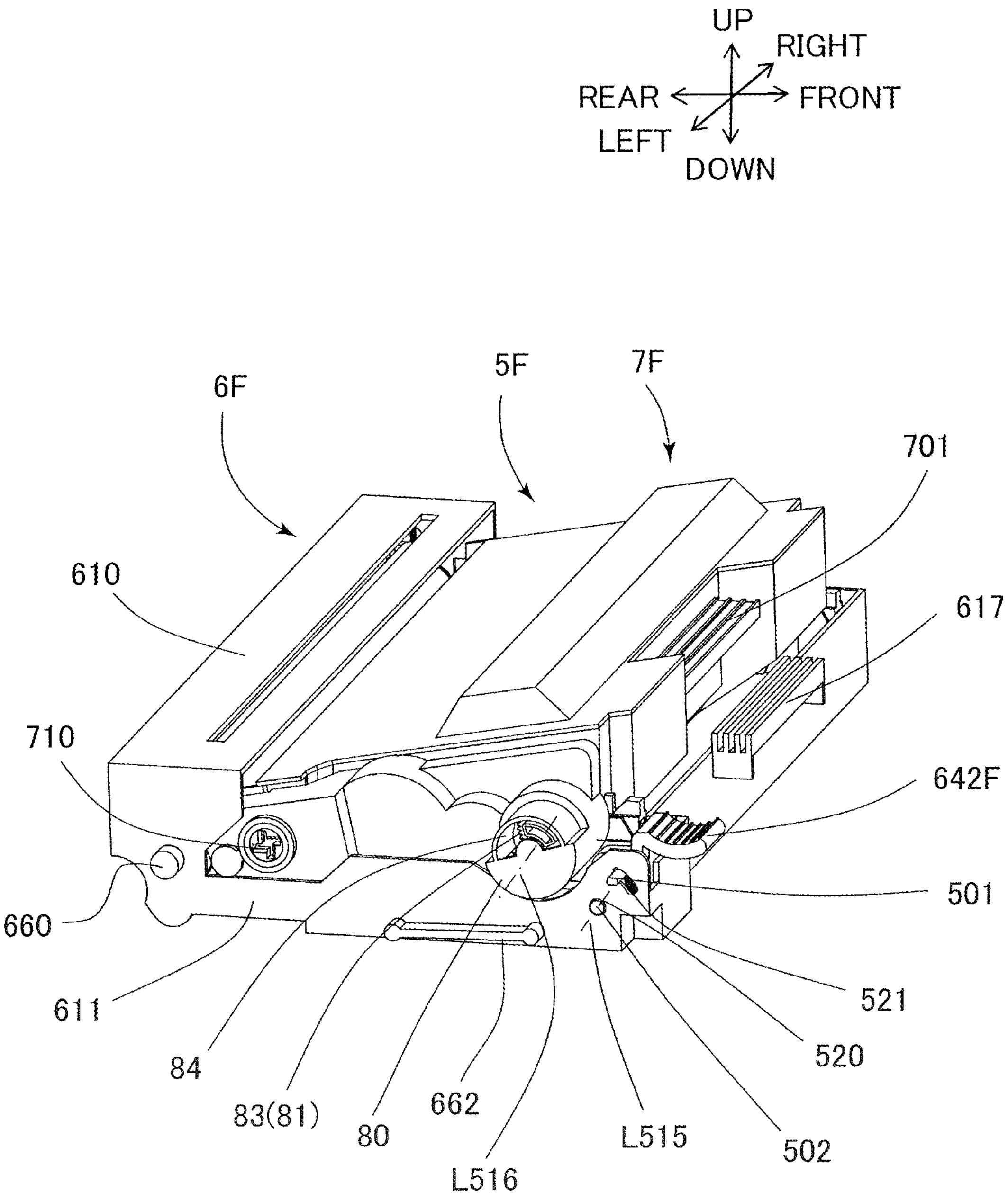
FIG. 48 is a perspective view illustrating a process cartridge according to a seventh embodiment.
Figure 49:
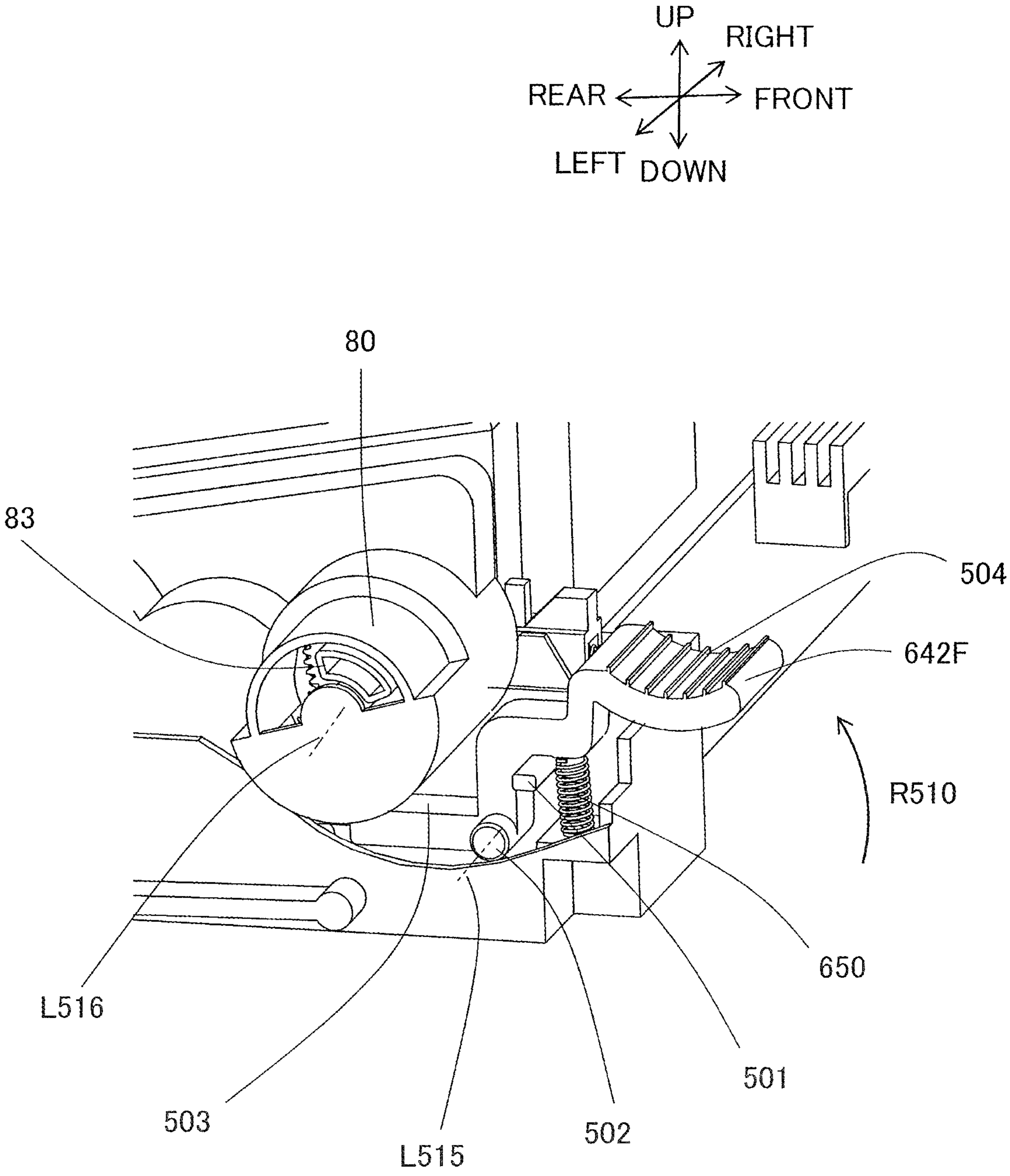
FIG. 49 is an enlarged perspective view illustrating a lift member and a detection unit.

As illustrated in FIG. 48 and FIG. 49, a support hole 520 and a guide hole 521 that is formed in an arc shape around a rotation shaft L515 are formed in the left side wall 611 of a drum unit 6F according to this embodiment. A rotation shaft 502 of a lift member 642F is inserted into the support hole 520. That is, the lift member 642F is provided on a left side of a drum unit 6F, and is supported to the left side wall 611 to be rotatable around the rotation shaft L515.

The lift member 642F includes a regulation portion 501, the rotation shaft 502, a contact portion 503, and an operation portion 504, and is urged in a direction indicated by an arrow R510 by the compression spring 650. The regulation portion 501 is formed to protrude to a leftward side, and is provided to pass through the guide hole 521.

Figure 50A:
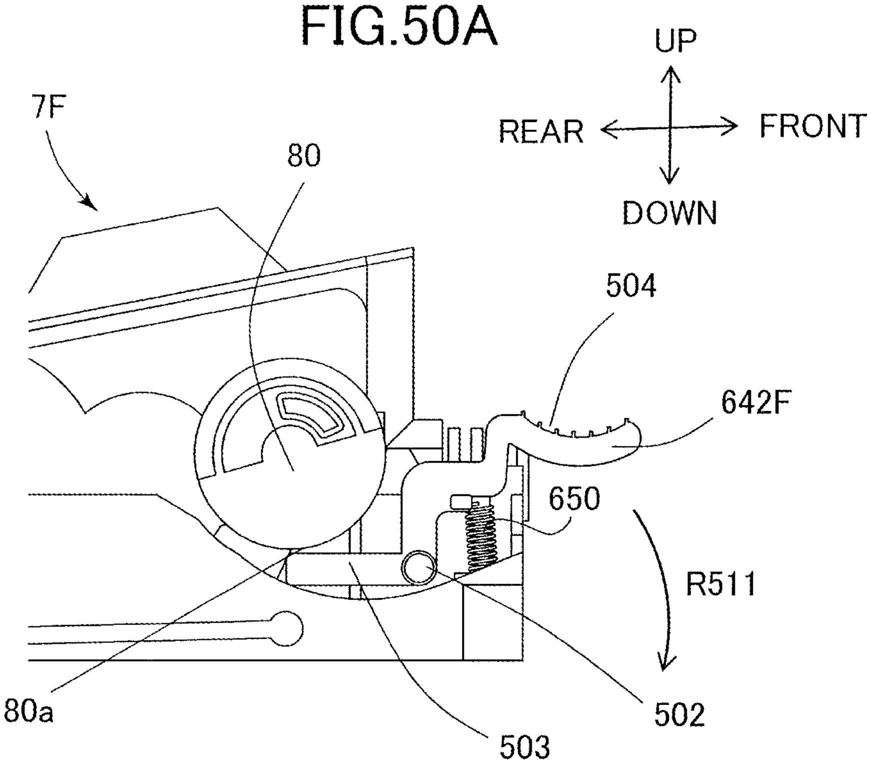
FIG. 50A is a side view illustrating the lift member in a state in which the lift member is not pressed and a detection unit.
Figure 50B:
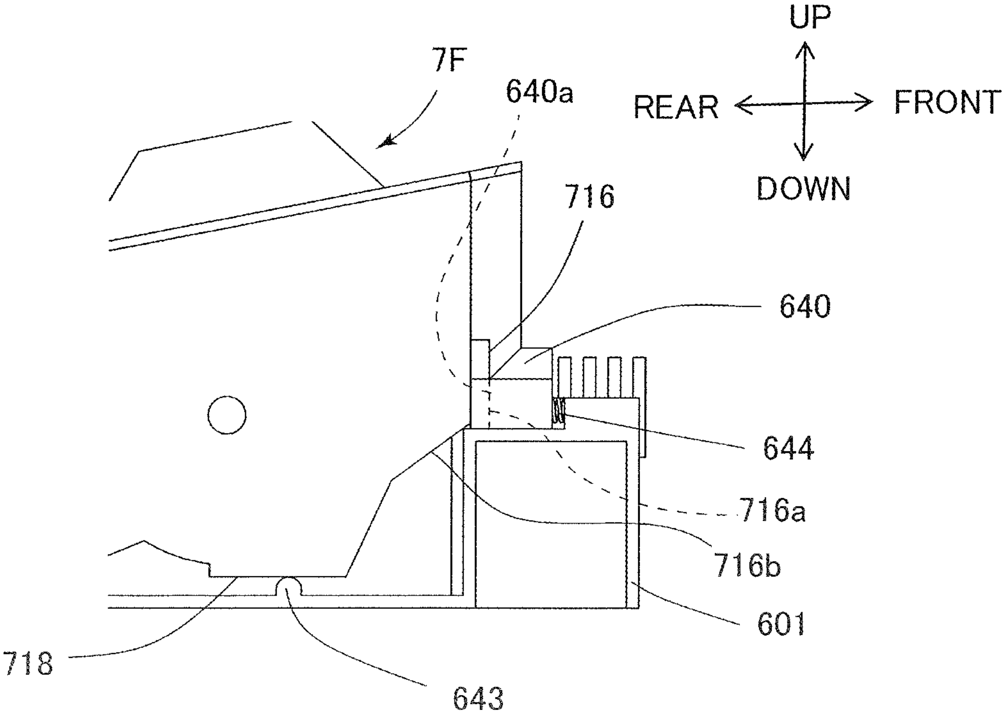
FIG. 50B is a side view illustrating a pressing member and a pressed member.

In a state in which the lift member 642F is not operated by a user, as illustrated in FIG. 50A, the lift member 642F is in a state in which the contact portion 503 is spaced apart from a lower portion 80*a* of the detection unit 80 with a slight clearance. At this time, as illustrated in FIG. 50B, the pressed rib 716 in the development unit 7F is urged toward a rearward side by the pressing member 640 that is urged by the urging spring 644. More specifically, the pressed surface 716*a* in the pressed rib 716 is pressed rearward by the pressing surface 640*a* of the pressing member 640.

Figure 51A:
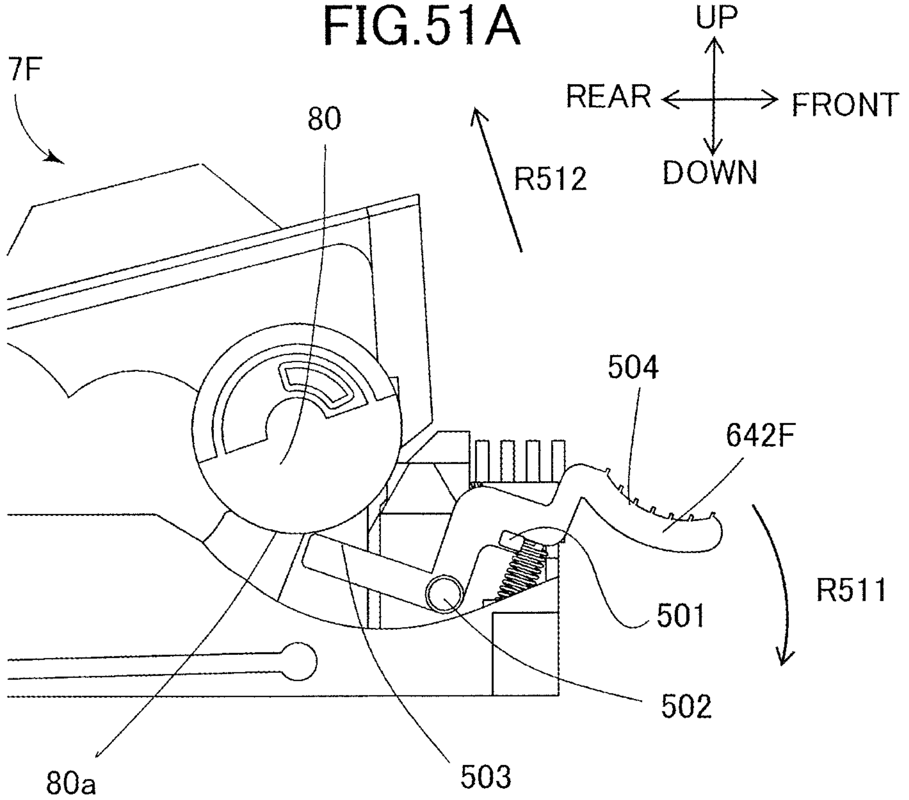
FIG. 51A is a side view illustrating the lift member in a state in which the lift member is pressed and comes into contact with the detection unit.

When the operation portion 504 is pressed downward by a user, as illustrated in FIG. 50A and FIG. 51A, the lift member 642F rotates against the urging force of the compression spring 650 in a direction indicated by an arrow R511 which is opposite to the direction indicated by the arrow R510. According to this, the regulation portion 501 moves inside the guide hole 521, and the contact portion 503 moves upward. The contact portion 503 lifts up the lower portion 80*a* of the detection unit 80 to an upward side, and a leading edge side of the development unit 7F is lifted up in a direction indicated by an arrow R512.

Figure 51B:
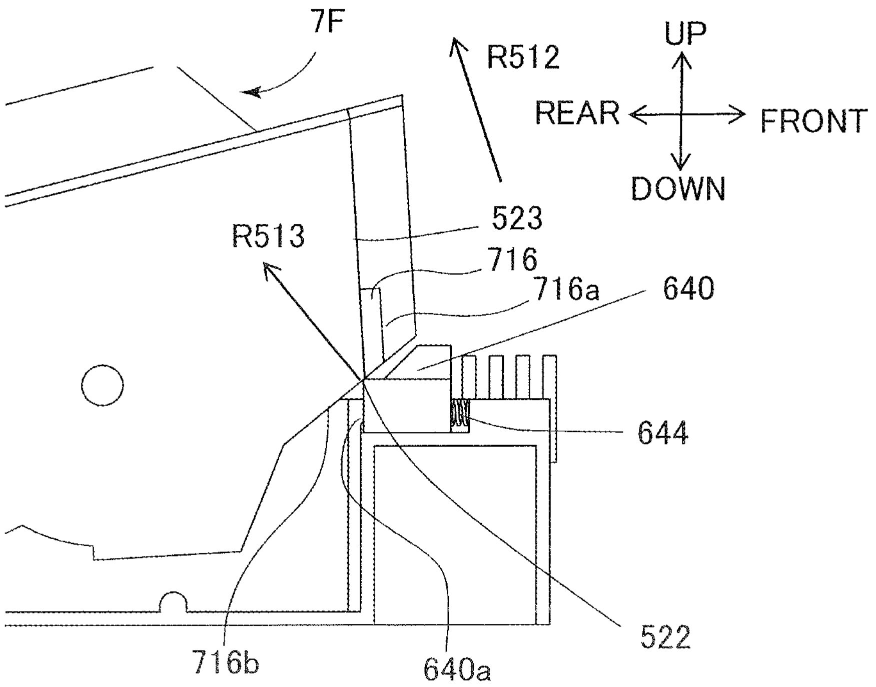
FIG. 51B is a side view illustrating the pressing member and the pressed member.

According to this, as illustrated in FIG. 51B, the pressed surface 716*a* in the development unit 7F is spaced apart from the pressing surface 640*a* to an upward side, and the inclined surface 716*b* of the development unit 7F rides on an end 522 of the pressing member 640. In this case, the inclined surface 716*b* of the development unit 7F is lifted up in a direction indicated by an arrow R513 by the end 522 of the pressing member 640 urged forward by the urging spring 644, and the development unit 7F further pivots in the direction indicated by the arrow R512 by the urging force of the urging spring 644. According to this, it is possible to reduce an operation force for causing the development unit 7F to enter a lift-up state.

Figure 52A:
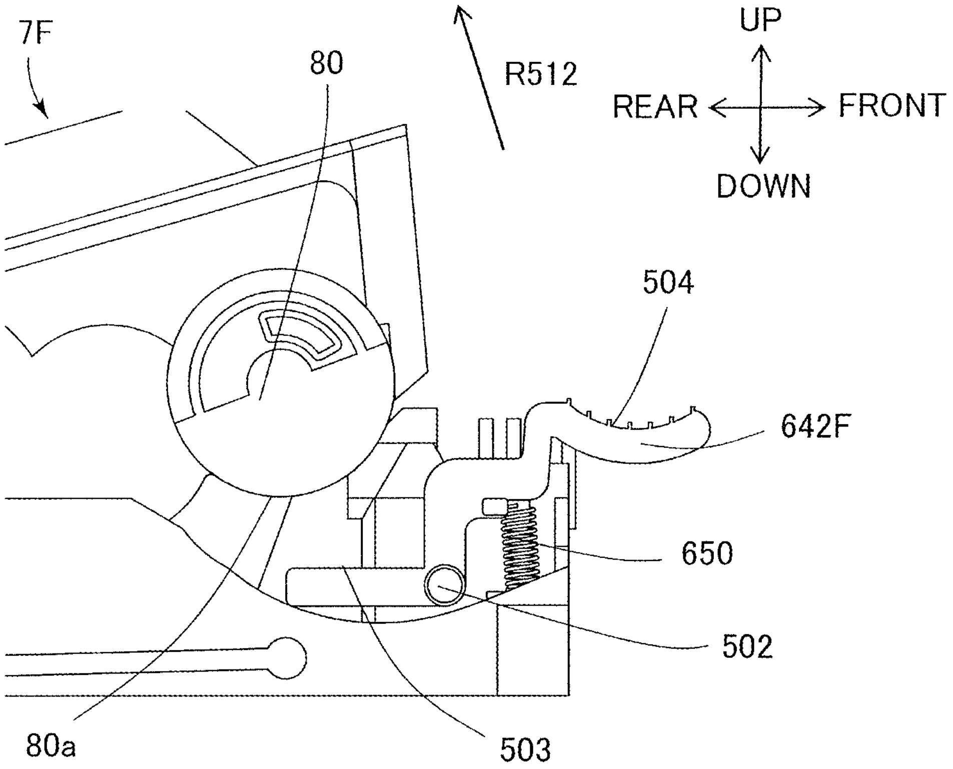
FIG. 52A is a side view illustrating the development unit that enters a lift-up state by the lift member.
Figure 52B:
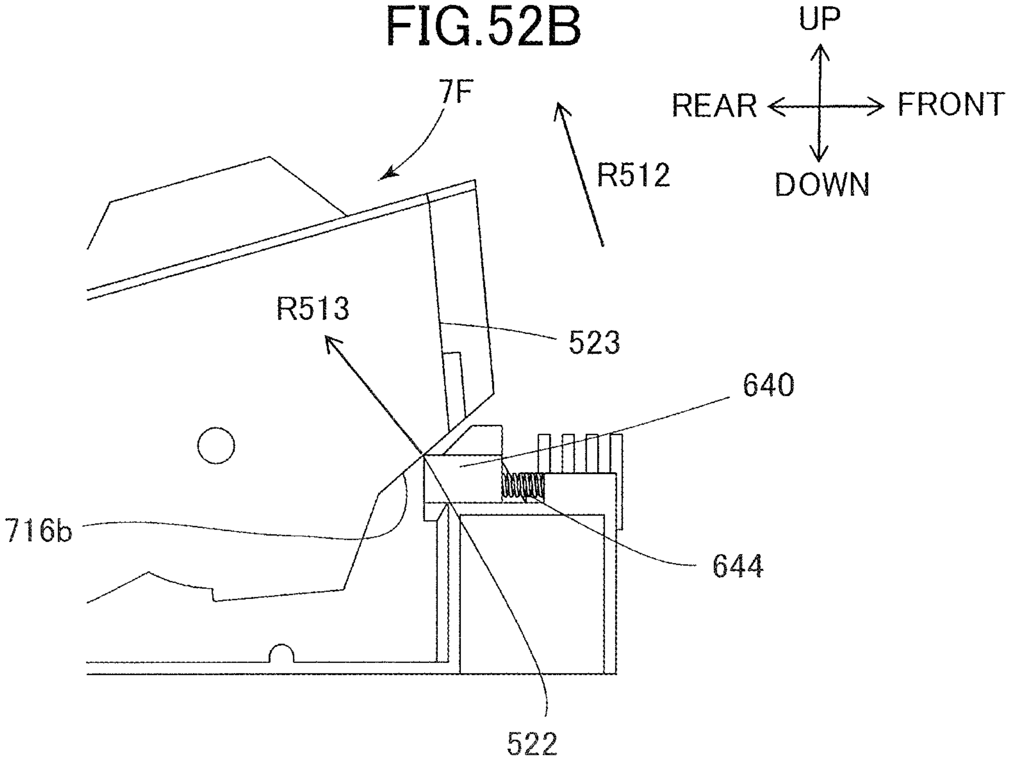
FIG. 52B is a side view illustrating the development unit that is maintained in the lift-up state by an end of the pressing member.

FIG. 52A and FIG. 52B are cross-sectional views illustrating the development unit 7F that has entered the lift-up state. In the state in which the development unit 7F has entered the lift-up state, if the pressing operation for the lift member 642F is released, the lift member 642F returns to a standby position due to an operation of the compression spring 650. In addition, since the development unit 7F is lifted up in the direction indicated by the arrow R513 by the end 522 of the pressing member 640, the leading edge side can be further lifted up in comparison to the state illustrated in FIG. 51B.

Figure 53:
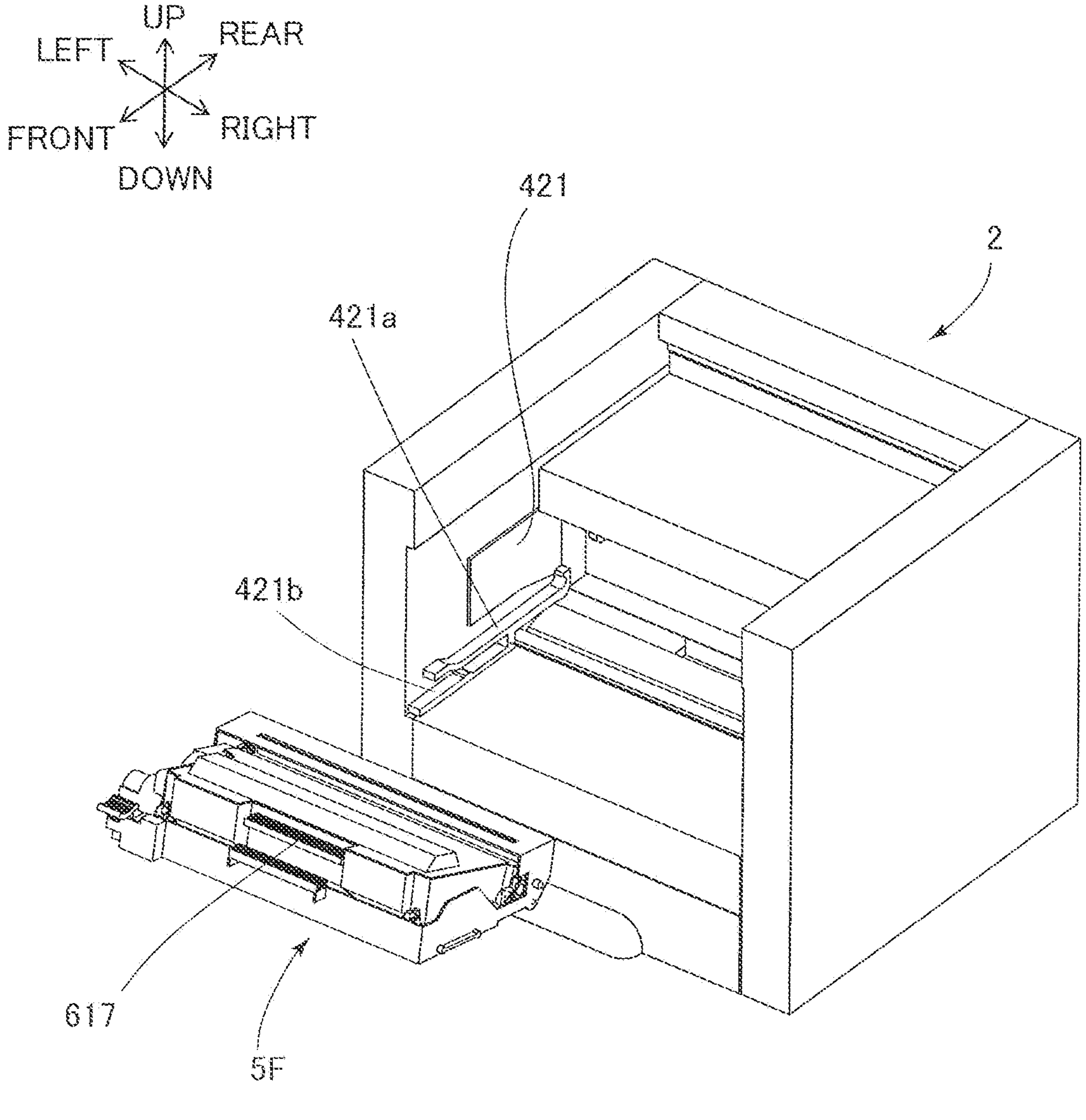
FIG. 53 is a perspective view illustrating the process cartridge that is to be mounted on the apparatus body.

Next, description will be given of a configuration and an operation for mounting the process cartridge 5F on the apparatus body 2. As illustrated in FIG. 53, the apparatus body 2 is provided with the right body guide 420 (refer to FIG. 42A) and the left body guide 421 for guiding the process cartridge 5F. Note that, in this embodiment, description of the right body guide 420 will be omitted, and only the left body guide 421 will be described.

Figure 54:
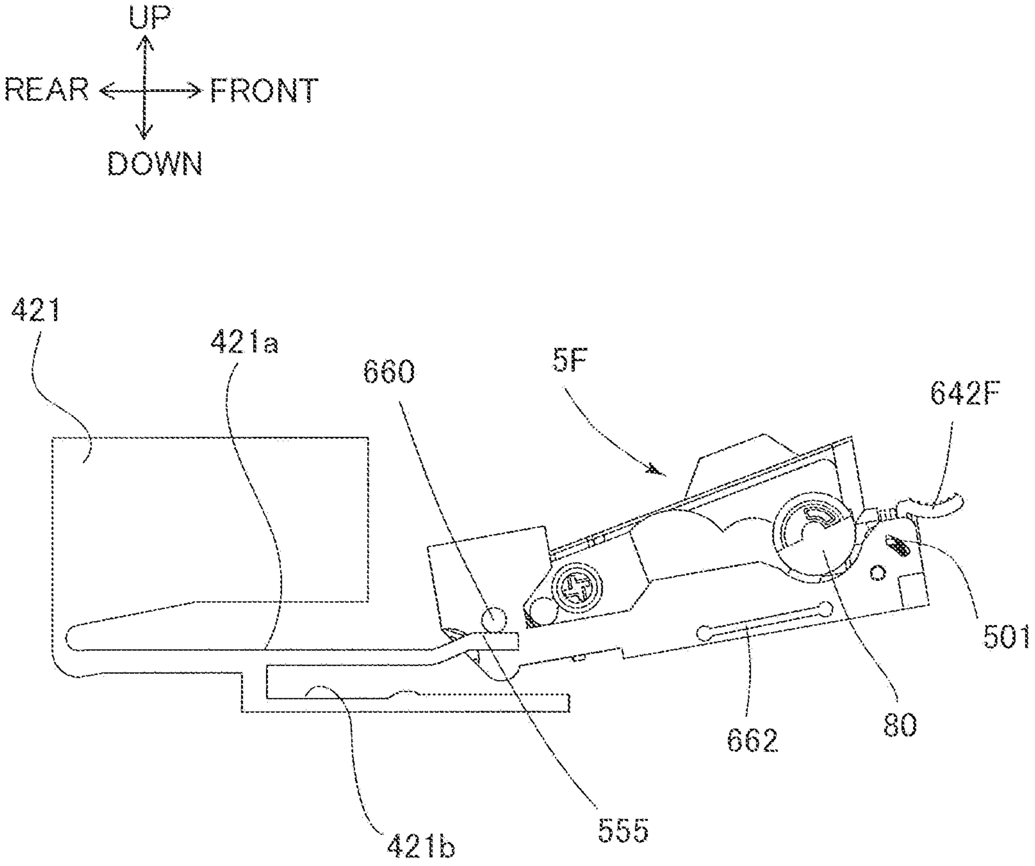
FIG. 54 is a side view illustrating the process cartridge that has begun to be mounted on the apparatus body.

The left body guide 421 includes the third guide portion 421*a* and the fourth guide portion 421*b* which respective guide the first positioning protrusion 660 and the first guide rib 662 of the process cartridge 5F. As illustrated in FIG. 54, when the process cartridge 5F starts to be mounted on the apparatus body 2, the first positioning protrusion 660 of the process cartridge 5F comes into contact with a guide surface 555 of the third guide portion 421*a*, and is guided to a rearward side of the apparatus.

Figure 55A:
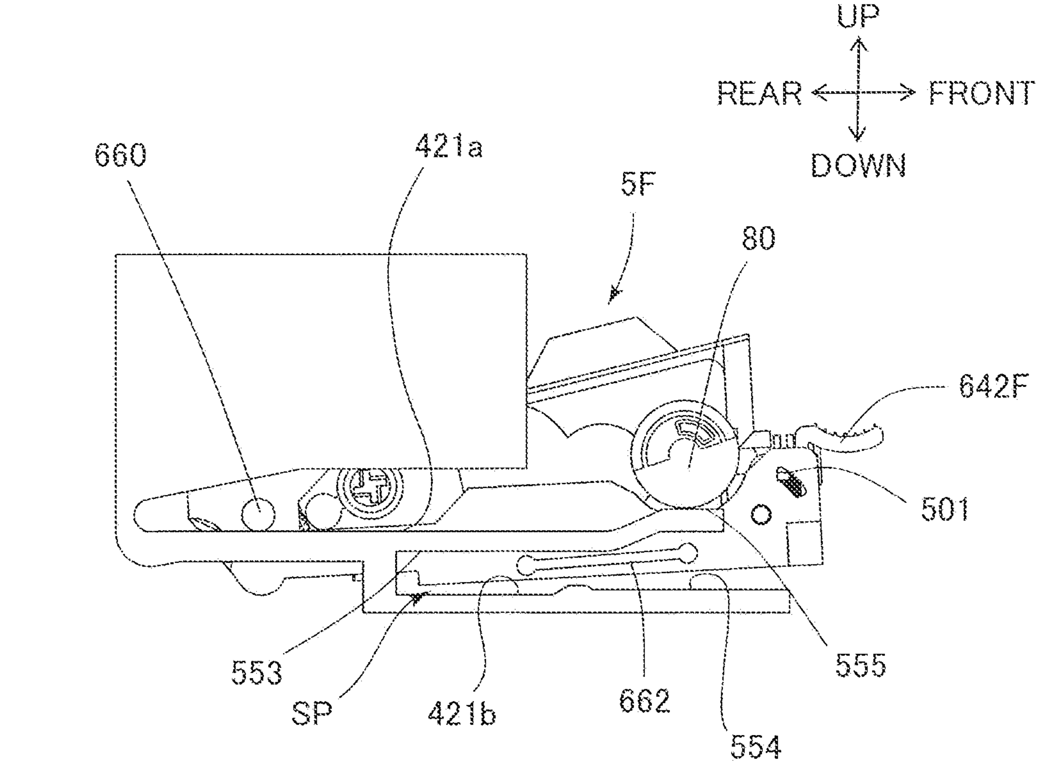
FIG. 55A is a side view illustrating the process cartridge in a state in which a first guide rib is inserted into a guide space.
Figure 55B:
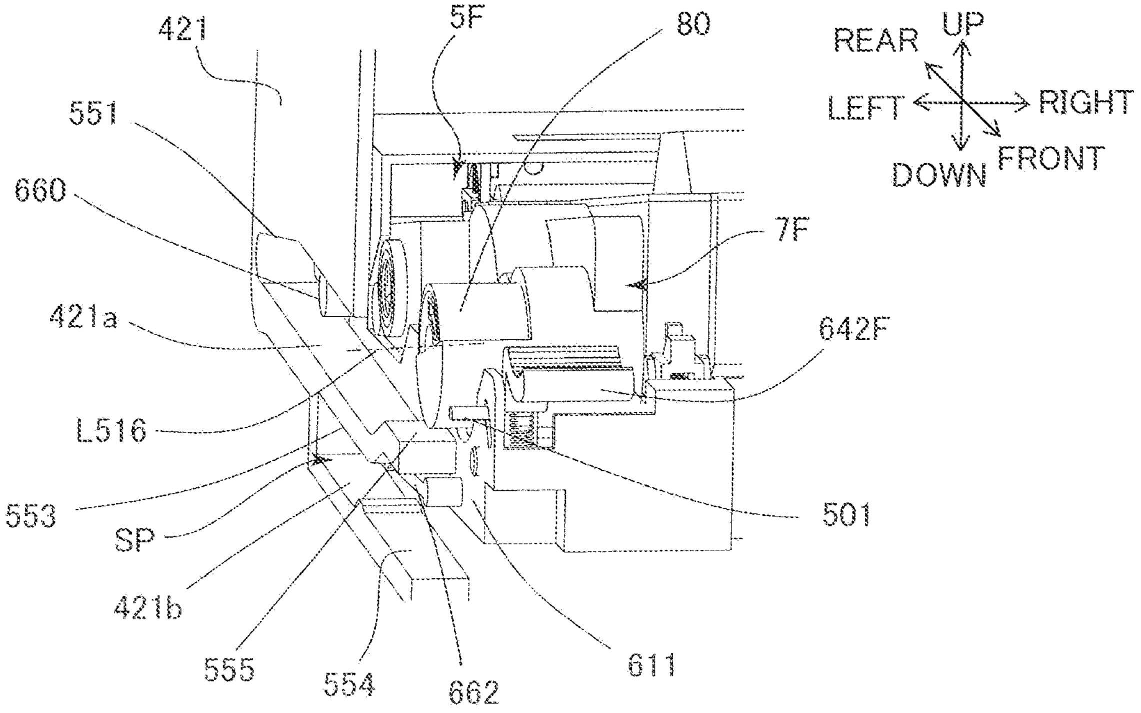
FIG. 55B is a perspective view illustrating the process cartridge in a state in which the first guide rib is inserted into the guide space.

When the process cartridge 5F is further inserted into the apparatus body 2, as illustrated in FIGS. 55A and 55B, the first guide rib 662 enters a guide space SP formed by an upper surface 553 and a lower surface 554 of the fourth guide portion 421*b*. Here, when the process cartridge 5F is inclined upward, the first guide rib 662 comes into contact with the upper surface 553, and upward movement of the process cartridge 5F is regulated. According to this, it is possible to stably mount the process cartridge 5F on the apparatus body 2. On the other hand, the detection unit 80 of the development unit 7F is provided to protrude to a leftward side from the left side wall 611 of the drum unit 6F, and passes through an upward side of the guide surface 555 of the third guide portion 421*a*.

Figure 56:
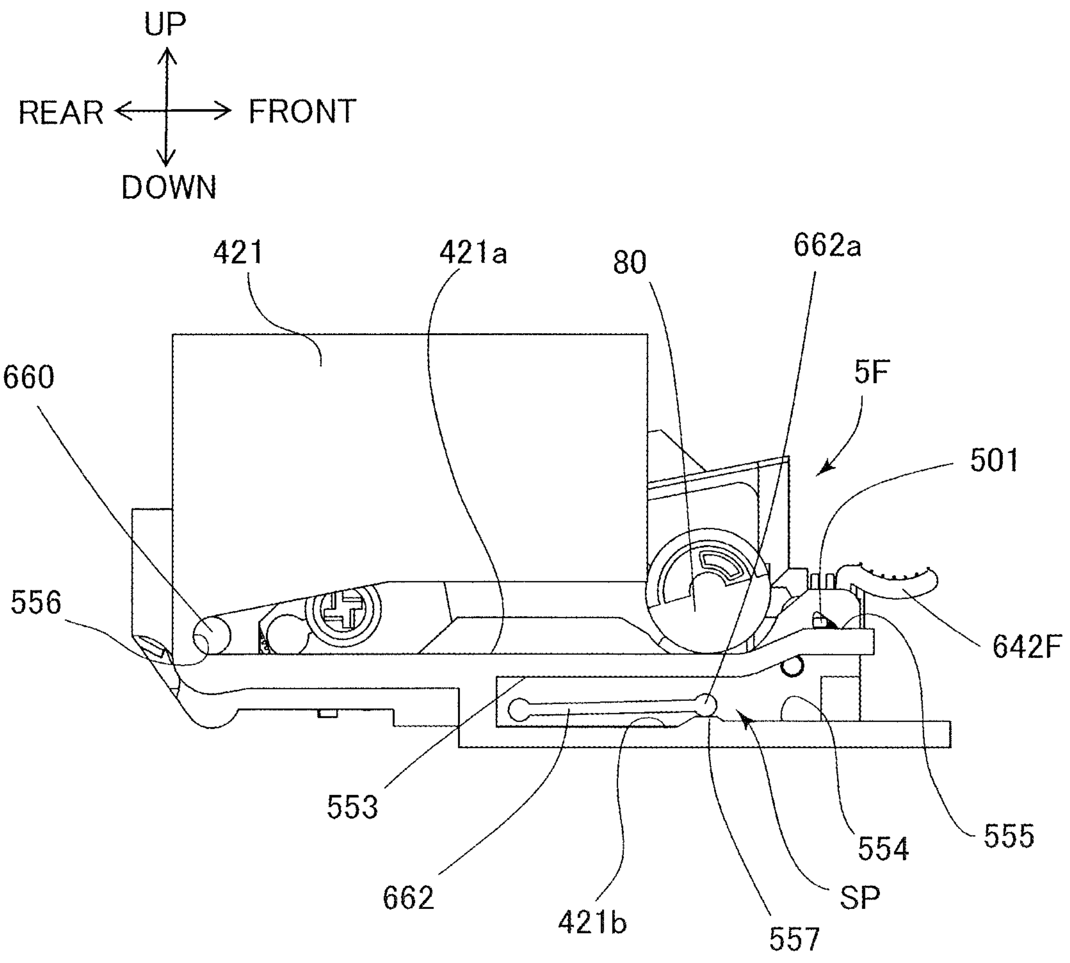
FIG. 56 is a side view illustrating the process cartridge that is mounted on the apparatus body.

When the process cartridge 5F is further inserted into the apparatus body 2, as illustrated in FIG. 56, the first positioning protrusion 660 abuts a positioning surface 556 of the third guide portion 421*a*, and movement of the process cartridge 5F in an insertion direction is regulated. That is, positioning of the process cartridge 5F in the front-rear direction is performed.

In addition, a protruding portion 557 that protrudes upward is formed on the lower surface 554 of the fourth guide portion 421*b*, and the height of the guide space SP at a position of the protruding portion 557 is narrowed. In a state in which the process cartridge 5F is mounted on the apparatus body, and gripping by a user is released, a leading edge portion 662*a* of the first guide rib 662 is supported to the protruding portion 557. The leading edge portion 662*a* bulges in a circular cross-sectional shape. The leading edge portion 662*a* hardly moves in a height direction in the guide space SP due to the shape of the leading edge portion 662*a* and the protruding portion 557, and positioning of the process cartridge 5F in a rotation direction, that is, in the height direction is performed.

In a state in which the process cartridge 5F is mounted on the apparatus body 2 as described above, as illustrated in FIG. 57, the regulation portion 501 provided in the lift member 642F is disposed on an upward side of the guide surface 555 of the third guide portion 421*a* with a slight clearance. In this state, even when a user erroneously presses downward the lift member 642F, since the regulation portion 501 comes into contact with the guide surface 555, the lift member 642F pivots only in a slight amount. That is, in a state of being mounted on the process cartridge 5F, the lift member 642F can pivot only by the clearance. According to this, the development unit 7F hardly moves to enter the lift-up state, and thus the development unit 7F is not detached from the drum unit 6F at the inside of the apparatus body 2.

According to this, it is possible to reduce a mechanical operation failure that occurs due to detachment of the development unit 7F, and a communication problem between the memory chip and the apparatus body 2 which occurs due to a contact failure between the memory electrode 85*a* and the electrode 303 of the apparatus body 2.

Figure 57:
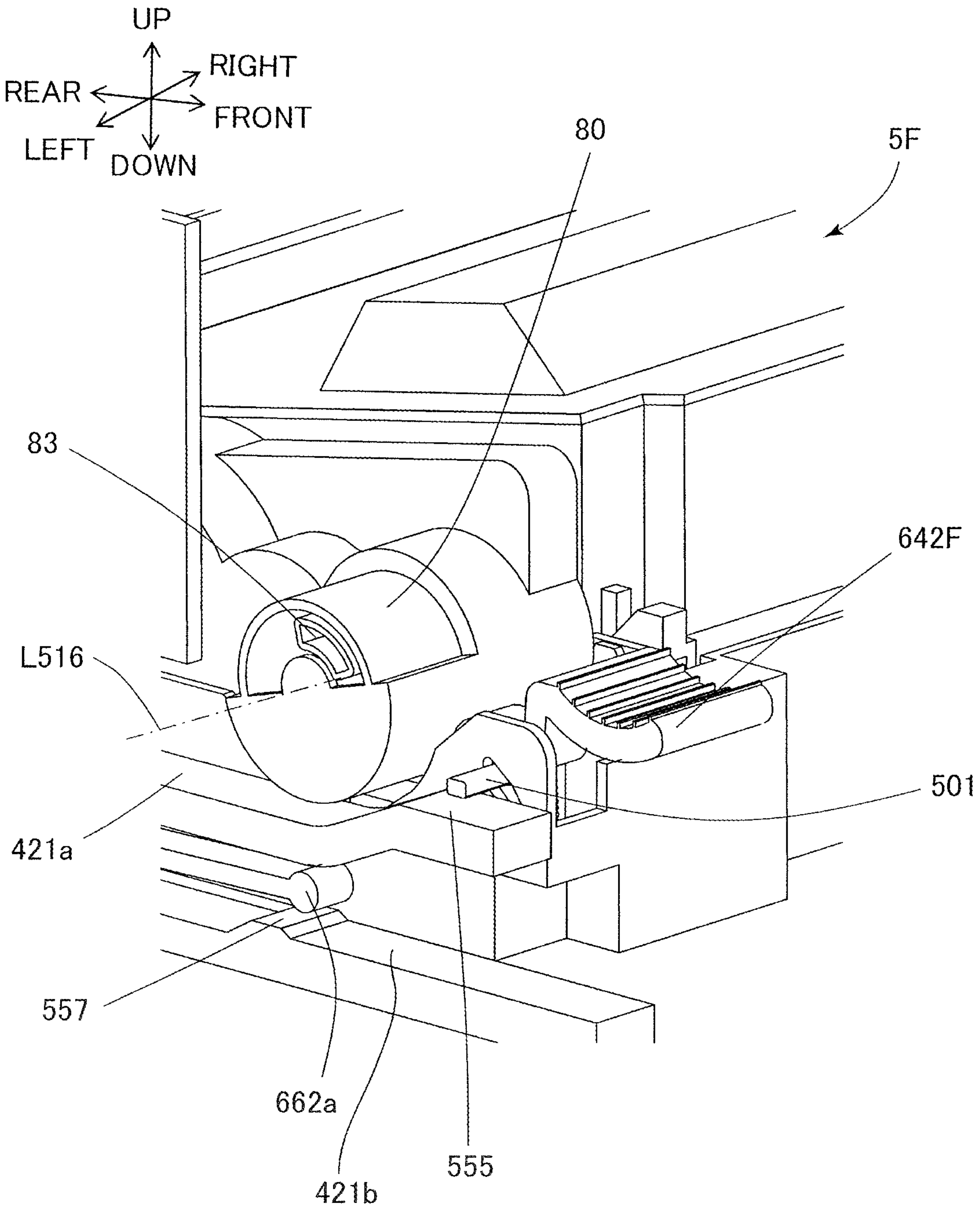
FIG. 57 is a perspective view illustrating an arrangement relationship of a regulation portion.

In addition, as illustrated in FIG. 49 and FIG. 57, the regulation portion 501 of the lift member 642F is disposed bellow a rotation center L516 of the detection gear 81 of the detection unit 80, that is, the rotation center L516 of the detection protrusion 83. According to this, the guide surface 555 can be disposed on a lower side of the apparatus body 2, and when mounting the process cartridge 5F on the apparatus body 2, the first positioning protrusion 660 of the process cartridge 5F can be allowed to smoothly pass through the third guide portion 421*a*. Particularly, undulation of the guide surface 555 is small, and thus it is not necessary to greatly lift up the entirety of the process cartridge 5F, and usability can be improved. In addition, it is not necessary to provide a space necessary for lifting up the entirety of the process cartridge 5F in the apparatus body 2, and thus it is possible to realize a reduction in size of the apparatus body 2 in the height direction.

Summary of Seventh Embodiment

In recent years, there has been a demand for a reduction in size of a process cartridge and a printer serving as an image forming apparatus. Here, according to this embodiment, the detection unit 80, including detection protrusion 83, the memory electrode 85*a*, and the lift member 642F are disposed on a left side where the development coupling 710 of the process cartridge 5F is provided. According to this, the detection unit 80, including detection protrusion 83, the memory electrode 85*a*, and the lift member 642F are disposed in a compact manner, and thus the size of the process cartridge and the image forming apparatus can be reduced.

In addition, the regulation portion 501 that protrudes to an outer side in the axial direction of the photosensitive drum 61 is provided in the lift member 642F, and in a state in which the process cartridge 5F is mounted on the apparatus body 2, the regulation portion 501 is configured to come into contact with the guide surface 555 provided in the apparatus body 2. According to this, in a state in which the process cartridge 5F is mounted on the apparatus body 2, even in a case where the operation portion 504 of the lift member 642F is pressed downward, since the regulation portion 501 comes into contact with the guide surface 555, pivoting of the lift member 642F is regulated. According to this, the development unit 7F is prevented from being erroneously detached from the drum unit 6F at the inside of the apparatus body 2, and thus it is possible to reduce breakage of the apparatus body 2 or the development unit 7F.

Eighth Embodiment

Next, an eighth embodiment of the invention will be described. The eighth embodiment is different from the first embodiment in a process configuration of the drum unit. Accordingly, illustration of the same configuration as in the first embodiment will be omitted, or the same reference numeral will be given to the same configuration in the following description.

Figure 58:
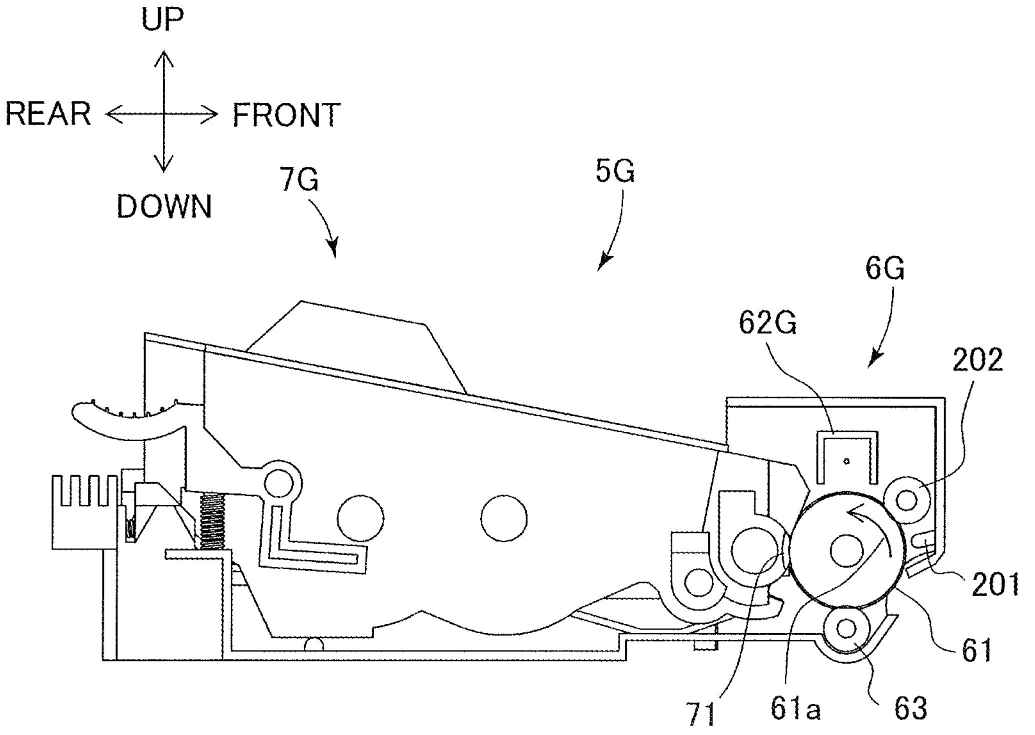
FIG. 58 is a cross-sectional view illustrating a process cartridge according to an eighth embodiment.

As illustrated in FIG. 58, the process cartridge 5G according to this embodiment includes a drum unit 6G and a development unit 7G that is mounted on the drum unit 6G. The drum unit 6G includes the photosensitive drum 61, a corona charger 62G, the transfer roller 63, a front exposure unit 201, and a collection roller 202.

The corona charger 62G is a charging unit that charges a surface of the photosensitive drum 61 in a non-contact manner. The front exposure unit 201 includes a light-emitting diode serving as a light source, and a light guide serving as a light guiding member. Light emitted from the light-emitting diode is guided by the light guide, and the surface of the photosensitive drum 61 is irradiated with the light. A current that is supplied to the light-emitting diode is supplied from the apparatus body 2. The surface of the photosensitive drum 61 is discharged through the light irradiation by the front exposure unit 201. In addition, a predetermined voltage is applied to the collection roller 202 from the apparatus body 2 to collect foreign substances such as paper dust and a waste and a toner which adhered to the surface of the photosensitive drum 61. With regard to a rotation direction of the photosensitive drum 61 during image formation, that is, a direction indicated by an arrow 61*a* in the drawing the transfer roller 63, the front exposure unit 201, the collection roller 202, the corona charger 62G, and the development roller 71 are arranged in this order from an upstream side to a downstream side.

Summary of Eighth Embodiment

In recent years, there has been a demand for various charging types of process cartridges. In this embodiment, the corona charging type corona charger 62G is provided in the process cartridge 5G.

Note that, in any of the above-described embodiments, the development roller 71 comes into contact with the photosensitive drum 61, but the development roller 71 may not come into contact with the photosensitive drum 61. That is, it is possible to employ a configuration in which the development roller 71 is disposed to face the photosensitive drum 61 with a minute gap, and a toner is developed in the photosensitive drum 61 through the minute gap.

In addition, in any of the above-described embodiments, description has been made with reference to an electrophotographic system monochrome printer, but the invention is not limited thereto. For example, the present invention is also applicable to a full-color printer using an intermediate transfer belt, or an inkjet type image forming apparatus that forms an image on a sheet by ejecting an ink liquid from the nozzle. Note that, any of the above-described embodiments and modification examples may be appropriately combined.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g, central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-084040, filed Apr. 25, 2019, which is hereby incorporated by reference herein in its entirety.

What is claimed is:

1. A process cartridge comprising:

a drum unit comprising a photosensitive drum, a pressing portion, and a first frame, the photosensitive drum being rotatable about a first axis that extends in a first direction, the first frame including (i) a first side wall provided with a recess, (ii) a second side wall opposite to the first side wall in the first direction, and (iii) a bottom wall connecting the first side wall and the second side wall; and a developing unit detachably attached to the drum unit, the developing unit including:

a developing roller rotatable about a second axis that extends in a second direction;

a memory configured to store information, the memory including a memory electrode;

a second frame including (i) a third side wall, (ii) a fourth side wall opposite to the third side wall in the second direction, (iii) a toner accommodating portion located between the third side wall and the fourth side wall, and (iv) a force receiving portion projecting from the third side wall in the second direction; and a side holder attached to the second frame at an end portion of the second frame in the second direction, the side holder including a memory supporting portion on which the memory is supported, wherein, in an attached state where the developing unit is attached to the drum unit and the second frame is located above the bottom wall, the memory supporting portion is inserted into the recess and the pressing portion presses the force receiving portion such that the developing roller is pressed against the photosensitive drum.

2. The cartridge according to claim 1, wherein, in the attached state, the memory supporting portion is inserted into the recess such that the memory supporting portion is exposed from the recess.

3. The cartridge according to claim 1, wherein the first side wall includes an extended portion that extends along the first direction, and wherein, in the attached state, the memory supporting portion faces the extended portion.

4. The cartridge according to claim 1, further comprising a moving member configured to move the developing unit attached to the drum unit from a mounting position to a detachment position.

5. The cartridge according to claim 1, wherein the bottom wall is provided with a hole, and wherein, in the attached state, the developing unit is exposed from the hole.

6. The cartridge according to claim 1, wherein, in the attached state, the memory supporting portion protrudes in the second direction with respect to the first side wall through the recess.

7. The cartridge according to claim 1, wherein the memory electrode faces a direction crossing to the second direction.

8. The cartridge according to claim 1, wherein the drum unit includes a transfer roller configured to contact with the photosensitive drum.

9. The cartridge according to claim 8, wherein, in the attached state, the transfer roller is located below the photosensitive drum.

10. The cartridge according to claim 1, wherein the developing unit includes a first agitator and a second agitator, the first agitator and the second agitator being configured to agitate toner accommodated in the toner accommodating portion.

11. The cartridge according to claim 10, wherein, in the attached state, a distance between the force receiving portion and the photosensitive drum is shorter than a distance between the second agitator and the photosensitive drum.

12. The cartridge according to claim 1, wherein the developing unit includes a drive train including:

a coupling configured to drive the developing roller; and a plurality of gears configured to be driven by the coupling, wherein the side holder covers the drive train.

* * * * *